(12) United States Patent
Silverbrook et al.

(10) Patent No.: US 8,287,204 B2
(45) Date of Patent: Oct. 16, 2012

(54) ELECTRONIC PEN WITH RETRACTABLE AND REPLACEABLE CARTRIDGE

(75) Inventors: Kia Silverbrook, Balmain (AU); Paul Lapstun, Balmain (AU); Matthew John Underwood, Balmain (AU); Robert John Brice, Balmain (AU); Zsolt Szarka-Kovacs, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 805 days.

(21) Appl. No.: 12/477,875

(22) Filed: Jun. 3, 2009

(65) Prior Publication Data

US 2009/0315864 A1     Dec. 24, 2009

Related U.S. Application Data

(60) Provisional application No. 61/074,977, filed on Jun. 23, 2008.

(51) Int. Cl.
*B43K 5/06* (2006.01)
*B43K 5/16* (2006.01)

(52) U.S. Cl. .......... 401/195; 401/99; 401/109; 345/179

(58) Field of Classification Search .............. 401/195, 401/99, 109, 111, 115; 345/179
See application file for complete search history.

(56) References Cited

U.S. PATENT DOCUMENTS

| 4,864,618 | A | 9/1989 | Wright et al. |
| 5,051,736 | A | 9/1991 | Bennett et al. |
| 5,477,012 | A | 12/1995 | Sekendur |
| 5,652,412 | A | 7/1997 | Lazzouni et al. |
| 5,661,506 | A | 8/1997 | Lazzouni et al. |
| 5,692,073 | A | 11/1997 | Cass |
| 5,852,434 | A | 12/1998 | Sekendur |
| 6,050,735 | A * | 4/2000 | Hazzard .................. 401/33 |
| 6,076,734 | A | 6/2000 | Dougherty et al. |
| 6,104,388 | A | 8/2000 | Nagai et al. |
| 6,964,374 | B1 | 11/2005 | Djuknic et al. |
| 7,232,271 | B2 * | 6/2007 | Adams ................ 401/116 |
| 7,239,306 | B2 | 7/2007 | Fahraeus et al. |
| 7,417,629 | B2 * | 8/2008 | Lapstun et al. ........... 345/175 |
| 7,683,895 | B2 * | 3/2010 | Mika ..................... 345/179 |
| 7,785,027 | B1 * | 8/2010 | McKinley et al. ......... 401/195 |
| 2006/0181525 | A1 * | 8/2006 | Larsen et al. ............ 345/179 |
| 2008/0030486 | A1 * | 2/2008 | Cook ................... 345/179 |

FOREIGN PATENT DOCUMENTS

| GB | 2306669 A | 5/1997 |
| WO | WO 99/18487 A2 | 4/1999 |
| WO | WO 99/50787 A1 | 10/1999 |

OTHER PUBLICATIONS

Electronic Pen with Retractable Writing Tip, Activating on/off Function, Research Disclosure, Jul. 2000, RD435037, p. 1183.
Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

* cited by examiner

*Primary Examiner* — David Walczak
*Assistant Examiner* — Jennifer C Chiang

(57) ABSTRACT

An electronic pen comprises a user-replaceable cartridge having a nib, a force sensor for sensing a nib force transmitted axially through the cartridge from the nib and a retraction mechanism for retracting the cartridge. The retraction mechanism comprises a barrel adapted for seating the cartridge in either an extended position or a retracted position, and a first biasing mechanism for biasing the cartridge towards the extended or retracted positions. A second biasing mechanism biases the barrel towards engagement with the force sensor.

16 Claims, 36 Drawing Sheets

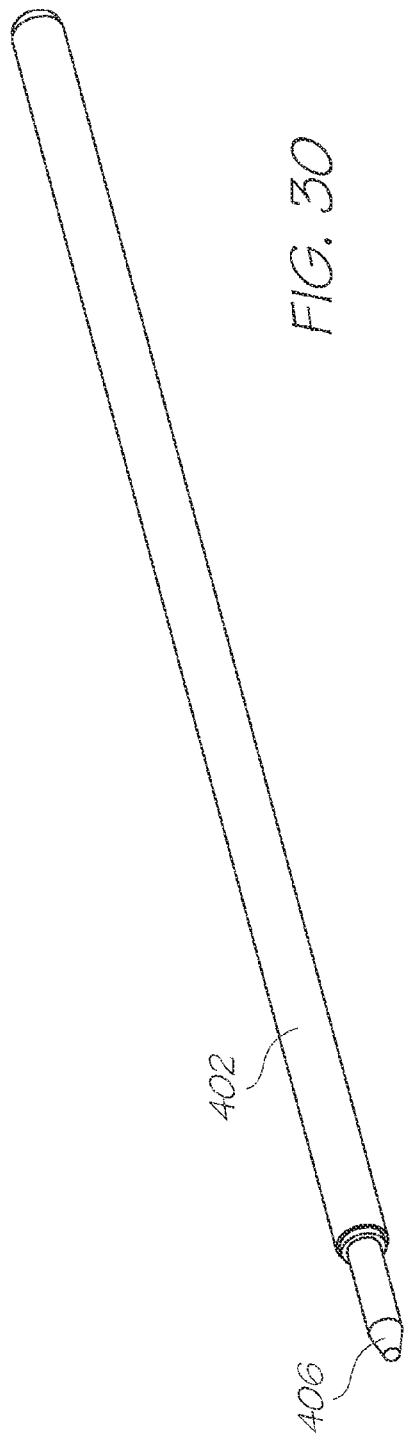
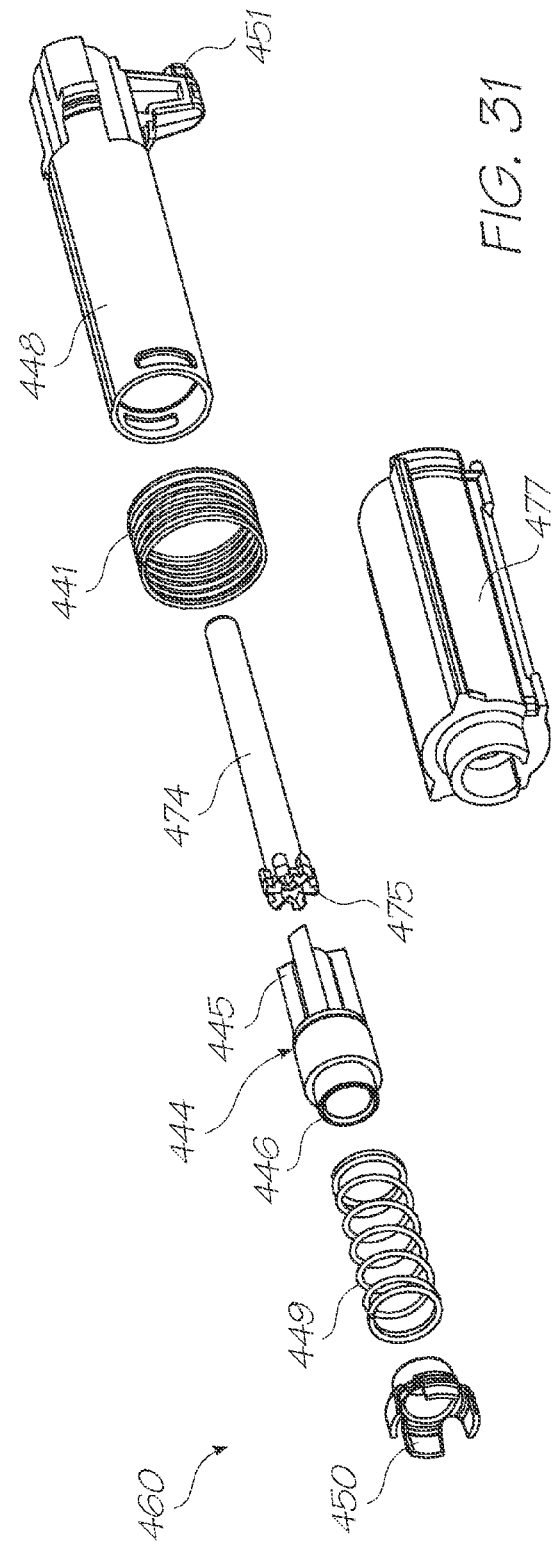

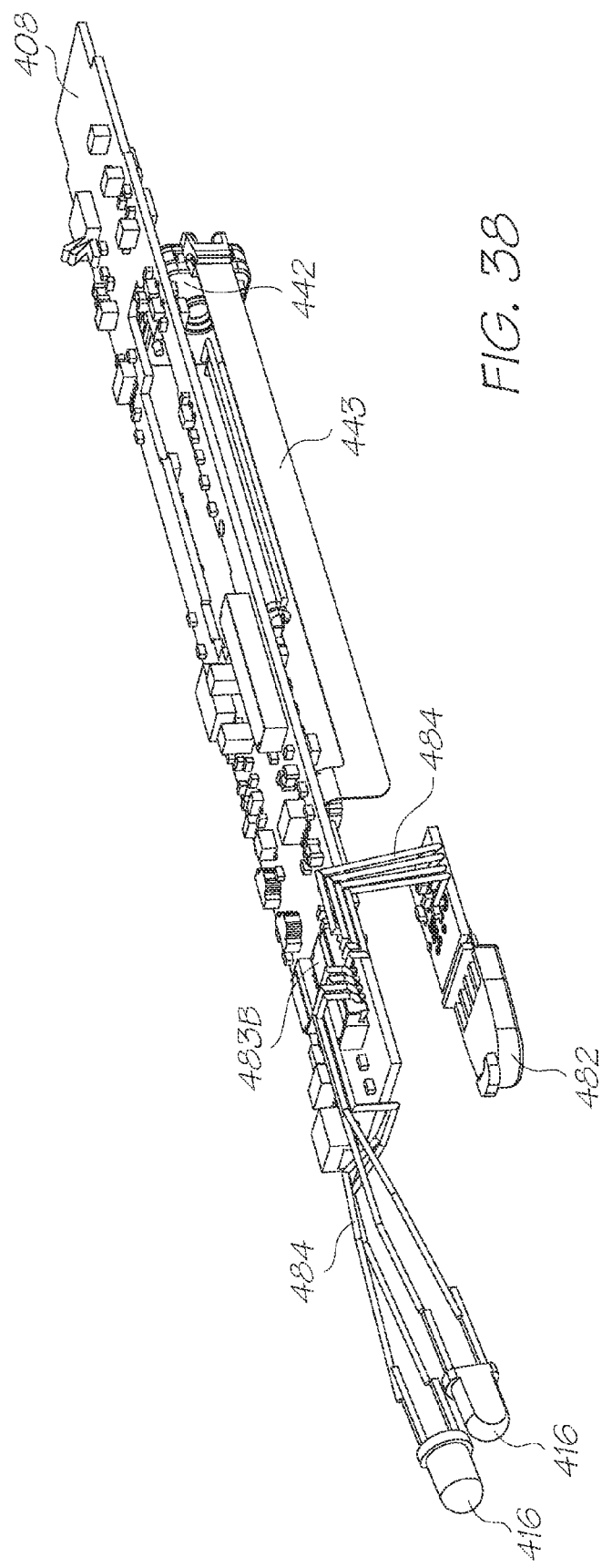
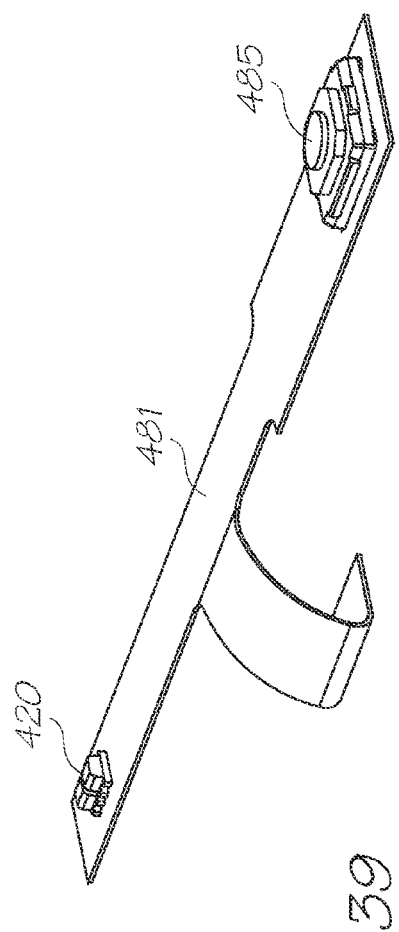

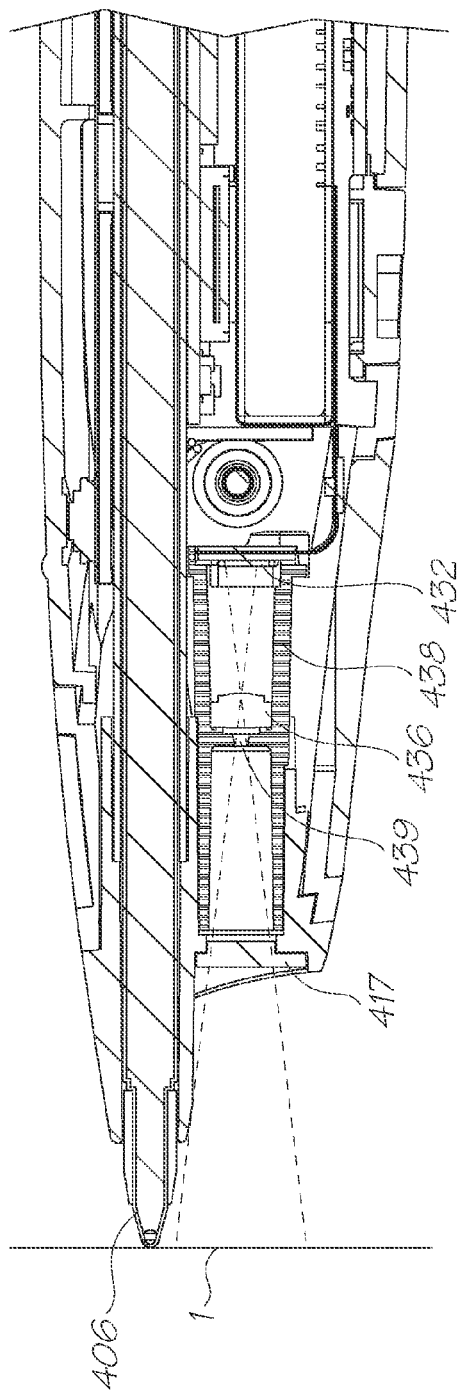
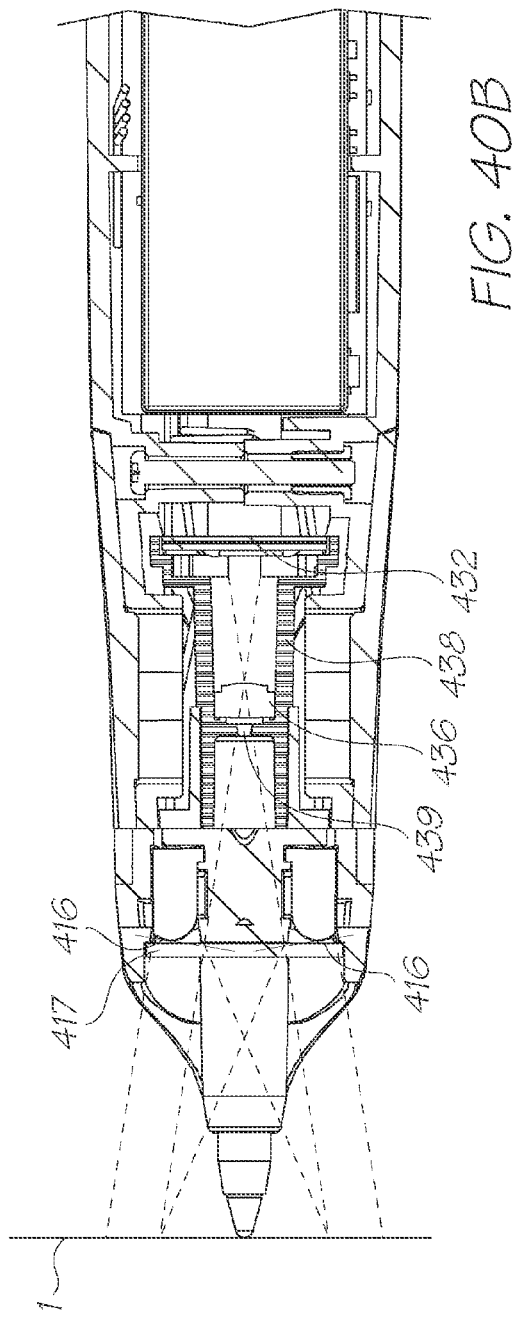

ELECTRONIC PEN WITH RETRACTABLE AND REPLACEABLE CARTRIDGE

FIELD OF THE INVENTION

The present invention relates to electronic pens for interacting with interactive paper. It has been developed to provide an electronic pen having improved interactive functionality, which can be handled and used in the same way as conventional ballpoint pens

COPENDING APPLICATIONS

The following applications have been filed by the Applicant simultaneously with the present application:

| | | | | |
|---|---|---|---|---|
| NPS166US | NPS167US | NPS168US | NPS169US | NPS170US |
| NPS171US | | | | |

The disclosures of these co-pending applications are incorporated herein by cross-reference. Some applications are temporarily identified by their docket number. These will be replaced by the corresponding US application Nos. when available.

CROSS REFERENCES

The following patents and patent applications, filed by the applicant or assignee of the present invention, are hereby incorporated by cross-reference.

| | | | |
|---|---|---|---|
| 6,870,966 | 2005/0024510 | 2006/0028459 | 2007/0040817 |
| 6,808,330 | 2008/0193007 | 2008/0193044 | 12/178,619 |
| 2007/0143715 | | | |

BACKGROUND OF THE INVENTION

The Applicant has developed the Netpage system, which is discussed below and discussed in detail in the cross-referenced documents identified herein. As the invention is particularly well suited to this system, it will be described in a Netpage context. However, it will be appreciated that hand-held optical sensing devices have broad ranging applications in many different fields and the invention is not limited to its use within the Netpage system.

The Netpage system involves the interaction between a user and a computer network (or stand alone computer) via a pen and paper based interface. The 'pen' is an electronic stylus with a marking or non-marking nib and an optical sensor for reading a pattern of coded data on the paper (or other surface).

One of the primary features of the Netpage pen is its ability to 'click' on interactive elements on a Netpage in the same way a mouse can click on screen-based interactive elements (e.g. hyperlinks and so on). However, with a Netpage pen, the user simply puts the nib on the interactive element in order to click on it. The optical sensor identifies the element via its unique page and location ID while a force sensor registers a 'pen down' condition when the nib is pressed against the page. Registering 'pen down' and 'pen up' is also fundamental to capturing the user's handwriting on Netpage input fields. Non-binary force signals are also captured for reproducing hand-drawn strokes with varying force-related width and opacity. Force variation can also be used as one of the parameters examined during signature verification.

The high tolerances and functionality required in force-sensing and image-sensing pens needs to be reconciled with the need for a pen, which is robust and easy for users to handle and transport.

Electronic image-sensing pens manufactured under license from Anoto, Inc. (see U.S. Pat. No. 7,832,361) typically use a force sensitive resistor for measuring nib force. However, force sensitive resistors have relatively long return-to-zero response times and are unsuitable for detecting end-strokes with a high degree of accuracy.

SUMMARY OF THE INVENTION

In a first aspect, there is provided an electronic pen having a retractable nib for interacting with a surface, the pen comprising:
  a slidably movable cartridge having a nib at a first end for contacting the surface, the cartridge being configurable in an extended position, wherein the nib protrudes from a body of the pen, and a retracted position wherein the nib is retracted in the body;
  a retraction mechanism comprising:
    a barrel for receiving an opposite second end of the cartridge, the barrel being adapted for seating the cartridge in either the extended position or the retracted position, whereby a longitudinal axial force from the cartridge is transmitted to the barrel in the extended position; and
    a biasing mechanism for biasing the cartridge towards the extended or retracted positions;
  an actuator coupled to the retraction mechanism, the actuator enabling a user to move the cartridge between the extended and retracted positions;
  a force sensor coupled to the barrel, the force sensor providing a reaction to the axial force transmitted to the barrel from the cartridge; and
  a processor configured for generating force data indicative of a force detected by the force sensor.

The pen provides a convenient means for users to retract the nib using one hand only, whilst still having a high-sensitivity force sensor which can detect the slightest nib forces (e.g. 1-20 g or 5-12 g) when the nib is in the extended position.

Optionally, the pen further comprises an image sensor for imaging at least some of a coded data pattern disposed on the surface, wherein the processor is configured for generating interaction data using one or more imaged portions of the coded data pattern.

Optionally, the processor is configured to determine, using the force data, either one of:
  a pen-down state when the nib is in contact with the surface; and
  a pen-up state when the nib is not in contact with the surface.

Optionally, the processor is configured to indicate a pen-down state only if the force exceeds a predetermined threshold force.

Optionally, the processor is configured to generate the interaction data only when a pen-down state has been determined Optionally, the image sensor is configured to sense the coded data only when a pen-down state has been determined.

Optionally, the actuator comprises a manually-operable button coupled to the cartridge, wherein depression and release of the button switches the cartridge between the retracted and extended positions.

Optionally, the pen comprises a sensing arrangement for sensing a configuration of the pen, the sensing arrangement comprising:
   a button sensor coupled to the button, the button sensor sensing actuation of the button; and
   a cartridge sensor cooperating with the cartridge, the cartridge sensor sensing whether the cartridge is extended or retracted,
wherein the processor is adapted to configure a state of the pen in response to one or more input signals from the sensing arrangement.

Optionally, the button sensor comprises an electronic switch, the switch being mechanically actuable by part of the button.

Optionally, the barrel comprises a longitudinally slidable ratchet for retaining the second end of the cartridge, the ratchet comprising a plurality of radial ratchet-teeth for longitudinal sliding engagement with complementary longitudinal grooves defined in an inner surface of the barrel.

Optionally, the cartridge is replaceable and the ratchet is configured for releasably retaining the second end of the cartridge.

Optionally, each longitudinal groove has a cammed lip configured such that abutting engagement of a first cammed end-surface of the ratchet-teeth onto the lip causes rotation of the ratchet.

Optionally, the barrel comprises a first abutment surface corresponding to the extended position and a second abutment surface corresponding to the retracted position, the ratchet being rotatable and slidable towards the first or second abutment surface.

Optionally, the button is coupled to the ratchet via a plunger, the plunger comprising a plurality of radial plunger-teeth slidingly engaged in the longitudinal grooves, each plunger-tooth having a second cammed end-surface for abutting engagement with the first cammed end-surfaces of the ratchet-teeth, the first and second cammed end surfaces being configured to impart rotation to the ratchet.

Optionally, the button is biased towards a decoupled position in which the button is decoupled from the plunger.

Optionally, the barrel comprises an integral pin engaged with the force sensor, wherein a longitudinal axial force transmitted through the cartridge is detected by the force sensor via the pin.

Optionally, the force sensor is a capacitive force sensor, the pin being engaged with a resilient moving plate of the capacitive force sensor.

Optionally, the pen comprises a preload bias assembly for biasing the barrel and thereby the pin towards engagement with the force sensor.

Optionally, the pen comprises a housing for the barrel, wherein the preload bias assembly comprises a preload spring engaged between the housing and the barrel.

Optionally, the cartridge is selected from any one of:
   an ink cartridge comprising an ink reservoir for supplying ink to the nib, wherein the nib is a marking nib; and
   a stylus cartridge wherein the nib is a non-marking nib.

In a second aspect, there is provided an electronic pen for interacting with a surface, the pen comprising:
   a cartridge having a nib for contacting the surface;
   a capacitive force sensor, cooperating with the cartridge, for sensing a nib force transmitted axially through the cartridge; and
   a processor configured to generate force data indicative of a force detected by the force sensor,
wherein the capacitive force sensor comprises:
   a spring having an integral conductive moving plate, the spring resiliently biasing the moving plate towards a reference position;
   a conductive fixed plate; and
   a dielectric separating the plates.

The pen according to the second aspect advantageously provides fast response times (e.g. 0.1-5 ms or 0.5-2 ms) and, in particular, fast return-to-zero response times. These fast response times are necessary when capturing a continuous stream of digital ink during handwritten input on a page. The capacitive force sensor defined in the second aspect may be incorporated into any of the electronic pens described herein. It is particularly suitable for use in electronic pens having retractable cartridges.

Optionally, the spring is comprised of a material selected from the group consisting of: stainless steel and beryllium-copper alloy.

Optionally, the nib force moves the moving plate towards the fixed plate.

Optionally, the nib force moves the moving plate away from the fixed plate.

Optionally, the spring comprises one or more spring arms supporting the moving plate.

Optionally, the one or more spring arms extend radially, circumferentially or spirally from the moving plate to an outer annular support.

Optionally, the moving plate and the one or more spring arms are coplanar in the reference position.

Optionally, the moving plate and the one or more spring arms are formed from a single blank of material.

Optionally, the dielectric comprises air and a polymer.

Optionally, the polymer is polyimide.

Optionally, the moving plate and the fixed plate are separated by a rigid spacer.

Optionally, the nib is retractable within a body of the pen.

Optionally, the cartridge is coupled to the force sensor via a retraction mechanism.

Optionally, the retraction mechanism comprises a user-operable button for retracting and extending the nib.

In a third aspect, there is provided an electronic pen comprising:
   a user-replaceable cartridge having a nib at a first end and an opposite second end;
   a force sensor for sensing a nib force transmitted axially through the cartridge from the nib;
   a retraction mechanism comprising:
   a barrel for receiving the second end of the cartridge, the barrel being adapted for seating the cartridge in either an extended position or a retracted position, the barrel being engaged with the force sensor; and
   a first biasing means for biasing the cartridge towards the extended or retracted positions; and
   a second biasing means for biasing the barrel towards engagement with the force sensor.

Advantageously, the use of two biasing means in the pen enables convenient nib retraction/extension whilst still allowing extraction and replacement of the cartridge from the pen without damaging the force sensor.

Optionally, the barrel comprises a boot for releasably retaining the second end of the cartridge.

Optionally, the boot is longitudinally slidable into either the extended position or the retracted position.

Optionally, the cartridge is extractable from the boot, and thereby the pen, by pulling the cartridge against the bias of the first biasing means.

Optionally, the first biasing means comprises a spring engaged between the barrel and the boot.

Optionally, the barrel comprises an end-stop abutment surface and the boot is configured to release the cartridge upon engagement with the end-stop abutment surface.

Optionally, the second biasing means is configured to maintain the barrel in engagement with the force sensor when the boot is engaged with the end-stop abutment surface of the barrel.

Optionally, the boot comprises a retaining sheath for retaining the second end of the cartridge.

Optionally, the pen further comprises a manually-operable button coupled to the retraction mechanism.

Optionally, the pen further comprises a housing for the barrel, wherein the second biasing means comprises a spring engaged between the barrel and the housing.

In a fourth aspect, there is provided an electronic pen for interacting with a surface, the pen comprising:
- a retractable cartridge having a nib;
- an automatic retraction mechanism for automatically retracting the cartridge such that the nib is retracted within a body of the pen; and
- a first processor for controlling the automatic retraction mechanism, wherein the first processor is configured to automatically retract the cartridge in response to one or more predetermined pen conditions.

The pen according to the fourth aspect advantageously minimizes damage to the pen by retracting the nib under a set of predetermined pen conditions. For example, accelerometers may detect when the pen is in freefall, and signal to the pen to automatically retract the nib before impact in order to minimize damage.

Optionally, the pen comprises one or more input sensors for sensing the one or more pen conditions, the one or more input sensors providing one or more input signals to the first processor.

Optionally, the one or more input sensors are selected from the group consisting of:
- a force sensor coupled to the cartridge, the force sensor sensing a nib force transmitted axially through the cartridge from the nib;
- a nib switch coupled to the cartridge, the nib switch being actuated when a predetermined force is exerted on the nib; and
- an image sensor for imaging at least some of a coded data pattern disposed on the surface, wherein the first processor and/or a second processor is configured for generating interaction data using one or more imaged portions of the coded data pattern.

Optionally, the first processor is configured to automatically retract the cartridge if the first processor determines any one of:
- the nib force is greater than a predetermined threshold force
- the surface is not coded with the coded data pattern;
- a quality of the coded data pattern falls below a predetermined threshold;
- a quality of the interaction data falls below a predetermined threshold;
- a buffer for storing the interaction data is full;
- a buffer for storing the interaction data has available memory which is lower than a predetermined threshold;
- the pen is moved relative to the surface with a speed exceeding a predetermined threshold; and
- the pen is tilted relative to the surface with a tilt exceeding a predetermined threshold.

Optionally, the one or more input sensors comprises at least one sensor selected from the group consisting of: an accelerometer, a timer, an environmental temperature sensor, an environmental humidity sensor, a battery status sensor and a connectivity sensor.

Optionally, the first processor is configured to automatically retract the cartridge if the first processor determines any one of:
- the pen is in freefall motion;
- the pen experiences an impact shock;
- a period of inactivity exceeds a predetermined threshold;
- an environmental temperature exceeds a predetermined threshold;
- an environmental humidity exceeds a predetermined threshold.
- a battery capacity is lower than a predetermined threshold;
- a connection to a remote computer system or network is broken.

Optionally, retraction of the cartridge configures the pen in a power-down state.

Optionally, a user-operable switch is coupled to the automatic retraction mechanism and/or the first processor.

Optionally, the pen comprises an extension mechanism for extending the cartridge, such that the nib protrudes from the body of the pen.

Optionally, extension of the cartridge configures the pen in a power-up state whereby the force sensor is responsive to detecting the nib force, the image sensor is responsive to imaging the coded data pattern and/or the processor is responsive to generating interaction data.

Optionally, the extension mechanism is disabled if the first processor determines that a nib disablement condition exists.

Optionally, the extension mechanism is an automatic extension mechanism for automatically extending the cartridge.

Optionally, the automatic retraction mechanism comprises the automatic extension mechanism.

Optionally, the retraction/extension mechanism is coupled to a user-operable switch, and wherein the effect of the switch depends on whether the cartridge is extended or retracted.

Optionally, the pen comprises a manual extension mechanism.

Optionally, the pen further comprises a manual retraction mechanism.

Optionally, the automatic retraction mechanism comprises a motor coupled to a cartridge retraction mechanism.

Optionally, the automatic retraction mechanism comprises a motor coupled to a force sensor assembly, wherein the force sensor assembly is coupled to the cartridge.

Optionally, the automatic retraction mechanism comprises an actuator configured for releasing a cartridge assembly from a catch, the cartridge assembly comprising the cartridge, wherein the cartridge assembly is biased towards a retracted position.

In a fifth aspect, there is provided an electronic pen comprising:
- a retractable cartridge having a nib at a first end for contacting a surface, the cartridge being configurable in an extended position, wherein the nib protrudes from a body of the pen, and a retracted position wherein the nib is retracted in the body;
- a retraction mechanism for extending and retracting the cartridge;
- a button for actuating the retraction mechanism;
- a sensing arrangement for sensing a configuration of the pen, the sensing arrangement comprising:
  - a button sensor coupled to the button, the button sensor sensing actuation of the button; and a cartridge sensor cooperating with the cartridge, the cartridge sensor sensing whether the cartridge is extended or retracted; and a processor cooperating with the sensing arrangement, the processor being adapted to configure a state of the pen in response to one or more input signals from the sensing arrangement.

The pen according to the fifth aspect advantageously saves battery power by powering down the pen when it is detected that the pen is not in use. The button sensor and the cartridge sensor work in conjunction to provide the requisite input signals to the processor.

Optionally, the processor is adapted to configure the pen in either an active state or a quiescent state in response to the one or more input signals from the sensing arrangement.

Optionally, the button sensor comprises an electronic switch, the switch being mechanically actuable by part of the button.

Optionally, the cartridge sensor comprises an optical sensor.

Optionally, the optical sensor is positioned for sensing at least part of the cartridge.

Optionally, the cartridge comprises first and second optically detectable regions, the first and second regions being distinguishable by the optical sensor so that sensing of the first region indicates an extended position and sensing of the second region indicates a retracted position Optionally, either one of the first or second regions is marked so as to contrast optically with a body of the cartridge.

Optionally, the pen comprises an image sensor for imaging at least some of a coded data pattern disposed on the surface, wherein the processor is configured for generating interaction data using one or more imaged portions of the coded data pattern.

Optionally, the image sensor is configured to sense the coded data pattern only if the processor has determined that the nib is in the extended position.

Optionally, the sensing arrangement further comprises a force sensor for sensing a nib force transmitted axially through the cartridge from the nib, wherein the processor is configured to generate force data indicative of the nib force.

Optionally, the processor is configured to determine, using the force data, either one of:

a pen-down state when the nib is in contact with the surface; and a pen-up state when the nib is not in contact with the surface.

Optionally, the image sensor is configured to sense the coded data pattern only if the processor has determined a pen-down state.

Optionally, the processor is configured to generate the interaction data only if the processor has determined a pen-down state.

Optionally, the sensing arrangement further comprises a timer.

Optionally, the processor is adapted to configure the pen in a quiescent state if the timer indicates that a predetermined threshold period of inactivity has been exceeded.

Optionally, the retraction mechanism comprises:

a barrel for receiving a second end of the cartridge opposite the first end, the barrel being adapted for seating the cartridge in either the extended position or the retracted position; and a biasing mechanism for biasing the cartridge towards the extended or retracted positions.

Optionally, the barrel comprises a boot for releasably retaining the second end of the cartridge.

Optionally, the boot comprises a retaining sheath for retaining the second end of the cartridge.

Optionally, the boot is longitudinally slidable into either the extended position or the retracted position.

In a sixth aspect, there is provided an electronic pen comprising:

a retractable cartridge having a nib at a first end for contacting a surface, the cartridge being configurable in an extended position, wherein the nib protrudes from a body of the pen, and a retracted position wherein the nib is retracted in the body;

a force-actuable device, the device being actuated by a nib force transmitted axially through the cartridge from the nib;

a retraction mechanism comprising a barrel for receiving an opposite second end of the cartridge, the barrel being adapted for seating the cartridge in either an extended position or a retracted position, the barrel being engaged with the force-actuable device;

a button for actuating the retraction mechanism; and a decoupling mechanism for biasing the button away from coupled engagement with the retraction mechanism and thereby the force-actuable device.

In the pen according to the sixth aspect, the accuracy of the force-actuable device (e.g. force sensor) is advantageously improved by biasing the actuation button away from the retraction mechanism and thereby the force-actuable device engaged with the retraction mechanism.

Optionally, the force-actuable device is selected from the group consisting of:

a force sensor coupled to the cartridge for sensing a nib force transmitted axially through the cartridge from the nib; and a nib switch coupled to the cartridge, the nib switch being actuated when a predetermined force is exerted on the nib.

Optionally, the pen comprises a processor configured for generating force data indicative of a force sensed by the force sensor.

Optionally, manual actuation of the button couples the button to the retraction mechanism against a bias of the decoupling mechanism.

Optionally, the decoupling mechanism comprises a decoupling spring engaged between the button and a support surface.

Optionally, the button is couplable to the retraction mechanism via abutting engagement with a slidably movable plunger, the plunger passing through a grommet supported by the pen body, wherein the grommet defines the support surface.

Optionally, the retraction mechanism comprises:

a barrel comprising a first abutment surface corresponding to the extended position and a second abutment surface corresponding to the retracted position; and a ratchet slidably mounted in the barrel for retaining the second end of the cartridge, wherein the plunger abuts with the ratchet such that actuation and release of the button causes sliding and rotating movement of the ratchet towards the first or second abutment surface.

Optionally, a first biasing means biases the ratchet towards the first or second abutment surface against the decoupling bias of the decoupling biasing means.

Optionally, the ratchet comprises a retaining sheath for releasably retaining the second end of the cartridge.

Optionally, the cartridge is extractable from the retaining sheath, and thereby the pen, by pulling the cartridge against the bias of the first biasing means.

Optionally, comprises an end-stop abutment surface and the retaining sheath is configured to release the cartridge upon engagement with the end-stop abutment surface.

Optionally, the pen further comprises a second biasing means for biasing the barrel towards engagement with the force sensor.

Optionally, the second biasing means is configured to maintain the barrel in engagement with the force sensor.

Optionally, the pen further comprises a housing for the barrel, wherein the second biasing means comprises a preload spring engaged between the barrel and the housing.

Optionally, the pen comprises a sensing arrangement for sensing a configuration of the pen, the sensing arrangement comprising:
- a button sensor coupled to the button, the button sensor sensing actuation of the button; and
- a cartridge sensor cooperating with the cartridge, the cartridge sensor sensing whether the cartridge is extended or retracted, wherein the processor is adapted to configure a state of the pen in response to one or more input signals from the sensing arrangement.

Optionally, the force sensor described herein in respect of the first, third, fourth, fifth and sixth aspects is a capacitive force sensor as defined in respect of the second aspect (and any optional embodiments thereof).

As used herein, the term "cartridge" is used to refer to either an ink cartridge or a stylus cartridge. An ink cartridge has a marking nib at one end and contains an ink reservoir for supplying ink to the marking nib. A stylus cartridge has a non-marking nib at one end and does not contain an ink reservoir, the stylus cartridge being in employed in pointing instruments rather than writing instruments. Either type of cartridge is typically an elongate shaft having a longitudinal axis and a nib at one end. The cartridge is usually right-cylindrical, although other forms are of course possible and within the ambit of the present invention. Ink cartridges and stylus cartridges are typically interchangeably replaceable in the electronic pens (e.g. Netpage pens) described herein. Hence a stylus pen comprising a stylus cartridge may be converted into a marking pen comprising an ink cartridge and vice versa.

BRIEF DESCRIPTION OF THE DRAWINGS

Embodiments of the invention will now be described by way of example only with reference to the accompanying drawings in which:

FIG. 30 is a perspective view of a ballpoint pen cartridge;
FIG. 31 is an exploded view of a nib retraction assembly for the pen;
FIG. 38 is a perspective view of a cradle contacts leadframe insert for the pen;
FIG. 39 is a perspective view of a gesture flex PCB for the pen;
FIGS. 40A and 40B are longitudinal sections through pen optics.

DETAILED DESCRIPTION

As discussed above, the invention is well suited for incorporation in the Assignee's Netpage system. In light of this, the invention has been described as a component of a broader Netpage architecture. However, it will be readily appreciated that electronic pens have much broader application in many different fields. Accordingly, the present invention is not necessarily restricted to a Netpage context.

1.1 Netpage System Architecture

In a preferred embodiment, the invention is configured to work with the netpage networked computer system, a detailed overview of which follows. It will be appreciated that not every implementation will necessarily embody all or even most of the specific details and extensions discussed below in relation to the basic system. However, the system is described in its most complete form to reduce the need for external reference when attempting to understand the context in which the preferred embodiments and aspects of the present invention operate.

In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper, but which work like interactive webpages. A surface coding pattern is printed on each page using ink which is substantially invisible to the unaided human eye. The ink, however, and thereby the coding pattern, can be sensed by an optically imaging sensing device and transmitted to the netpage system.

Figure 1:
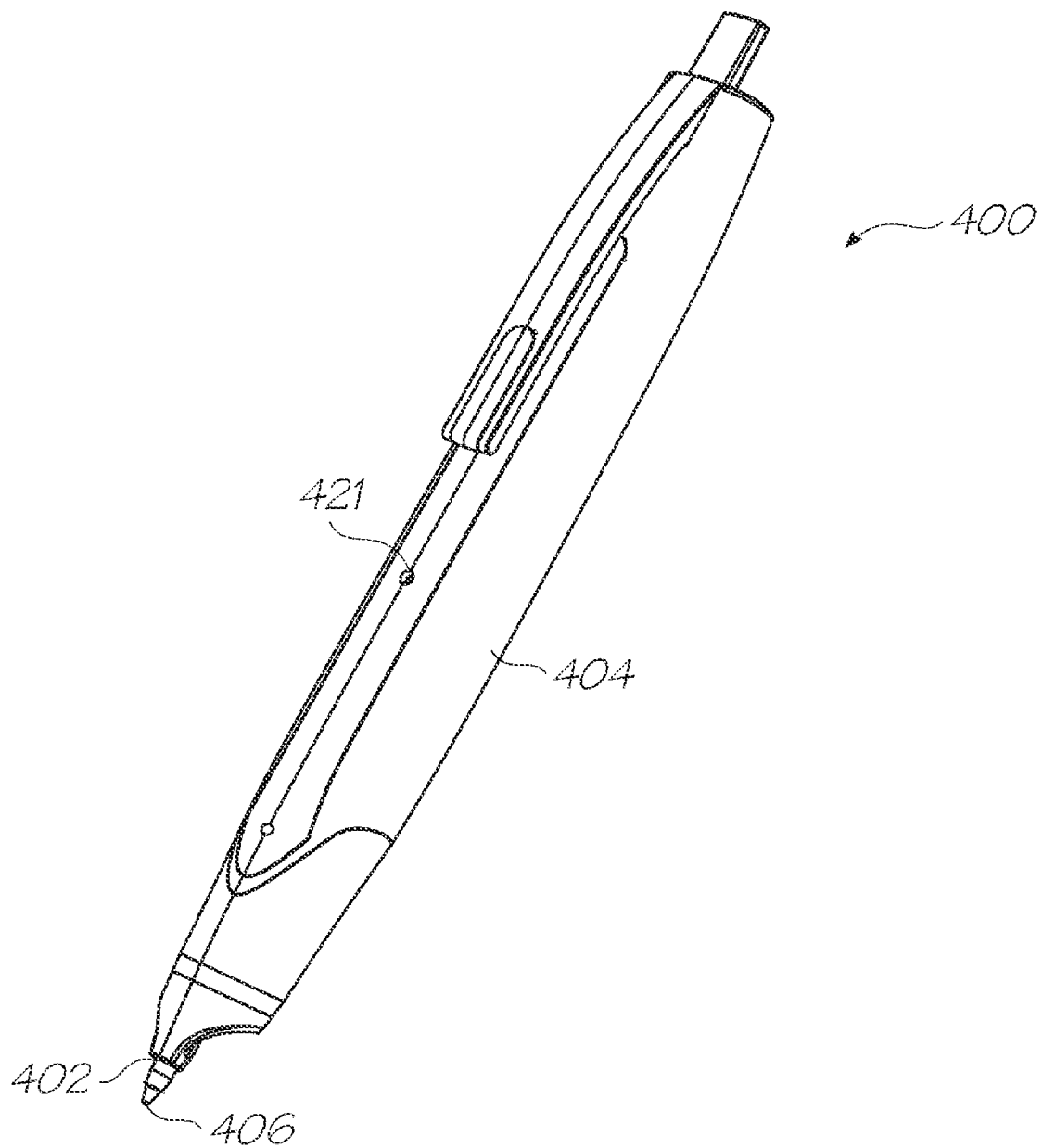
FIG. 1 is a perspective view of a Netpage pen.
Figure 2:
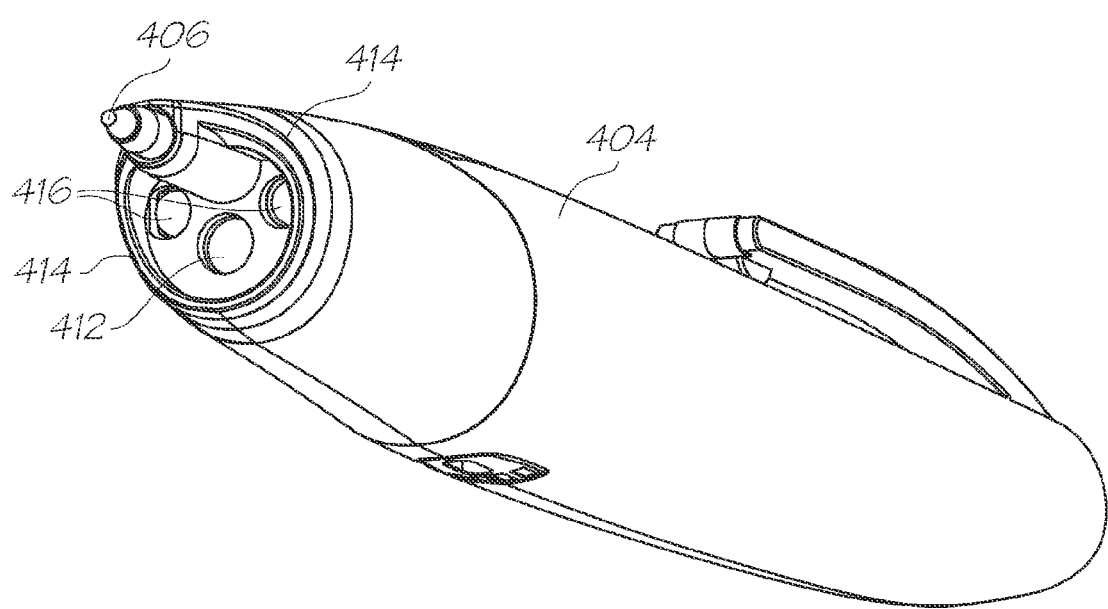
FIG. 2 is a perspective view of a nib end of the Netpage pen.

In the present invention, the optically imaging sensing device takes the form of a pen 400, as shown in FIG. 1. Referring to FIG. 2, the pen 400 has a retractable nib 406 and an imaging system comprising a pair of near-infrared illumination LEDs 416 for illuminating the surface coding pattern and an optics system 412 for acquiring an image of the surface coding pattern. The pen 400 will be described in more detail in Section 3 below.

In one embodiment of the Netpage system, active buttons and hyperlinks on each page can be clicked with the pen 400 to request information from the network or to signal preferences to a network server. In another embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized. In other embodiments, text on a netpage may be clicked or gestured to initiate a search based on keywords indicated by the user. The netpage pen may incorporate a gesture button to indicate a gesture interaction with a netpage surface. Gesture-based interactions are described in more detail in US 2007/0143715, the contents of which is herein incorporated by reference.

Figure 3:
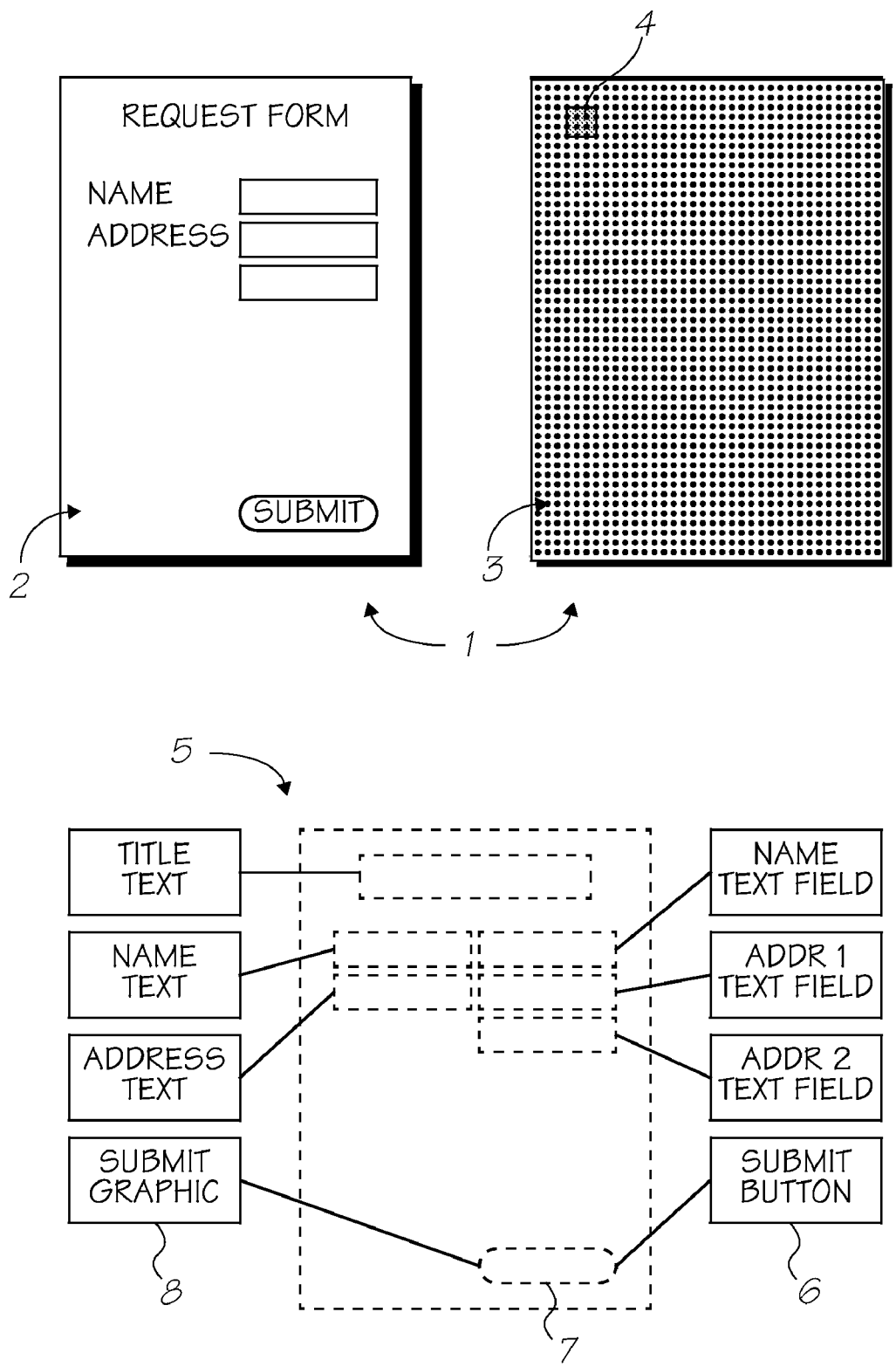
FIG. 3 is a schematic of a the relationship between a sample printed netpage and its online page description.

As illustrated in FIG. 3, a printed netpage 1 can represent a interactive form which can be filled in by the user both physically, on the printed page, and "electronically", via communication between the pen and the netpage system. The example shows a "Request" form containing name and address fields and a submit button. The netpage 1 consists of graphic data 2, printed using visible ink, and a surface coding pattern 3 superimposed with the graphic data. The surface coding pattern 3 comprises a plurality of tags 4. One such tag 4 is shown in the shaded region of FIG. 3, although it will be appreciated that contiguous tags 4, defined by the coding pattern 3, are densely tiled over the whole netpage 1.

A corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 4:
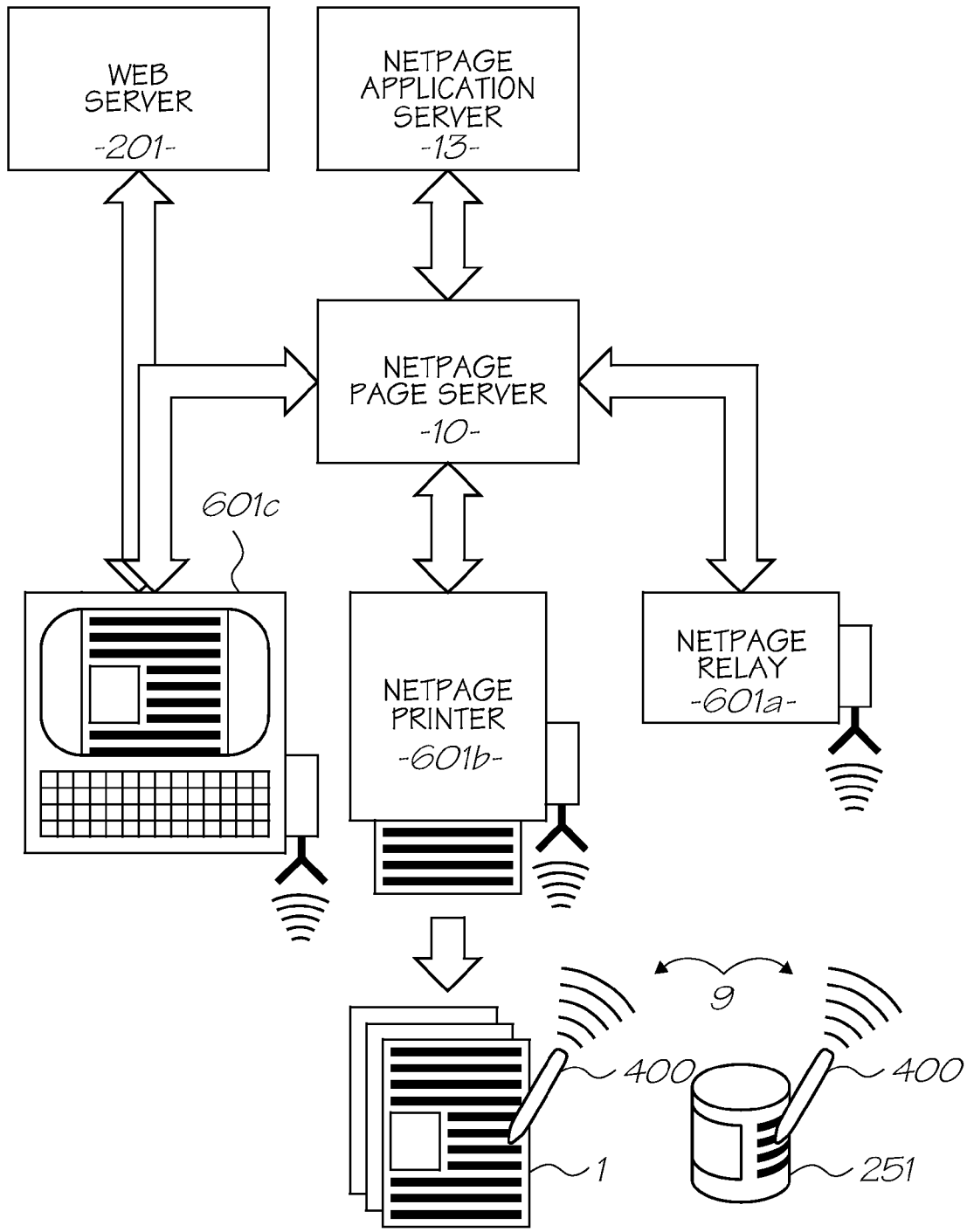
FIG. 4 shows an embodiment of basic netpage architecture with various alternatives for the relay device.

As illustrated in FIG. 4, a netpage sensing device, such as the pen 400 described in Section 3, usually works in conjunction with a netpage relay device 601, which is an Internet-connected device for home, office or mobile use. The pen 400 is wireless and communicates securely with the netpage relay device 601 via a short-range radio link 9. In an alternative embodiment, the netpage pen 400 utilises a wired connection, such as a USB or other serial connection, to the relay device 601. In a further alternative embodiment, the netpage pen 400 may have an onboard computer system for interpreting interaction data without reference to a remote Netpage server 10.

The relay device 601 performs the basic function of relaying interaction data to a page server 10, which interprets the interaction data. As shown in FIG. 4, the relay device 601 may, for example, take the form of a personal computer 601*a*, a netpage printer 601*b* or some other relay 601*c* (e.g. personal computer or mobile phone incorporating a web browser).

The netpage printer 601*b* is able to deliver, periodically or on demand, personalized newspapers, magazines, catalogs, brochures and other publications, all printed at high quality as interactive netpages. Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions. Netpages printed on-demand at their point of consumption combine the ease-of-use of paper with the timeliness and interactivity of an interactive medium.

Alternatively, the netpage relay device 601 may be a portable device, such as a mobile phone or PDA, a laptop or desktop computer, or an information appliance connected to a shared display, such as a TV. If the relay device 601 is not a netpage printer 601*b* which prints netpages digitally and on demand, the netpages may be printed by traditional analog printing presses, using such techniques as offset lithography, flexography, screen printing, relief printing and rotogravure, as well as by digital printing presses, using techniques such as drop-on-demand inkjet, continuous inkjet, dye transfer, and laser printing.

As shown in FIG. 4, the netpage sensing device 400 interacts with a portion of the tag pattern on a printed netpage 1, or other printed substrate such as a label of a product item 251, and communicates, via a short-range radio link 9, the interaction to the relay device 601. The relay 601 sends corresponding interaction data to the relevant netpage page server 10 for interpretation. Raw data received from the sensing device 400 may be relayed directly to the page server 10 as interaction data. Alternatively, the interaction data may be encoded in the form of an interaction URI and transmitted to the page server 10 via a user's web browser 601*c*. The web browser 601*c* may then receive a URI from the page server 10 and access a webpage via a webserver 201. In some circumstances, the page server 10 may access application computer software running on a netpage application server 13.

The netpage relay device 601 can be configured to support any number of sensing devices, and a sensing device can work with any number of netpage relays. In the preferred implementation, each netpage sensing device 400 has a unique identifier. This allows each user to maintain a distinct profile with respect to a netpage page server 10 or application server 13.

Digital, on-demand delivery of netpages 1 may be performed by the netpage printer 601b, which exploits the growing availability of broadband Internet access. Netpage publication servers 14 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage pen may be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. One version of the netpage pen includes fingerprint scanning, verified in a similar way by the netpage registration server.

1.2 Netpages

Netpages are the foundation on which a netpage network is built. They provide a paper-based user interface to published information and interactive services.

As shown in FIG. 3, a netpage consists of a printed page (or other surface region) invisibly tagged with references to an online description 5 of the page. The online page description 5 is maintained persistently by the netpage page server 10. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages (for example, those printed by analog printing presses) can share the same page description. However, to allow input through otherwise identical pages to be distinguished, each netpage may be assigned a unique page identifier. This page ID has sufficient precision to distinguish between a very large number of netpages.

Each reference to the page description 5 is repeatedly encoded in the netpage pattern. Each tag (and/or a collection of contiguous tags) identifies the unique page on which it appears, and thereby indirectly identifies the page description 5. Each tag also identifies its own position on the page. Characteristics of the tags are described in more detail below.

Tags are typically printed in infrared-absorptive ink on any substrate which is infrared-reflective, such as ordinary paper, or in infrared fluorescing ink. Near-infrared wavelengths are invisible to the human eye but are easily sensed by a solid-state image sensor with an appropriate filter.

A tag is sensed by a 2D area image sensor in the netpage sensing device, and the tag data is transmitted to the netpage system via the nearest netpage relay device 601. The pen 400 is wireless and communicates with the netpage relay device 601 via a short-range radio link. It is important that the pen recognize the page ID and position on every interaction with the page, since the interaction is stateless. Tags are error-correctably encoded to make them partially tolerant to surface damage.

The netpage page server 10 maintains a unique page instance for each unique printed netpage, allowing it to maintain a distinct set of user-supplied values for input fields in the page description 5 for each printed netpage 1.

2 Netpage Tags

2.1 Tag Data Content

Each tag 4 identifies an absolute location of that tag within a region of a substrate.

Each interaction with a netpage should also provide a region identity together with the tag location. In a preferred embodiment, the region to which a tag refers coincides with an entire page, and the region ID is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

As described in the Applicant's previous applications (e.g. U.S. Pat. No. 6,832,717), the region identity may be encoded discretely in each tag 4. As will be described in more detail below, the region identity may be encoded by a plurality of contiguous tags in such a way that every interaction with the substrate still identifies the region identity, even if a whole tag is not in the field of view of the sensing device.

Each tag 4 should preferably identify an orientation of the tag relative to the substrate on which the tag is printed. Orientation data read from a tag enables the rotation (yaw) of the pen 101 relative to the substrate to be determined A tag 4 may also encode one or more flags which relate to the region as a whole or to an individual tag. One or more flag bits may, for example, signal a sensing device to provide feedback indicative of a function associated with the immediate area of the tag, without the sensing device having to refer to a description of the region. A netpage pen may, for example, illuminate an "active area" LED when in the zone of a hyperlink.

A tag 4 may also encode a digital signature or a fragment thereof. Tags encoding (partial) digital signatures are useful in applications where it is required to verify a product's authenticity. Such applications are described in, for example, US Publication No. 2007/0108285, the contents of which is herein incorporated by reference. The digital signature may be encoded in such a way that it can be retrieved from every interaction with the substrate. Alternatively, the digital signature may be encoded in such a way that it can be assembled from a random or partial scan of the substrate.

It will, of course, be appreciated that other types of information (e.g. tag size etc) may also be encoded into each tag or a plurality of tags, as will be explained in more detail below.

2.2 General Tag Structure

Figure 5:
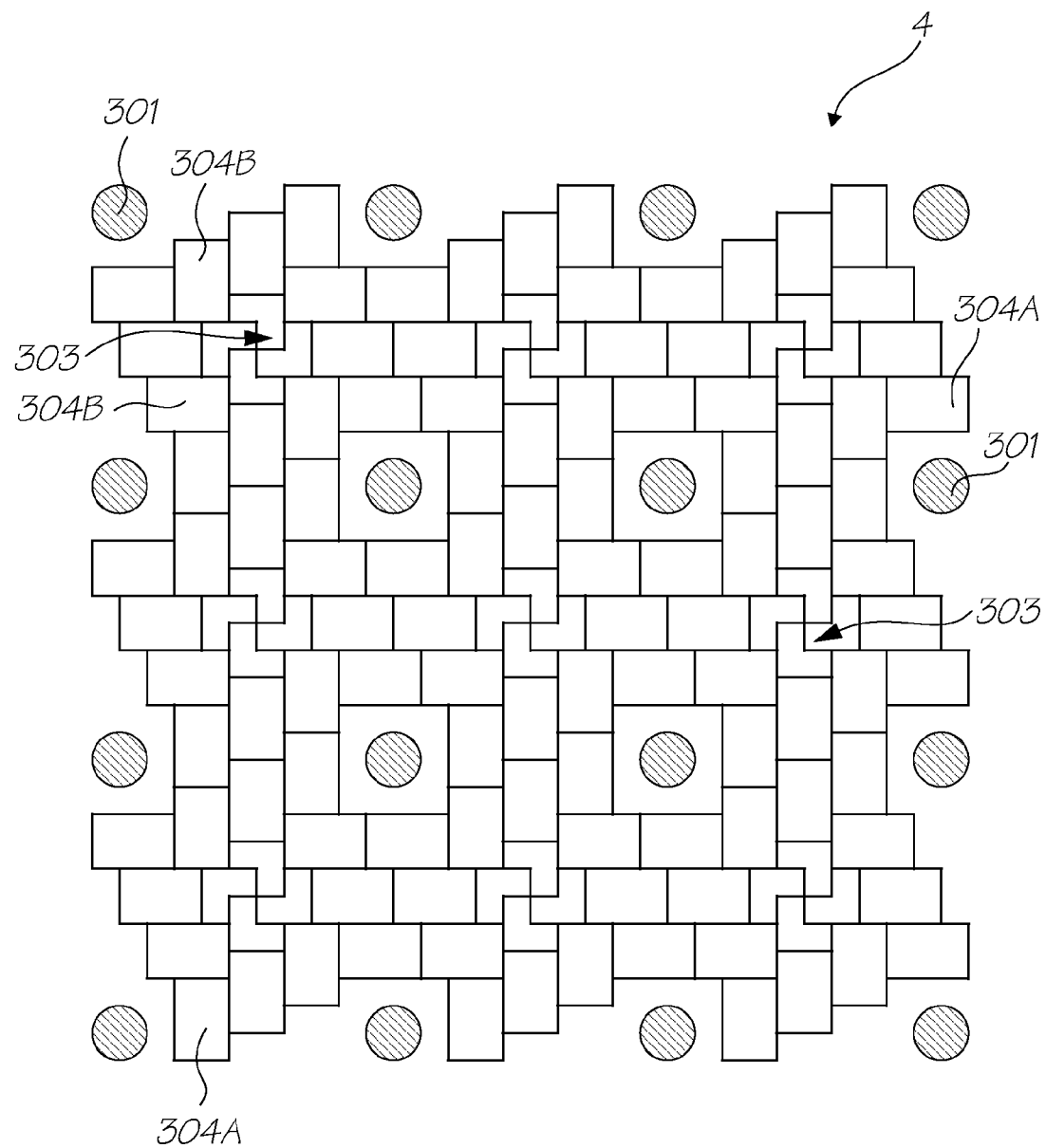
FIG. 5 shows the structure of a tag.
Figure 6:
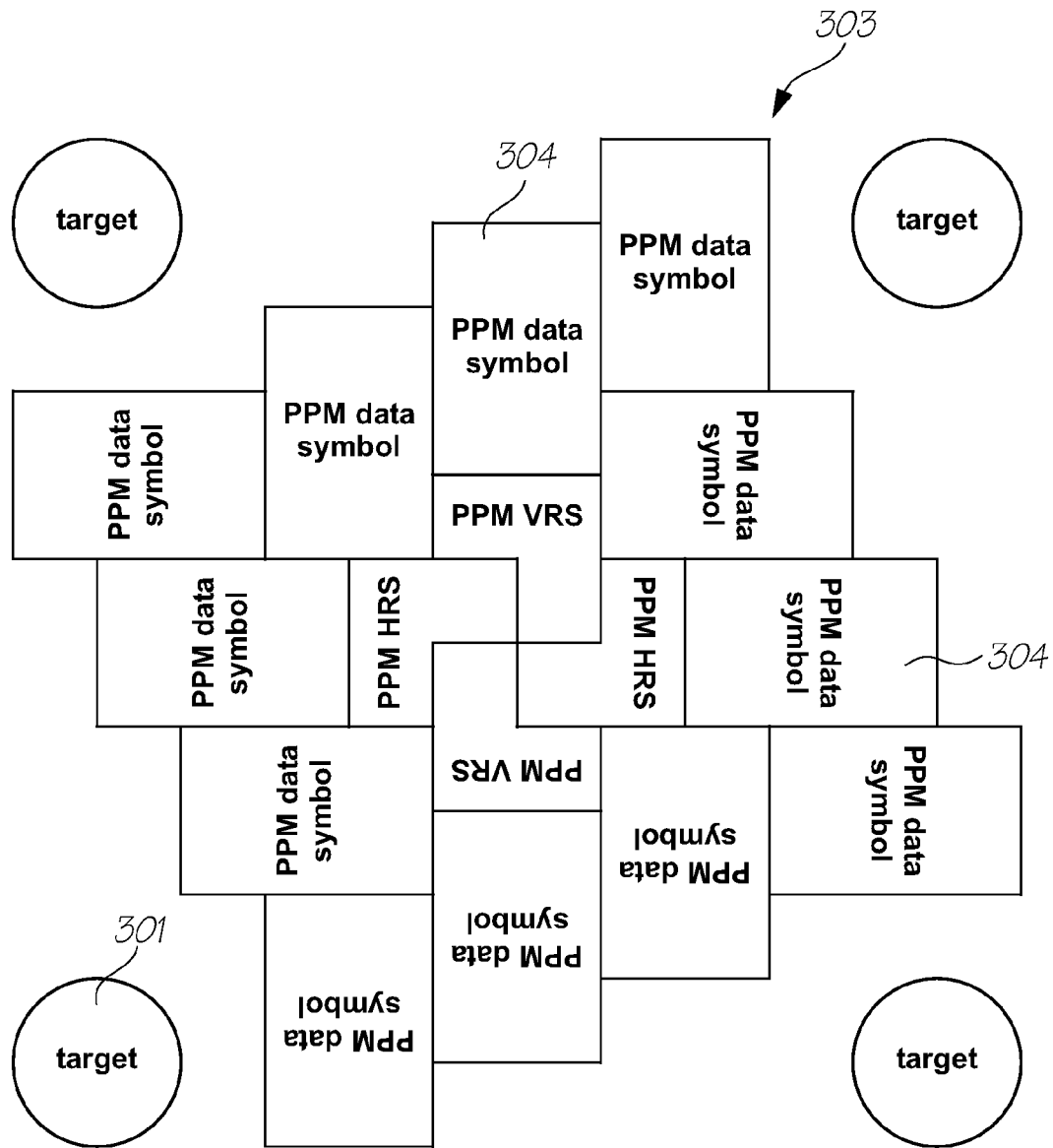
FIG. 6 shows a group of twelve data symbols and four targets.

As described above in connection with FIG. 3, the netpage surface coding generally consists of a dense planar tiling of tags. In the present invention, each tag 4 is represented by a coding pattern which contains two kinds of elements. Referring to FIGS. 5 and 6, the first kind of element is a target element. Target elements in the form of target dots 301 allow a tag 4 to be located in an image of a coded surface, and allow the perspective distortion of the tag to be inferred. The second kind of element is a data element in the form of a macrodot 302 (see FIG. 8). The macrodots 302 encode data values. As described in the Applicant's earlier disclosures (e.g. U.S. Pat. No. 6,832,717), the presence or absence of a macrodot was be used to represent a binary bit. However, the tag structure of the present invention encodes a data value using multi-pulse position modulation, which is described in more detail in Section 2.3.

The coding pattern 3 is represented on the surface in such a way as to allow it to be acquired by an optical imaging system, and in particular by an optical system with a narrowband response in the near-infrared. The pattern 3 is typically printed onto the surface using a narrowband near-infrared ink.

FIG. 5 shows the structure of a complete tag 4 with target elements 301 shown. The tag 4 is square and contains sixteen target elements. Those target elements 301 located at the edges and corners of the tag (twelve in total) are shared by adjacent tags and define the perimeter of the tag. In contrast with the Applicant's previous tag designs, the high number of target elements 301 advantageously facilitates accurate determination of a perspective distortion of the tag 4 when it is imaged by the sensing device 101. This improves the accuracy of tag sensing and, ultimately, position determination.

The tag 4 consists of a square array of nine symbol groups 303. Symbol groups 303 are demarcated by the target elements 301 so that each symbol group is contained within a square defined by four target elements. Adjacent symbol groups 303 are contiguous and share targets.

Since the target elements 301 are all identical, they do not demarcate one tag from its adjacent tags. Viewed purely at the level of target elements, only symbol groups 303, which define cells of a target grid, can be distinguished—the tags 4 themselves are indistinguishable by viewing only the target elements. Hence, tags 4 must be aligned with the target grid as part of tag decoding.

The tag 4 is designed to allow all tag data, with the exception of an embedded data object (see Section 2.9.3), to be recovered from an imaging field of view substantially the size of the tag. This implies that any data unique to the tag 4 must appear four times within the tag—i.e. once in each quadrant or quarter; any data unique to a column or row of tags must appear twice within the tag—i.e. once in each horizontal half or vertical half of the tag respectively; and any data common to a set of tags needs to appear once within the tag.

2.3 Symbol Groups

As shown in FIG. 6, each of the nine symbol groups 303 comprises twelve data symbols 304, each data symbol being part of a codeword. In addition, each symbol group 303 comprises a pair of registration symbols—a vertical registration symbol ('VRS') and a horizontal registration symbol ('HRS'). These allow the orientation and/or translation of the tag in the field of view to be determined. Translation refers to the translation of tag(s) relative to the symbol groups 303 in the field of view. In other words, the registration symbols enable alignment of the 'invisible' tags with the target grid.

Each data symbol 304 is a multi-pulse position modulated (PPM) data symbol. Typically, each PPM data symbol 304 encodes a single 4-bit Reed-Solomon symbol using either 2 or 3 macrodots in any of 6 positions $\{p_0, p_1, p_2, p_3, p_4, p_5\}$, i.e. using 2-6 or 3-6 pulse-position modulation (PPM). However, it will be appreciated that other forms of multi-PPM encoding are equally possible.

3-6PPM has a range of 20 codes, or 4.3 bits, and is used for Reed-Solomon redundancy symbols. 2-6PPM has a range of 15 codes, or 3.9 bits, and is used for Reed-Solomon data symbols. 4-bit Reed-Solomon data symbols are converted to base 15 prior to encoding to reduce the number of required codes per symbol to 15.

Figure 7:
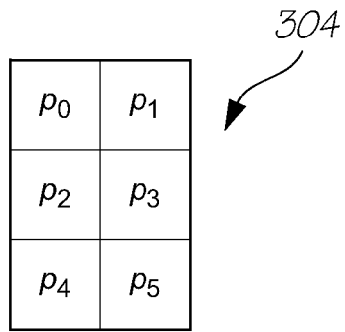
FIG. 7 shows the layout of a 2-6PPM and 3-6PPM data symbol.

FIG. 7 shows the layout for a 2-6PPM or 3-6PPM data symbol 304.

Table 1 defines the mapping from 2-6PPM symbol values to Reed-Solomon symbol values.

TABLE 1

2-6PPM to Reed-Solomon symbol mapping

| 2-6PPM symbol value ($p_5$-$p_0$) | Corresponding Reed-Solomon symbol value (base 15) |
|---|---|
| 000011 | 0 |
| 000101 | 1 |
| 000110 | 2 |
| 001001 | 3 |
| 001010 | 4 |
| 001100 | 5 |
| 010001 | 6 |
| 010010 | 7 |
| 010100 | 8 |
| 011000 | 9 |
| 100001 | a |
| 100010 | b |
| 100100 | c |
| 101000 | d |
| 110000 | e |

Table 2 defines the mapping from 3-6PPM symbol values to Reed-Solomon symbol values. Unused symbol values can be treated as erasures.

TABLE 2

3-6PPM to Reed-Solomon symbol mapping

| 3-6PPM symbol value ($p_5$-$p_0$) | Corresponding Reed-Solomon symbol value (base 16) |
|---|---|
| 000111 | unused |
| 001011 | unused |
| 001101 | 0 |
| 001110 | 1 |
| 010011 | 2 |
| 010101 | 3 |
| 010110 | 4 |
| 011001 | 5 |
| 011010 | 6 |
| 011100 | 7 |
| 100011 | 8 |
| 100101 | 9 |
| 100110 | a |
| 101001 | b |
| 101010 | c |
| 101100 | d |
| 110001 | e |
| 110010 | f |
| 110100 | unused |
| 111000 | unused |

2.4 Targets and Macrodots

Figure 8:
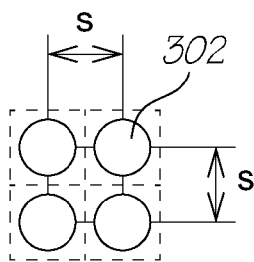
FIG. 8 shows the spacing of macrodot positions.

The spacing of macrodots 302 in both dimensions, as shown in FIG. 8, is specified by the parameter s. It has a nominal value of 127 μm, based on 8 dots printed at a pitch of 1600 dots per inch.

Only macrodots 302 are part of the representation of a symbol 304 in the pattern. The outline of a symbol 304 is shown in, for example, FIGS. 5 and 6 merely to elucidate more clearly the structure of a tag 4.

A macrodot 302 is nominally square with a nominal size of (4/8) s . However, it is allowed to vary in size by ±10% according to the capabilities of the device used to produce the pattern.

A target 301 is nominally circular with a nominal diameter of (12/8) s. However, it is allowed to vary in size by ±10% according to the capabilities of the device used to produce the pattern.

Each symbol group 303 has a width of 10 s. Therefore, each tag 4 has a width of 30 s and a length of 30 s. However, it should be noted from FIG. 5 that the tag 4 is configured so that some data symbols 304A extend beyond the perimeter edge of the tag 4 by one macrodot unit (1 s), and interlock with complementary symbol groups 304B from adjacent tags. This arrangement provides a tessellated pattern of data symbols 304 within the target grid. From a data acquisition standpoint, tessellation of data symbols in this way increases the effective length of each tag 4 by one macrodot unit.

The macrodot spacing, and therefore the overall scale of the tag pattern, is allowed to vary by 127 μm and 120 μm according to the capabilities of the device used to produce the pattern. Any deviation from the nominal scale is recorded in each tag (in a tag size ID field) to allow accurate generation of position samples.

These tolerances are independent of one another. They may be refined with reference to particular printer characteristics.

2.5 Field of View

As mentioned above, the tag 4 is designed to allow all tag data to be recovered from an imaging field of view roughly the size of the tag. Any data common to a set of contiguous tags only needs to appear once within each tag, since fragments of the common data can be recovered from adjacent tags. Any data common only to a column or row of tags must appear twice within the tag—i.e. once in each horizontal half or vertical half of the tag respectively. And any data unique to the tag must appear four times within the tag—i.e. once in each quadrant.

Although data which is common to a set of tags, in one or both spatial dimensions, may be decoded from fragments from adjacent tags, pulse-position modulated values are best decoded from spatially-coherent samples, since this allows raw sample values to be compared without first being normalised. This implies that the field of view must be large enough to contain two complete copies of each such pulse-position modulated value. The tag is designed so that the maximum extent of a pulse-position modulated value is three macrodots. Making the field of view at least as large as the tag plus three macrodot units guarantees that pulse-position modulated values can be coherently sampled.

The only exceptions are the translation codes described in the next section, which are four macrodot units long. However, these are highly redundant and the loss of up to four symbols at the edge of the field of view is not a problem.

2.6 Encoded Codes and Codewords

In this following section (Section 2.6), each symbol in FIGS. 10 to 14 is shown with a unique label. The label consists of an alphabetic prefix which identifies which codeword the symbol is part of, and a numeric suffix which indicates the index of the symbol within the codeword. For simplicity only data symbols 304 are shown, not registration symbols.

Although some symbol labels are shown rotated to indicate the symmetry of the layout of certain codewords, the layout of each symbol is determined by its position within a symbol group and not by the rotation of the symbol label (as described in, for example, the Applicant's US Publication No. 2006/146069).

2.6.1 Registration Symbols

Figure 9:
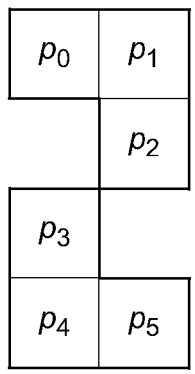
FIG. 9 shows the layout of a 2-6PPM registration symbol.

Each registration symbol is encoded using 2-6PPM. FIG. 9 shows the layout of the registration symbol.

As shown in FIG. 6, the horizontal and vertical registration symbols each appear once within a symbol group. The registration symbols of an entire tag typically indicate the vertical and horizontal translation of the tag by coding two orthogonal translation codes, and the orientation of the tag by coding two orthogonal direction codes.

Each registration symbol also encodes a one-bit symbol of a flag code (see Section 2.6.2).

Table 3 defines the mapping from 2-6PPM registration symbol values to flag code, direction code and translation code symbol values.

TABLE 3

2-6PPM registration symbol values to flag code, direction code and translation code symbol mapping

| 2-6PPM symbol value {$p_5$-$p_0$} | flag code symbol value | direction code symbol value | translation code symbol value |
|---|---|---|---|
| 001, 001 | 0 | 0 | 0 |
| 000, 011 | 1 | | |
| 100, 010 | 0 | 1 | |
| 011, 000 | 1 | | |
| 001, 010 | 0 | 0 | 1 |
| 000, 101 | 1 | | |
| 010, 100 | 0 | 1 | |
| 101, 000 | 1 | | |
| 010, 001 | 0 | 0 | 2 |
| 000, 110 | 1 | | |
| 100, 100 | 0 | 1 | |
| 110, 000 | 1 | | |
| 001, 100 | | unused | |
| 010, 010 | | | |
| 100, 001 | | | |

Each row of symbol groups and each column of symbol groups encodes a three-symbol 3-ary cyclic position code. (The Applicant's cyclic position codes are described in U.S. Pat. No. 7,082,562, the contents of which is herein incorporated by reference). The code consists of the codeword (0, 1, 2) and its cyclic shifts. The code has a minimum distance of 3, allowing a single symbol error to be corrected. The codes of an entire tag form a code with a minimum distance of 9, allowing 4 symbol errors to be corrected. If additional symbols are visible within the field of view then they can be used for additional redundancy.

The translation code symbol in the middle of the codeword (i.e. 1) is mapped to a set of 2-6PPM symbol values that are each other's reverse, while the two translation code symbols at the ends of the codeword (i.e. 0 and 2) are each mapped to a set of 2-6PPM symbol values that are the reverses of the 2-6PPM symbol values in the other set. Thus a 0 read upside-down (i.e. rotated 180 degrees) becomes a 2, and vice versa, while a 1 read upside-down remains a 1. This allows translation to be determined independently of rotation.

Each 2-6PPM symbol value and its reverse map to opposite direction code symbol values. The vertical registration symbols of an entire tag encode 9 symbols of a vertical direction code. This has a minimum distance of 9, allowing 4 symbol errors to be corrected. The horizontal registration symbols of an entire tag encode 9 symbols of a horizontal direction code. This has a minimum distance of 9, allowing 4 symbol errors to be corrected. If additional symbols are visible within the field of view then they can be used for additional redundancy. Any erasures detected during decoding of a translation code can also be used during decoding of a direction code, and vice versa. Together the orthogonal direction codes allow the orientation of the tag to be determined.

The top left corner of an un-rotated tag is identified by a symbol group whose translation symbols are both zero and whose direction symbols are both zero.

2.6.2 Flag Code

The flag symbol consists of one bit of data, and is encoded in each vertical and horizontal registration symbol, as shown in Table 3.

The flag symbol is unique to a tag and is therefore coded redundantly in each quadrant of the tag. Since the flag symbol is encoded in each registration symbol, it appears eight times within each quadrant. Eight symbols form a code with a minimum distance of 8, allowing 3 errors to be corrected. If additional symbols are visible within the field of view then they can be used for additional redundancy. Any erasures detected during decoding of translation and/or direction codes can also be used during decoding of the flag code, and vice versa.

2.6.3 Coordinate Data

The tag contains an x-coordinate codeword and a y-coordinate codeword used to encode the x and y coordinates of the tag respectively. The codewords are of a shortened $2^4$-ary (10, p) Reed-Solomon code, where p can vary from 2 to 5. The tag therefore encodes between 8 and 20 bits of information for each coordinate. This reduces to 7.8 to 19.5 bits once base-15 conversion occurs.

Each x coordinate codeword is replicated twice within the tag—in each horizontal half ("north" and "south"), and is constant within the column of tags containing the tag. Likewise, each y coordinate codeword is replicated twice within the tag—in each vertical half ("east" and "west"), and is constant within the row of tags containing the tag. This guarantees that an image of the tag pattern large enough to contain a complete tag is guaranteed to contain a complete instance of each coordinate codeword, irrespective of the alignment of the image with the tag pattern. The instance of either coordinate codeword may consist of fragments from different tags.

It should be noted that, in the present invention, some coordinate symbols are not replicated and are placed on the dividing line between the two halves of the tag. This arrangement saves tag space since there are not two complete replications of each x-coordinate codeword and each y-coordinate codeword contained in a tag. Since the field of view is at least three macrodot units larger than the tag (as discussed in Section 2.10), the coordinate symbols placed on the dividing line (having a width 2 macrodot units) are still captured when the surface is imaged. Hence, each interaction with the coded surface still provides the tag location.

Figure 10:
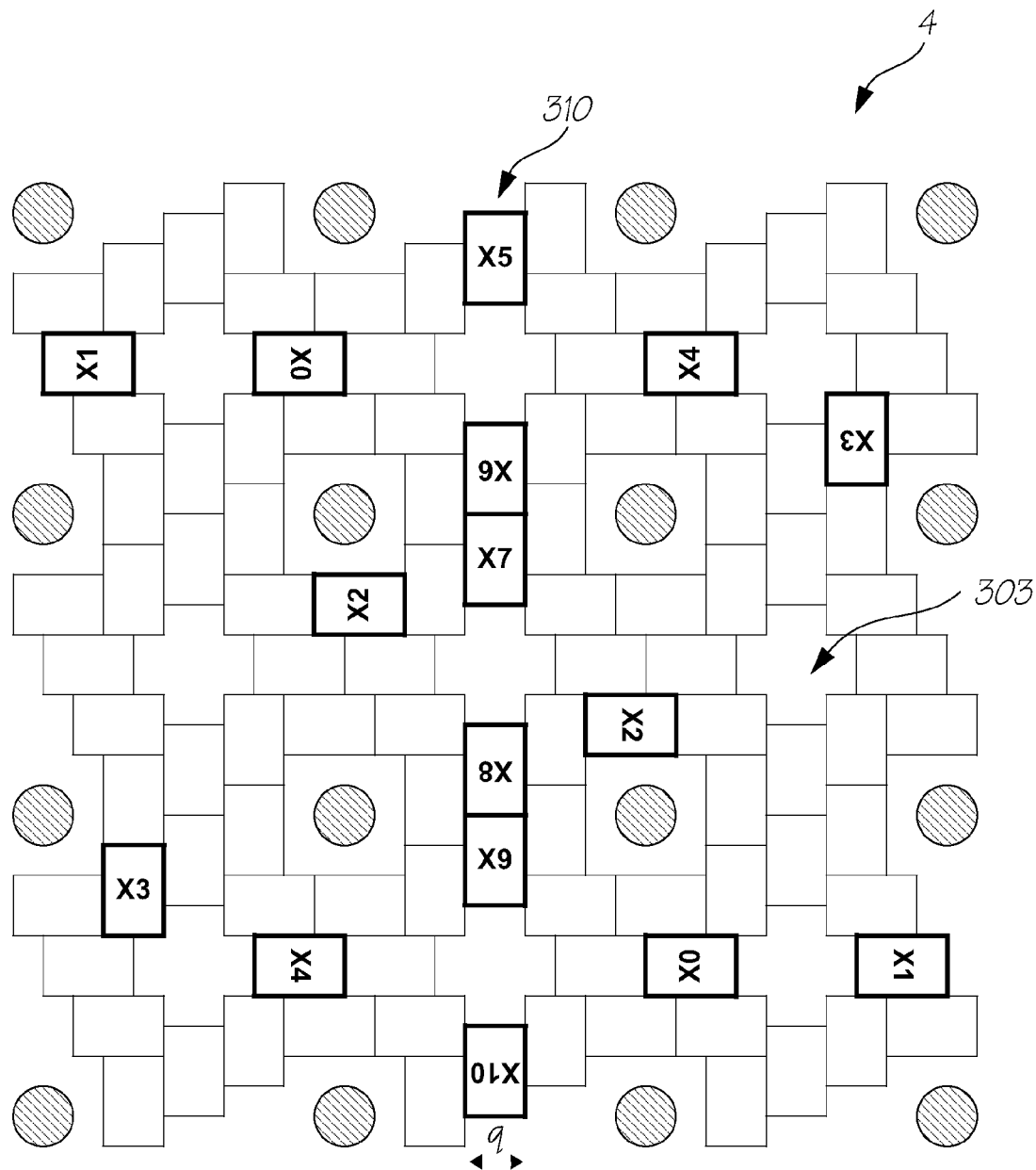
FIG. 10 shows a semi-replicated x-coordinate codeword X.
Figure 11:
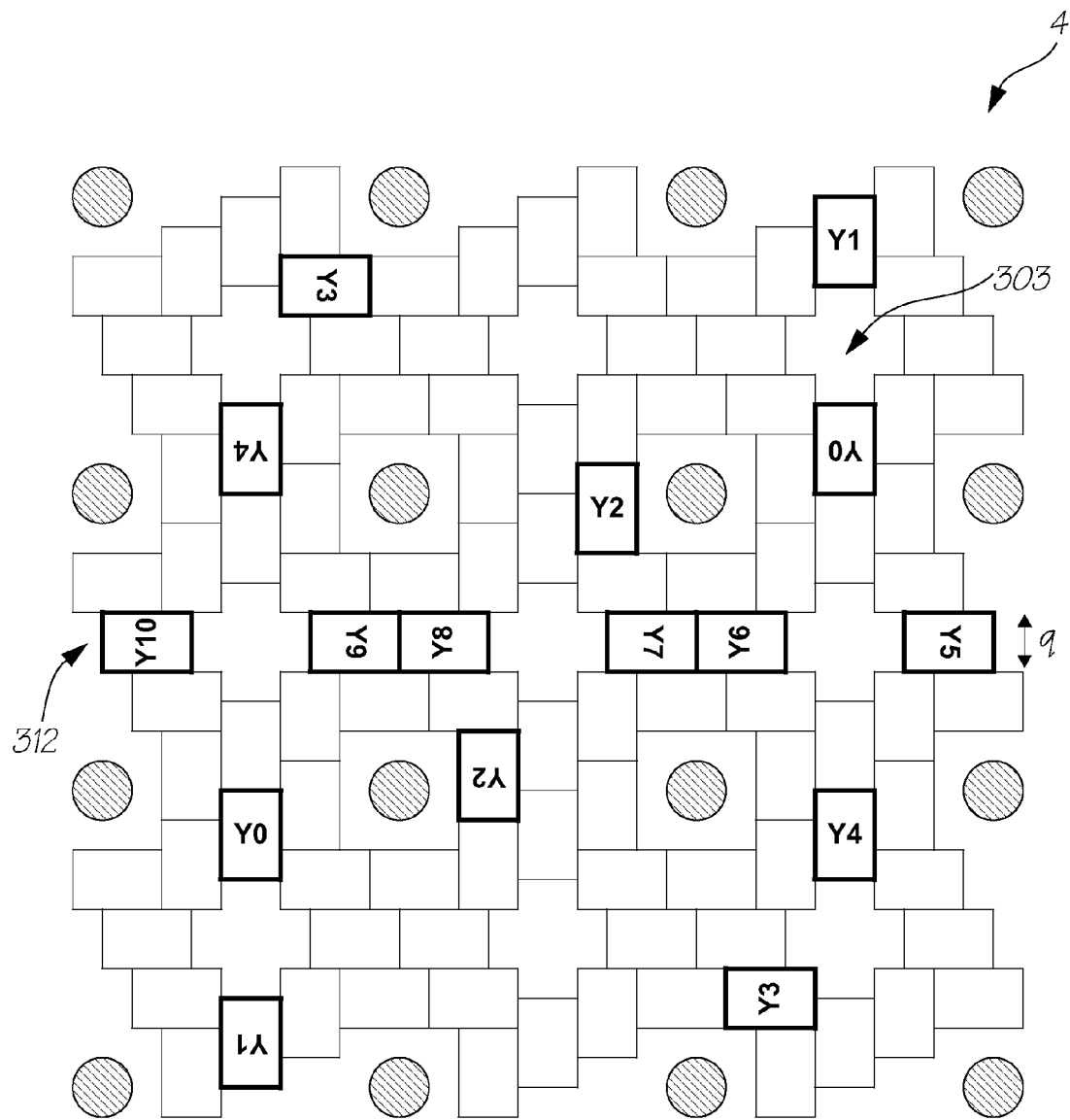
FIG. 11 shows a semi-replicated y-coordinate codeword Y.

The layout of the x-coordinate codeword is shown in FIG. 10. The layout of the y-coordinate codeword is shown in FIG. 11. It can be seen that x-coordinate symbols X4, X5, X6, X7, X8 and X9 are placed in a central column 310 of the tag 4, which divides the eastern half of the tag from the western half. Likewise, the y-coordinate symbols Y4, Y5, Y6, Y7, Y8 and Y9 are placed in a central row 312 of the tag 4, which divides the northern half of the tag from the southern half.

The central column 310 and central row 312 each have a width q, which corresponds to a width of 2 s, where s is the macrodot spacing.

2.6.4 Common Data

The tag contains four codewords A, B, C and D which encode information common to a set of contiguous tags in a surface region. The codewords are of a $2^4$-ary (15, 9) Reed-Solomon code. The tag therefore encodes up to 144 bits of information common to a set of contiguous tags. This reduces to 140 bits once base-15 conversion occurs.

The common codewords are replicated throughout a tagged region. This guarantees that an image of the tag pattern large enough to contain a complete tag is guaranteed to contain a complete instance of each common codeword, irrespective of the alignment of the image with the tag pattern. The instance of each common codeword may consist of fragments from different tags.

Figure 12:
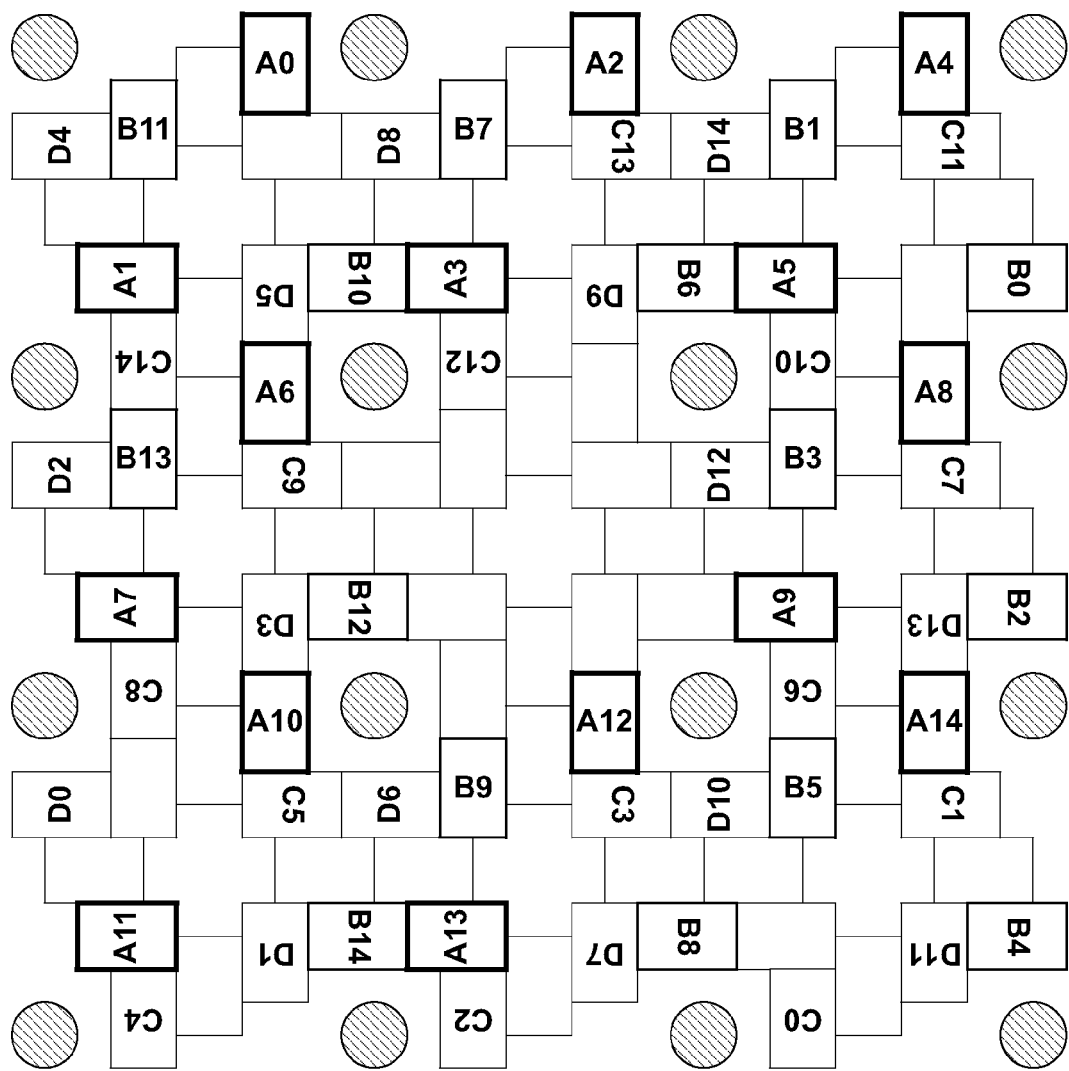
FIG. 12 shows common codewords A, B, C and D, with codeword A shown in bold outline.

The layout of the common codewords is shown in FIG. 12. The codewords have the same layout, rotated 90 degree relative to each other.

2.6.5 Optional Data

The tag optionally contains a codeword E. This codeword may be used to encode a secret-key signature or a fragment of an embedded data object. These are discussed further in Sections 2.9.4 and Section 2.9.3 respectively. The codeword is of a $2^4$-ary (15, 9) Reed-Solomon code.

Figure 13:
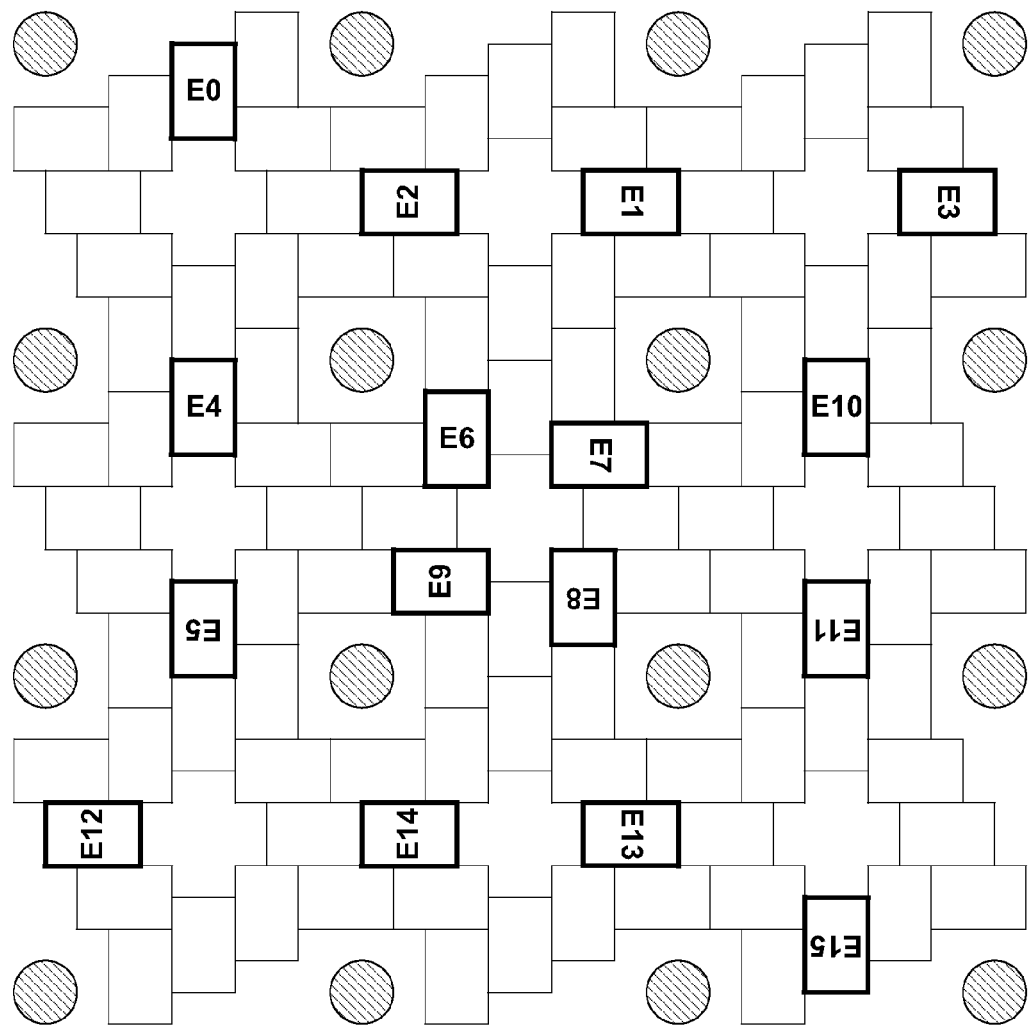
FIG. 13 shows an optional codeword E.

The layout of the optional codeword is shown in FIG. 13.

2.6.6 Secret-Key Signature

The tag optionally contains an entire secret-key digital signature common to a set of contiguous tags in a surface region. The signature consists of sixteen $2^4$-ary symbols (i.e. symbol E15 is also used). The tag therefore optionally encodes up to 64 bits of secret-key signature data.

The signature is replicated throughout a tagged region. This guarantees that an image of the tag pattern large enough to contain a complete tag is guaranteed to contain a complete instance of the signature, irrespective of the alignment of the image with the tag pattern. The instance of the signature may consist of fragments from different tags.

The signature, if present, is encoded in the E codeword described in Section 2.6.5. Digital signatures are discussed further in Section 2.9.4.

2.6.7 Complete Tag

Figure 14:
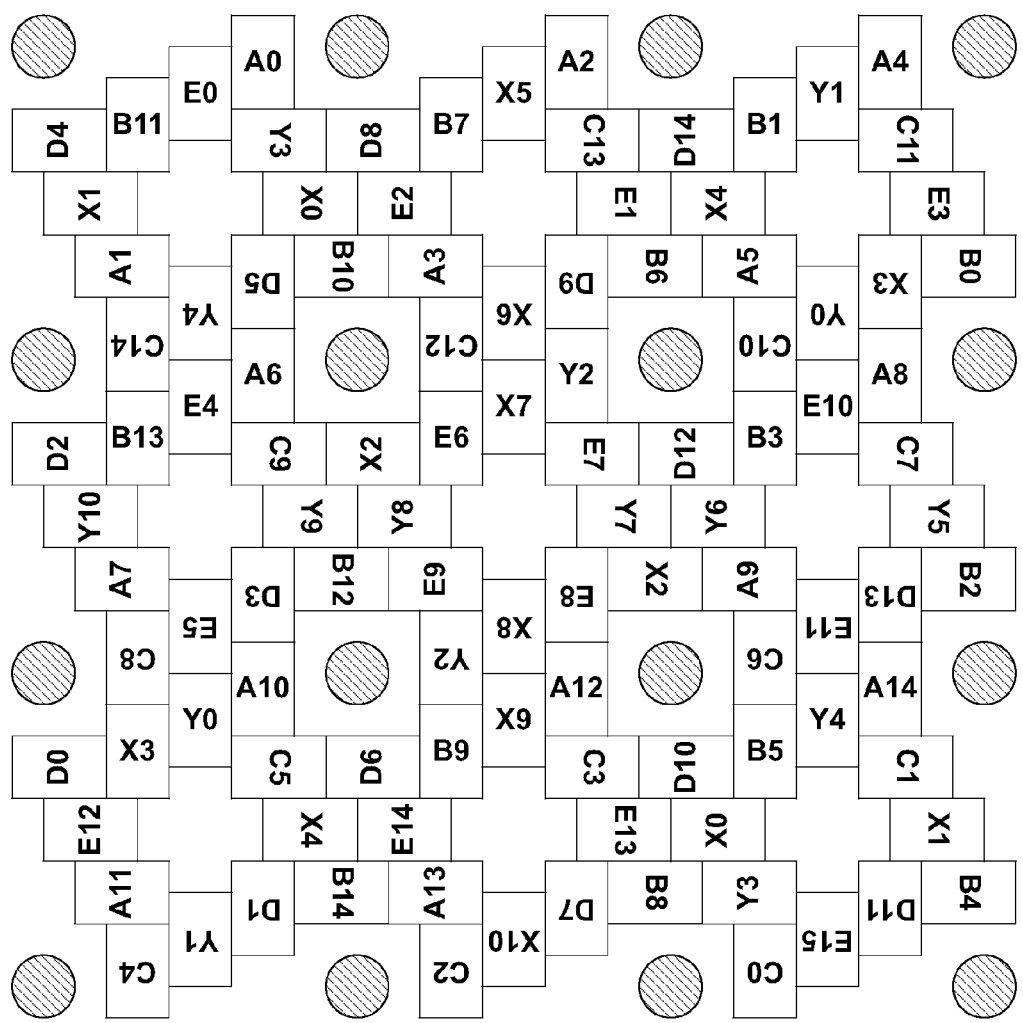
FIG. 14 shows the layout of a complete tag.

FIG. 14 shows the layout of the data of a complete tag, with each symbol group comprising ten data symbols. The vertical and horizontal registration symbols are not shown in FIG. 14.

2.7 Reed-Solomon Encoding 2.7.1 Reed-Solomon Codes

All data is encoded using a Reed-Solomon code defined over $GF(2^4)$. The code has a natural length n of 15. The dimension k of the code is chosen to balance the error correcting capacity and data capacity of the code, which are (n−k)/2 and k symbols respectively.

The code may be punctured, by removing high-order redundancy symbols, to obtain a code with reduced length and reduced error correcting capacity. The code may also be shortened, by replacing high-order data symbols with zeros, to obtain a code with reduced length and reduced data capacity. Both puncturing and shortening can be used to obtain a code with particular parameters. Shortening is preferred, where possible, since this avoids the need for erasure decoding.

The code has the following primitive polynomial:

$$p(x)=x^4+x+1$$

The code has the following generator polynomial:

$$g(x) = \prod_{i=1}^{n-k} (x+\ )$$

For a detailed description of Reed-Solomon codes, refer to Wicker, S. B. and V. K. Bhargava, eds., *Reed-Solomon Codes and Their Applications*, IEEE Press, 1994.

2.7.2 Codeword Organization

Figure 15:
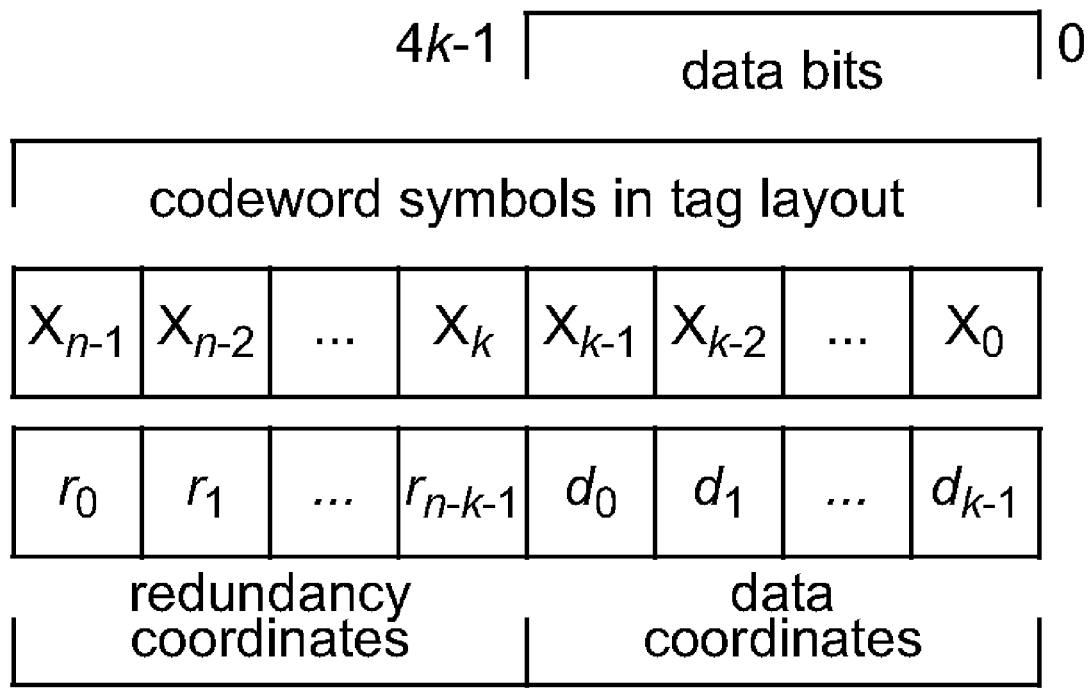
FIG. 15 shows the layout of a Reed-Solomon codeword.

As shown in FIG. 15, redundancy coordinates $r_i$ and data coordinates $d_i$ of the code are indexed from left to right according to the power of their corresponding polynomial terms. The symbols $X_i$ of a complete codeword are indexed from right to left to match the bit order of the data. The bit order within each symbol is the same as the overall bit order.

2.7.3 Code Instances

Table 4 defines the parameters of the different codes used in the tag.

TABLE 4

Codeword instances

| name | description | length (n) | dimension (k) | error-correcting capacity (symbols) | data capacity[a] (bits) |
|---|---|---|---|---|---|
| X, Y | coordinate codewords (see Section 2.6.3) | 10[b] | 5 | 2 | 19.5 |
|  |  |  | 4 | 3 | 15.6 |
|  |  |  | 3 | 3 | 11.7 |
|  |  |  | 2 | 4 | 7.8 |
| A, B, C, D | common codewords (see Section 2.6.4) | 15 | 9 | 3 | 35 |
| E | optional codeword (see Section 2.6.5) | 15 | 9 | 3 | 35 |

[a] takes into account symbol-wise conversion to base 15 to allow 2-6PPM encoding
[b] shortened

2.8 Tag Coordinate Space

The tag coordinate space has two orthogonal axes labeled x and y respectively. When the positive x axis points to the right then the positive y axis points down.

The surface coding does not specify the location of the tag coordinate space origin on a particular tagged surface, nor the orientation of the tag coordinate space with respect to the surface. This information is application-specific. For example, if the tagged surface is a sheet of paper, then the application which prints the tags onto the paper may record the actual offset and orientation, and these can be used to normalise any digital ink subsequently captured in conjunction with the surface.

The position encoded in a tag is defined in units of tags. By convention, the tag position is taken to be the position of the top left target in each tag.

2.9 Tag Information Content

2.9.1 Field Definitions

Table 5 defines the information fields embedded in the surface coding.

TABLE 5

Field Definitions

| field | width (bits) | description |
|---|---|---|
| unique to tag |  |  |
| active area flag | 1 | A flag indicating whether the area[a] immediately surrounding a tag intersects an active area. |
| x coordinate | 7.8-19.5 | The unsigned x coordinate of the tag[b]. |
| y coordinate | 7.8-19.5 | The unsigned y coordinate of the tag[b]. |
| common to tagged region |  |  |
| encoding format | 4 | The format of the encoding. 0: the present encoding. Other values are reserved |
| region flags | 12 | Flags controlling the interpretation of region data (see Table 6). |
| coordinate precision | 2 | A value (p) indicating the precision of x and y coordinates according to the formula 8 + 4p. |
| macrodot size ID | 4 | The ID of the macrodot size. |
| coordinate width ID | 2 | The ID of the width (w) of the x and y coordinates. 0: 7.8 bits 1: 11.7 bits 2: 15.6 bits 3: 19.5 bits |
| region ID space ID | 6 | The ID of the region ID space. 0: Netpage 1: EPC Other values are reserved for future use. |
| region ID | 96 | The ID of the region containing the tags. |
| secret-key signature | 64 | An optional secret-key signature of the region. |
| CRC (Cyclic Redundancy Check) | 16 | A CRC[c] of common tag data. |

[a] the diameter of the area, centered on the tag, is nominally 2.5 times the diagonal size of the tag; this is to accommodate the worst-case distance between the nib position and the imaged tag

[b] allows a coordinate value range of 857 mm (large enough for an A1 sheet) to 28.9 km for the nominal tag size of 3.81 mm (based on the nominal macrodot size and 30 macrodots per tag)

[c] CCITT CRC-16 [see ITU, Interface between Data Terminal Equipment (DTE) and Data Circuit-terminating Equipment (DCE) for terminals operating in the packet mode and connected to public data networks by dedicated circuit, ITU-T X.25 (10/96)], computed in bit order on raw codeword data (see Table 4).

An active area is an area within which any captured input should be immediately forwarded to the corresponding Netpage server 10 for interpretation. This also allows the Netpage server 10 to signal to the user that the input has had an immediate effect. Since the server has access to precise region definitions, any active area indication in the surface coding can be imprecise so long as it is inclusive.

TABLE 6

Region flags

| bit | meaning |
| --- | --- |
| 0 | Region is interactive, i.e. x and y-coordinates are present. |
| 1 | Region is active, i.e. the entire region is an active area. Otherwise active areas are identified by individual tags' active area flags. |
| 2 | Region ID is not serialized[a]. |
| 3 | Region has secret-key signature (see Section 2.9.4) |
| 4 | Region has embedded data. |
| 5 | Embedded data is a public-key signature (see Sections 2.9.3 and 2.9.4). |
| 6 | Page description is associated with region is public. Otherwise page description is private. |
| other | Reserved for future use. Must be zero. |

[a]For an EPC this means that the serial number is replaced by a layout number, to allow the package design associated with a product to vary over time (see US 2007/0108285, the contents of which is herein incorporated by reference).

2.9.2 Mapping of Fields to Codewords

Table 7 defines how the information fields map to codewords.

TABLE 7

Mapping of fields to codewords

| codeword | codeword bits | field | width | field bits |
| --- | --- | --- | --- | --- |
| X | w − 1:0 | x coordinate | w | all |
| Y | w − 1:0 | y coordinate | w | all |
| A | 15:0 | CRC[a] | 16 | all |
|   | 34:16 | region ID | 19 | 18:0 |
| B | 3:0 | encoding format | 4 | all |
|   | 15:4 | region flags | 12 | all |
|   | 19:16 | macrodot size ID | 4 | all |
|   | 21:20 | coordinate width ID | 2 | all |
|   | 27:22 | region ID space ID | 6 | all |
|   | 34:28 | region ID | 7 | 25:19 |
| C | 34:0 | region ID | 35 | 60:26 |
| D | 34:0 | region ID | 35 | 95:61 |
| E | all | data fragment | 35 | all |
| E | all[b] | secret-key signature | 64 | all |

[a]the CRC is computed in bit order on the data portions of the A, B, C and D codewords, in that order, excluding the CRC field itself
[b]entire codeword is used for data i.e. there is no redundancy As shown in Table 7, codeword E either contains a data fragment or a secret-key signature. These are described in Section 2.9.3 and Section 2.9.4 respectively. The secret-key signature is present in a particular tag if the "region has secret-key signature" flag in the region flags is set, and the tag's active area flag is set. The data fragment is present if the "region contains embedded data" flag in the region flags is set and the tag's active area flag is not set.

When the region flags indicate that a particular codeword is absent then the codeword is not coded in the tag pattern, i.e. there are no macrodots representing the codeword. This applies to the X, Y and E codewords.

2.9.3 Embedded Data Object

If the "region contains embedded data" flag in the region flags is set then the surface coding contains embedded data. The embedded data is encoded in multiple contiguous tags' data fragments, and is replicated in the surface coding as many times as it will fit.

The embedded data is encoded in such a way that a random and partial scan of the surface coding containing the embedded data can be sufficient to retrieve the entire data. The scanning system reassembles the data from retrieved fragments, and reports to the user when sufficient fragments have been retrieved without error.

As shown in Table 8, each block has a data capacity of 170-bits. The block data is encoded in the data fragments of a contiguous group of six tags arranged in a 3×2 rectangle.

The block parameters are as defined in Table 8. The E codeword of each tag may encode a fragment of the embedded data.

TABLE 8

Block parameters

| parameter | value | description |
| --- | --- | --- |
| w | 3 | The width of the block, in tags |
| h | 2 | The height of the block, in tags. |
| b | 170 | The data capacity of the block, in bits |

If the E codeword of a particular tag does not contain a fragment of the embedded data, then the pen 101 can discover this implicitly by the failure of the codeword to decode, or explicitly from the tag's active area flag.

Data of arbitrary size may be encoded into a superblock consisting of a contiguous set of blocks, typically arranged in a rectangle. The size of the superblock may be encoded in each block.

The superblock is replicated in the surface coding as many times as it will fit, including partially along the edges of the surface coding.

The data encoded in the superblock may include, for example, more precise type information, more precise size information, and more extensive error detection and/or correction data.

2.9.4 Digital Signatures

As described in Section 2.6.6, a region may contain a digital signature.

If the <region has a secret-key signature> flag in the region flags is set, then the region has a secret-key digital signature. In an online environment the secret-key signature can be verified, in conjunction with the region ID, by querying a server with knowledge of the secret-key signature or the corresponding secret key.

If the region contains embedded data and the <embedded data is a public-key signature> flag in the region flag is set, then the surface coding contains an embedded public-key digital signature of the region ID.

In an online environment any number of signature fragments can be used, in conjunction with the region ID and optionally the secret-key signature, to validate the public-key signature by querying a server with knowledge of the full public-key signature or the corresponding private key.

In an offline (or online) environment the entire public-key signature can be recovered by reading multiple tags, and can then be verified using the corresponding public signature key. The actual length and type of the signature are determined from the region ID during signature validation i.e. typically from a previously-retrieved digital signature associated with a sequence of region IDs.

Digital signature verification is discussed in the Applicant's US Publication No. 2007/0108285, the contents of which are herein incorporated by reference.

2.10 Tag Imaging and Decoding

The minimum imaging field of view required to guarantee acquisition of data from an entire tag has a diameter of 46.7 s (i.e. ((3×10)+3)√2 s), allowing for arbitrary rotation and translation of the surface coding in the field of view. Notably, the imaging field of view does not have to be large enough to guarantee capture of an entire tag—the arrangement of the data symbols within each tag ensures that a any square portion of length (l+3 s) captures the requisite information in full, irrespective of whether a whole tag is actually visible in the field-of-view. As used herein, l is defined as the length of a tag.

In terms of imaging the coding pattern, the imaging field-of-view is typically a circle. Accordingly, the imaging field-of-view should preferably have diameter of at least (l+3 s)√2 and less than two tag diameters. Importantly, the field-of-view is not required to be at least two tag diameters, in contrast with prior art tag designs, because it is not essential in the present invention to capture an entire tag in the field of view.

The extra three macrodot units ensure that pulse-position modulated values can be decoded from spatially coherent samples. Furthermore, the extra three macrodot units ensure that all requisite data symbols can be read with each interaction. These include the coordinate symbols from a central column or row of a tag (see Section 2.6.3) having a width of 2 s, and data symbols 304A extending from the perimeter edges of each tag by one macrodot unit (1 s).

In the present context, a "tag diameter" is given to mean the length of a tag diagonal.

Given a maximum macrodot spacing of 127 microns, this gives a required field of view of 5.93 mm.

Figure 16:
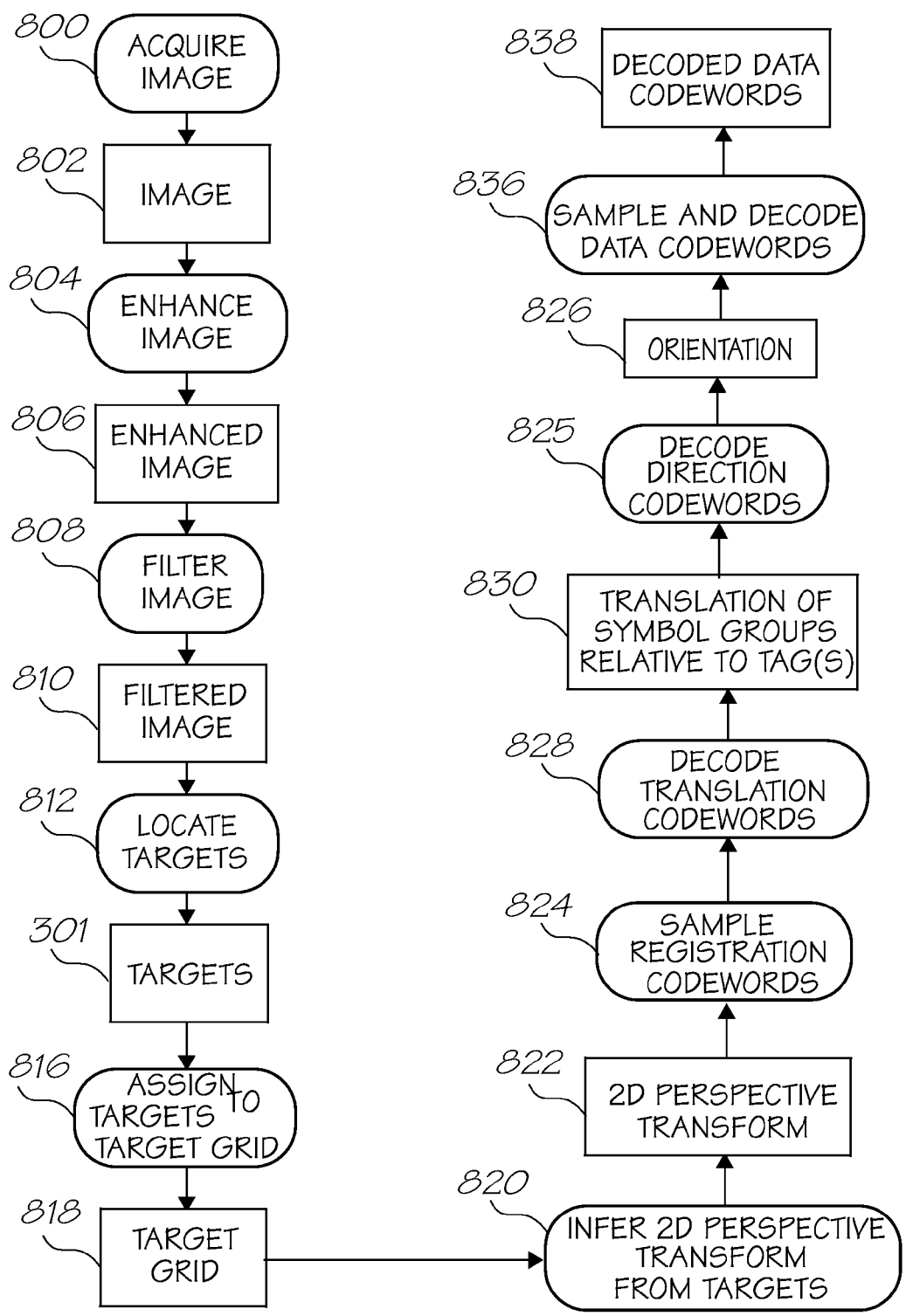
FIG. 16 is a flowchart of image processing.

FIG. 16 shows a tag image processing and decoding process flow up to the stage of sampling and decoding the data codewords. Firstly, a raw image 802 of the tag pattern is acquired (at 800), for example via an image sensor such as a CCD image sensor, CMOS image sensor, or a scanning laser and photodiode image sensor. The raw image 802 is then typically enhanced (at 804) to produce an enhanced image 806 with improved contrast and more uniform pixel intensities. Image enhancement may include global or local range expansion, equalization, and the like. The enhanced image 806 is then typically filtered (at 808) to produce a filtered image 810. Image filtering may consist of low-pass filtering, with the low-pass filter kernel size tuned to obscure macrodots 302 but to preserve targets 301. The filtering step 808 may include additional filtering (such as edge detection) to enhance target features 301. Encoding of data codewords 304 using pulse position modulation (PPM) provides a more uniform coding pattern 3 than simple binary dot encoding (as described in, for example, U.S. Pat. No. 6,832,717). Advantageously, this helps separate targets 301 from data areas, thereby allowing more effective low-pass filtering of the PPM-encoded data compared to binary-coded data.

Following low-pass filtering, the filtered image 810 is then processed (at 812) to locate the targets 301. This may consist of a search for target features whose spatial inter-relationship is consistent with the known geometry of the tag pattern. Candidate targets may be identified directly from maxima in the filtered image 810, or may be the subject of further characterization and matching, such as via their (binary or grayscale) shape moments (typically computed from pixels in the enhanced image 806 based on local maxima in the filtered image 810), as described in U.S. Pat. No. 7,055,739, the contents of which is herein incorporated by reference.

The identified targets 301 are then assigned (at 816) to a target grid 818. Each cell of the grid 818 contains a symbol group 303, and several symbol groups will of course be visible in the image. At this stage, individual tags 4 will not be identifiable in the target grid 818, since the targets 301 do not demarcate one tag from another.

To allow macrodot values to be sampled accurately, the perspective transform of the captured image must be inferred. Four of the targets 301 are taken to be the perspective-distorted corners of a square of known size in tag space, and the eight-degree-of-freedom perspective transform 822 is inferred (at 820), based on solving the well-understood equations relating the four tag-space and image-space point pairs. Calculation of the 2D perspective transform is described in detail in, for example, Applicant's U.S. Pat. No. 6,832,717, the contents of which is herein incorporated by reference.

Since each image will typically contain at least 16 targets arranged in a square grid, the accuracy of calculating the 2D perspective transform is improved compared to the Applicant's previous tag designs described in, for example, U.S. Pat. No. 6,832,717. Hence, more accurate position calculation can be achieved with the tag design of the present invention.

The inferred tag-space to image-space perspective transform 822 is used to project each known macrodot position in tag space into image space. Since all bits in the tags are represented by PPM-encoding, the presence or absence of each macrodot 302 can be determined using a local intensity reference, rather than a separate intensity reference. Thus, PPM-encoding provides improved data sampling compared with pure binary encoding.

The next stage determines the translation and orientation of the tag(s), or portions thereof, in the field of view relative to the target grid 818. Two or more orthogonal registration symbols ('VRS' and 'HRS') are sampled (at 824), to allow decoding of the orthogonal translation codewords and the orthogonal direction codewords.

Decoding of two or more orthogonal translation codewords (at 828) is used to determine the translation 830 of tags(s) in the field of view relative to the target grid 818. This enables alignment of the tags 4 with the target grid 818, thereby allowing individual tag(s), or portions thereof, to be distinguished in the coding pattern 3 in the field of view. Since each symbol group 303 contains orthogonal registration symbols, multiple translation codes can be decoded to provide robust translation determination. As described in Section 2.6.1, the translation code is a cyclic position code. Since each row and each column of a tag contains M symbol groups, the code has minimum distance M×M. This allows very robust determination of the alignment of tags 4 with the target grid 818. The alignment needs to be both robust and accurate since there are many possible alignments when each tag 4 contains multiple symbol groups 303.

Likewise, at least two orthogonal direction codes are decoded (at 825) to provide the orientation 826. As described in Section 2.6.1, since N vertical registration symbols in a tag form a vertical direction code with minimum distance N, the vertical direction code is capable of correcting $(N-1)/2$ errors. The horizontal direction code is similarly capable of correcting $(N-1)/2$ errors using N horizontal registration symbols Hence, orientation determination is very robust and capable of correcting errors, depending on the number of registration symbols sampled.

Once initial imaging and decoding has yielded the 2D perspective transform, the orientation, and the translation of tag(s) relative to the target grid, the data codewords 304 can then be sampled and decoded (at 836) to yield the requisite decoded codewords 838.

Decoding of the data codewords 304 typically proceeds as follows:
- sample common Reed-Solomon codewords
- decode common Reed-Solomon codewords
- verify common tag data CRC
- on decode error flag bad region ID sample
- determine encoding type, and reject unknown encoding
- determine region flags
- determine region ID
- determine x and y coordinate widths from coordinate width ID
- sample and decode x and y coordinate Reed-Solomon codewords
- determine tag x-y location from codewords
- determine nib x-y location from tag x-y location and perspective transform taking into account macrodot size (from macrodot size ID)
- sample and decode four or more flag symbols to determine active area flag
- determine active area status of nib location with reference to active area flag
- encode region ID, nib x-y location, and nib active area status in digital ink ("interaction data")
- route digital ink based on region flags The skilled person will appreciate that the decoding sequence described above represents one embodiment of the present invention. It will, of course, be appreciated that the interaction data sent from the pen 101 to the netpage system may include other data e.g. digital signature (see Section 2.9.4), pen mode (see US 2007/125860), orientation data, pen ID, nib ID etc.

An example of interpreting interaction data, received by the netpage system from the netpage pen 101, is discussed briefly above. A more detailed discussion of how the netpage system may interpret interaction data can be found in the Applicant's previously-filed applications (see, for example, US 2007/130117 and US 2007/108285, the contents of which are herein incorporated by reference).

3. Netpage Pen 3.1 Introduction and Functional Overview

The Netpage pen 400 is a motion-sensing writing instrument which works in conjunction with a tagged Netpage surface (see Section 2). The Netpage pen 400 typically includes a conventional ballpoint pen cartridge for marking the surface, an image sensor and processor for capturing the absolute path of the pen on the surface and identifying the surface, a force sensor for simultaneously measuring the force exerted on the nib, an optional Gesture button for indicating that a Gesture is being captured, and a real-time clock for simultaneously measuring the passage of time.

During normal operation, the Netpage pen 400 regularly samples the encoding of a surface as it is traversed by the Netpage pen's nib. The sampled surface encoding is decoded by the Netpage pen to yield surface information comprising the identity of the surface, the absolute position of the nib of the Netpage pen on the surface, and the pose of the Netpage pen relative to the surface. The Netpage pen also incorporates a force sensor that produces a signal representative of the force exerted by the nib on the surface.

Each stroke is delimited by a pen down and a pen up event, as detected by the force sensor. Digital Ink is produced by the Netpage pen as the timestamped combination of the surface information signal, force signal, and the Gesture button input. The Digital Ink thus generated represents a user's interaction with a surface—this interaction may then be used to perform corresponding interactions with applications that have predefined associations with portions of specific surfaces. (In general, any data resulting from an interaction with a Netpage surface coding is referred to herein as "interaction data").

Digital Ink is ultimately transmitted to the Netpage server 10, but until this is possible it may be stored within the Netpage pen's internal non-volatile memory. Once received by a Netpage server 10, the Digital Ink may be subsequently rendered in order to reproduce user markup of surfaces such as annotations or notes, or to perform handwriting recognition. A category of Digital Ink known as a Gesture also exists that represents a set of command interactions with a surface. (Although the Netpage server 10 is typically remote from the pen 400 as described herein, it will be appreciated that the pen may have an onboard computer system for interpreting Digital Ink).

The pen 400 incorporates a Bluetooth radio transceiver for transmitting Digital Ink to a Netpage server 10, usually via a relay device 601 (see FIG. 4). When operating offline from a Netpage server, the pen buffers captured Digital Ink in non-volatile memory. When operating online to a Netpage server the pen transmits Digital Ink in real time as soon as all previously buffered Digital Ink has been transmitted.

Figure 19:
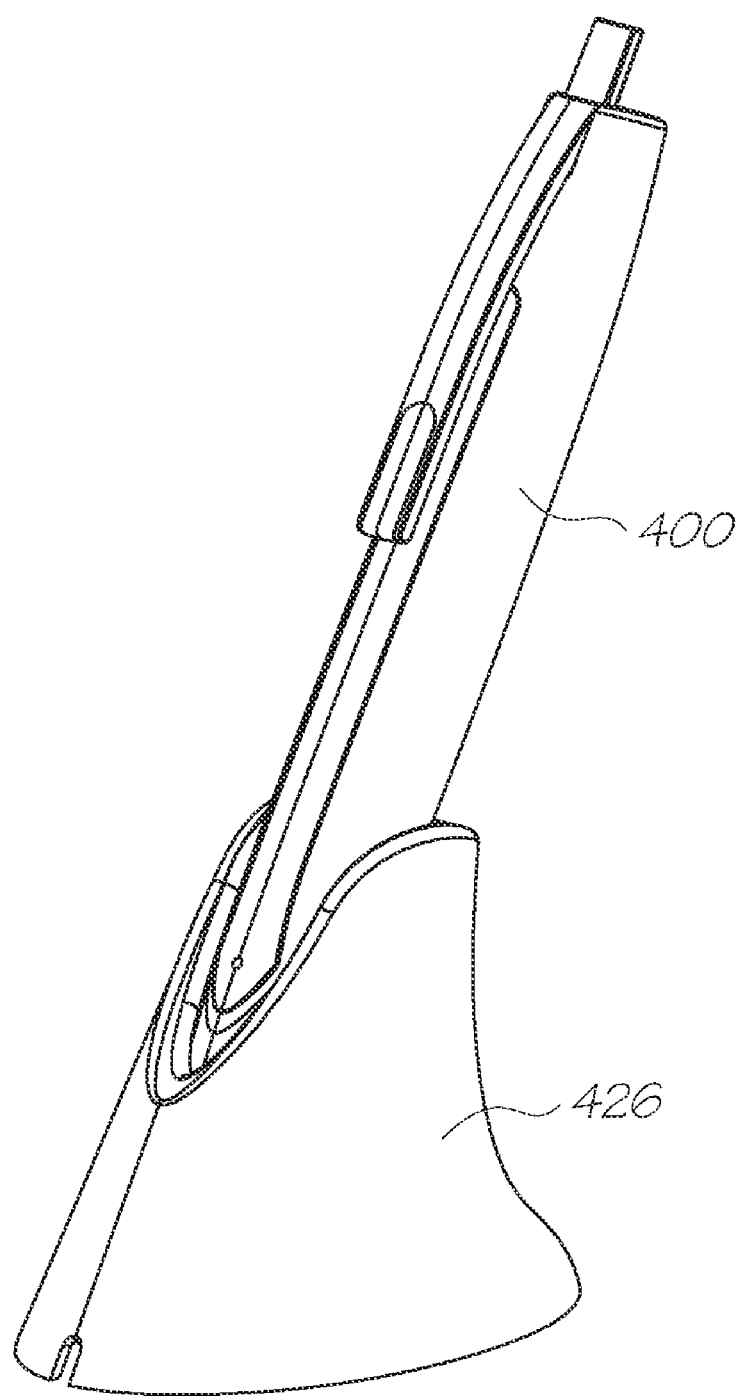
FIG. 19 is a perspective view of the Netpage pen docked in a Netpage cradle.

The Netpage pen is supplied with a charging cradle referred to as a Netpage pen cradle 426 (see FIG. 19). The Netpage pen cradle 426 contains a Bluetooth to USB relay and connects via a USB cable to a computer which provides communications support for local applications and access to Netpage services.

The Netpage pen is powered by a rechargeable battery. The battery is not accessible to or replaceable by the user. Power to charge the Netpage pen is usually sourced from the Netpage pen cradle, which in turn can source power either from a USB connection, or from an external AC adapter.

The Netpage pen's nib is user retractable, which serves the dual purpose of protecting surfaces and clothing from inadvertent marking when the nib is retracted, and signalling the Netpage pen to enter or leave a power-saving state when the nib is correspondingly retracted or extended.

3.2 Ergonomics and Layout

The overall weight (40 g), size and shape (155 mm×19.8 mm×18 mm) of the Netpage pen 400 fall within the bounds of conventional handheld writing instruments.

Referring to FIG. 1, a rounded profile gives the pen an ergonomically comfortable shape to grip when the Netpage pen 400 is used in the correct functional orientation. It is also a practical shape for accommodating the internal components.

A user typically writes with the Netpage pen 400 at a nominal pitch of about 30 degrees from the normal toward the hand when held (positive angle) but seldom operates the Netpage pen at more than about 10 degrees of negative pitch (away from the hand). The range of pitch angles over which the Netpage pen is able to image the pattern on the paper has been optimized for this asymmetric usage. The shape of the Netpage pen assists with correct orientation in a user's hand.

One or more colored user feedback LEDs 420 (see FIGS. 1, 21 and 39) illuminate corresponding indicator window(s) 421 on the upper surface of the Netpage pen 400. The indicator window(s) 421 are positioned to remain unobscured when the Netpage pen 400 is held in a typical writing position.

Figure 17:
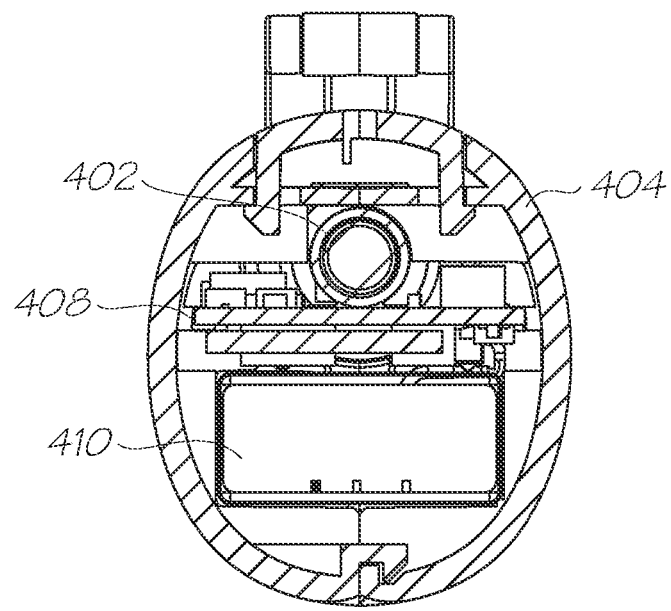
FIG. 17 is a cross-sectional front view of the Netpage pen.

Referring now to FIG. 17, a ballpoint pen cartridge 402 is housed in an upper portion of the Netpage pen's housing 404, placing it consistently with respect to the user's grip and providing good user visibility of the nib 406 whilst the Netpage pen 400 is in use. The space below the ballpoint pen cartridge 402 is used for the main PCB 408 (which is situated in the centre of the Netpage pen 400) and for the battery 410 (which is situated in the base of the Netpage pen). As shown in FIG. 2, the tag-sensing optics 412 are placed unobtrusively below the nib (with respect to nominal pitch).

The ballpoint pen cartridge 402 is front-loading to simplify coupling to an internal force sensor 442.

Still referring to FIG. 2, the nib molding 414 of the Netpage pen 400 is swept back below the ballpoint pen cartridge 402 to prevent contact between the nib molding and the paper surface when the Netpage pen is operated at maximum pitch. The Netpage pen's optics 412 and a pair of near-infrared illumination LEDs 416 are situated behind a filter window 417 (see FIG. 22) located below the nib—the Netpage pen's imaging field of view emerges through this window, and the illumination LEDs also shine through this window. The use of two illumination LEDs 416 ensures a uniform illumination field. The LEDs can also be controlled individually so as to allow dynamic avoidance of undesirable reflections when the Netpage pen is held at some angles, especially on glossy paper.

3.3 Netpage Pen Feedback Indications

The Netpage pen 400 may incorporate one or more visual user indicators 420 that are used to convey the pen status to a user, such as battery status, online status and/or capture blocked status. Each indicator 420 illuminates a shaped aperture or diffuser in the Netpage pen's housing 404—the shape of the aperture or diffuser is typically an icon that corresponds to the nature of the indication. An additional battery status indicator used to indicate charging state is also visible from the top-rear of the Netpage pen whilst the pen is inserted in to the Netpage pen cradle.

An optional battery status indicator typically comprises a red and a green LED and provides feedback on remaining battery capacity and charging state to a user. An optional online status indicator typically comprises a green LED which provides feedback on the state of a connection to a Netpage server, and also provides feedback during Bluetooth pairing operations.

3.3.1 Capture Blocked Indicator

The capture blocked indicator comprises a red LED and provides error feedback when Digital Ink capture is blocked. There may be a number of conditions under which the Netpage pen 400 is incapable of capturing digital ink, or is incapable of capturing digital ink of adequate quality.

For example, the pen 400 may be unable to capture (adequate quality) digital ink from a surface because it is unable to image the tag pattern on the surface or decode the imaged tag pattern. This may occur under a number of conditions:
- the surface is not tagged
- the pen's field of view is slightly or fully off the edge of the tagged surface
- the tag pattern is poorly printed (e.g. due to printing errors, or to the use of a poor-quality print medium)
- the tag pattern is damaged (e.g. the tag pattern is faded or smeared, or the surface is scratched or dirty)
- the tag pattern is counterfeit (i.e. it contains an invalid digital signature)
- the pen's tilt is excessive (i.e. causing excessive geometric distortion, defocus blur and/or poor illumination)
- the pen's speed is excessive (i.e. causing excessive motion blur)
- the tag pattern is obscured by specular reflection (i.e. from the surface itself or from the printed tag pattern or graphics)

The pen may be unable to store digital ink because its internal buffer is full.

The pen may also choose not to capture digital ink under a number of circumstances:
- the pen is not registered (as indicated by the pen's own internal record, or by the server)
- the pen is not connected (i.e. to a server)
- the pen has been blocked from capturing (e.g. on command from the server)
- the pen's user has not been authenticated (e.g. via a biometric such as a fingerprint or handwritten signature or password)
- the pen is stolen (i.e. as reported by the server)
- the pen's ink cartridge is empty (e.g. the pen is a universal pen as described in U.S. Pat. No. 6,808,330 incorporated herein by reference, so its ink consumption is easily monitored)

The pen may also choose to not to capture digital ink if it detects an internal hardware error, such as a malfunctioning force sensor.

The visual capture blocked indicator LED 420 typically indicates to the user that digital ink capture is blocked, e.g. due to one of the conditions described above. This indicator LED 420 may also be used to indicate when capture is close to being blocked, such as when the tag pattern decoding rate drops below a threshold, or the tilt or speed of the pen becomes close to excessive, or when the pen's digital ink buffer is almost full.

3.3.2 Alternative Indicators

Although a single capture-blocked indicator LED 420 is exemplified in the Netpage pen 400 described herein, there are, of course, a number of ways to indicate to the user that digital ink capture is blocked (or is close to being blocked), such as auditory and haptic indications.

Visual indications may be characterized by their color, intensity, and spatial extent, possibly with spatial and temporal modulation. They may be implemented using single or multiple LEDs and 2D displays (e.g. LCDs) etc.

Auditory indications are characterized by their frequency content and intensity, possibly with temporal modulation. They can be implemented using buzzers and speakers etc.

Haptic indications stimulate the sense of touch, and in the present context can be implemented using buzzers and vibrators. They are characterised by their frequency content and intensity, possibly with temporal modulation.

A vibrator can consist of a small electric motor fitted with an eccentric weight, as used for vibrating alerts in mobile phones and similar devices.

If the pen has an auto-retracting nib, the pen can auto-retract the nib when it detects a condition that blocks capture. This can include all such conditions or just selected conditions (such as buffer full).

When the pen has an auto-extending nib the pen can inhibit nib extension when it detects a condition that blocks capture. This can include all conditions that are detectable when nib extension is attempted, or just selected conditions (such as buffer full).

When the pen controls the marking capacity of the nib, e.g. as described in U.S. Pat. No. 6,808,330, the pen can inhibit marking when it detects a condition that blocks capture. This can include all such conditions or just selected conditions (such as buffer full).

3.4 Netpage Pen Cradle 426

Figure 18:
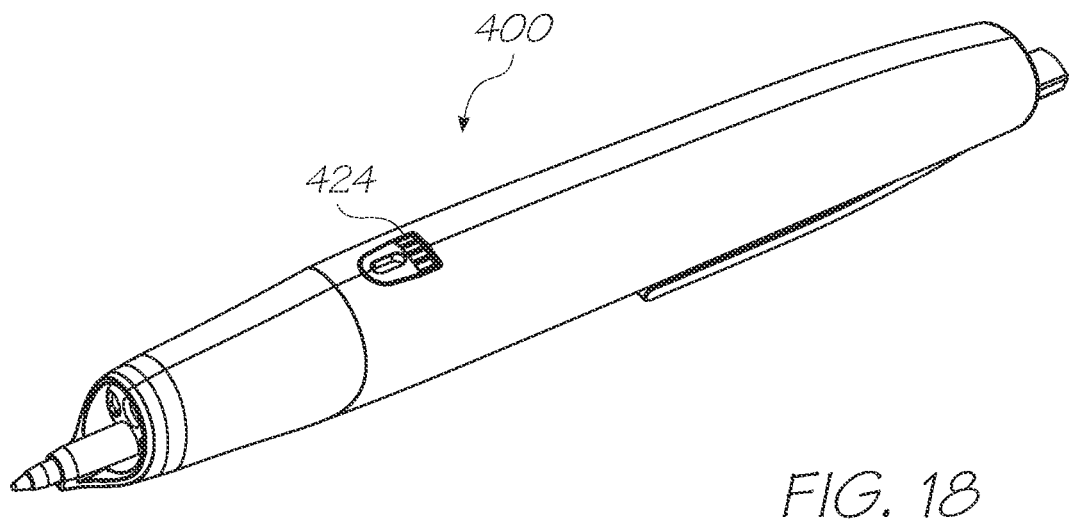
FIG. 18 is a perspective view showing cradle contacts on the Netpage pen.

As shown in FIG. 18, the Netpage pen's cradle contacts 424 are located beneath the nose cone 409. These contacts 424 connect with a set of corresponding contacts in the Netpage pen cradle 426 upon insertion, and are used for charging the Netpage pen 400.

FIG. 19 shows the Netpage pen 400 docked in the Netpage pen cradle 426. The Netpage pen cradle 426 is compact to minimise its desktop footprint, and has a weighted base for stability. Data transfer occurs between the Netpage pen 400 and the Netpage pen cradle 426 via a Bluetooth radio link.

The Netpage pen cradle 426 may have two visual status indicators—a power indicator, and an online indicator. The power indicator is illuminated whenever the Netpage pen cradle 426 is connected to a power supply—e.g. an upstream USB port, or an AC adapter. The online indicator provides feedback when the Netpage pen 400 has established a connection to the Netpage pen cradle 426, and during Bluetooth pairing operations.

There are two main functions that are required by the Netpage pen cradle 426:

provide a source of charge current so that the Netpage pen 400 can recharge its internal battery 410.

provide host communications Bluetooth wireless endpoint for the Netpage pen 400 to connect to in order to ultimately communicate with the Netpage server 10.

The Netpage pen cradle 426 has a built-in cable which ends in a single USB A-side plug for connecting to an upstream host.

In order to provide sufficient current for normal charging of the Netpage pen's battery 410, the Netpage pen cradle 426 is typically connected to a root hub port, or a port on a self-powered hub. A second option for providing charging-only operation of the Netpage pen cradle 426 is to connect the USB A-side plug to an optional AC adapter.

FIGS. 20A-D show the main charging and connection options for the Netpage pen 400 and Netpage pen cradle 426.

Figure 20A:
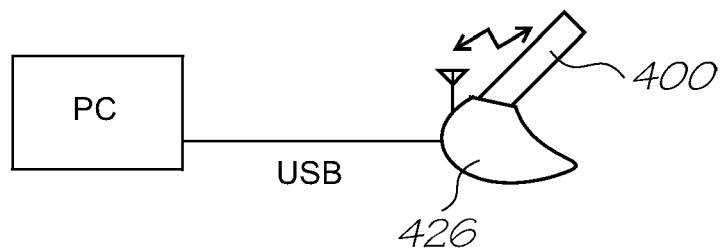
FIGS. 20A-D show schematically various charging and data connection options for the Netpage pen and Netpage cradle.

FIG. 20A shows a USB connection from a host (e.g. PC) to the Netpage pen cradle 426. The Netpage pen 400 is seated in the Netpage pen cradle 426, and the Netpage pen cradle and the Netpage pen communicate wirelessly via Bluetooth. The Netpage pen cradle 426 is powered by a USB bus power and the Netpage pen 400 is charged from the USB bus power. As a result, the maximum USB power of 500 mA must be available in order to charge the pen at the normal rate.

Figure 20B:
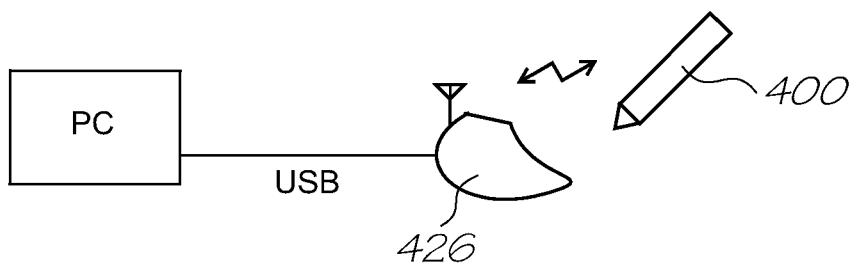

FIG. 20B shows a USB connection from a host (e.g. PC) to the Netpage pen cradle 426. The Netpage pen 400 in use, and the cradle and pen communicate wirelessly via Bluetooth. The Netpage pen cradle 426 is powered by the USB bus power.

Figure 20C:
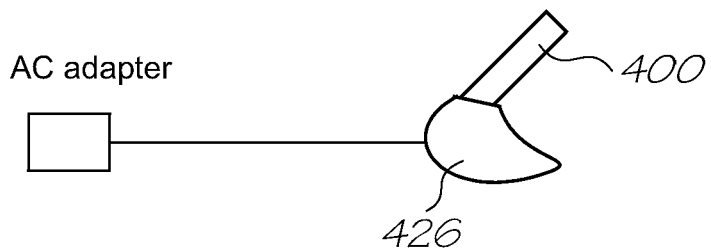

FIG. 20C shows an optional AC adapter connected to the Netpage pen cradle 426. The Netpage pen 400 is seated in the Netpage pen cradle 426, and is charged from current supplied by the optional AC adapter.

Figure 20D:
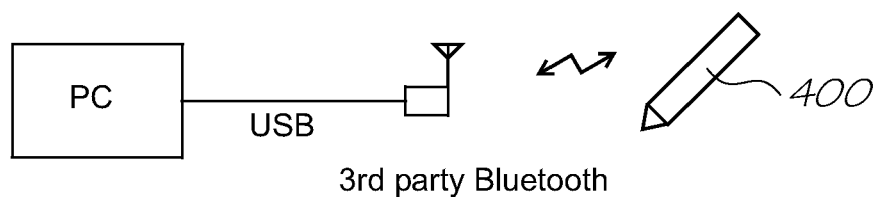

FIG. 20D shows the Netpage pen in use. In this case, the Netpage pen is communicating to a host (e.g. PC) wirelessly using 3rd party Bluetooth which may be, for example, integrated into a laptop or mobile phone.

The Netpage pen cradle 426 contains a CSR BlueCore4 device. The BlueCore4 device functions as a USB to Bluetooth bridge, and provides a completely embedded Bluetooth solution.

3.5 Mechanical Design
3.5.1 Parts and Assemblies

Figure 21:
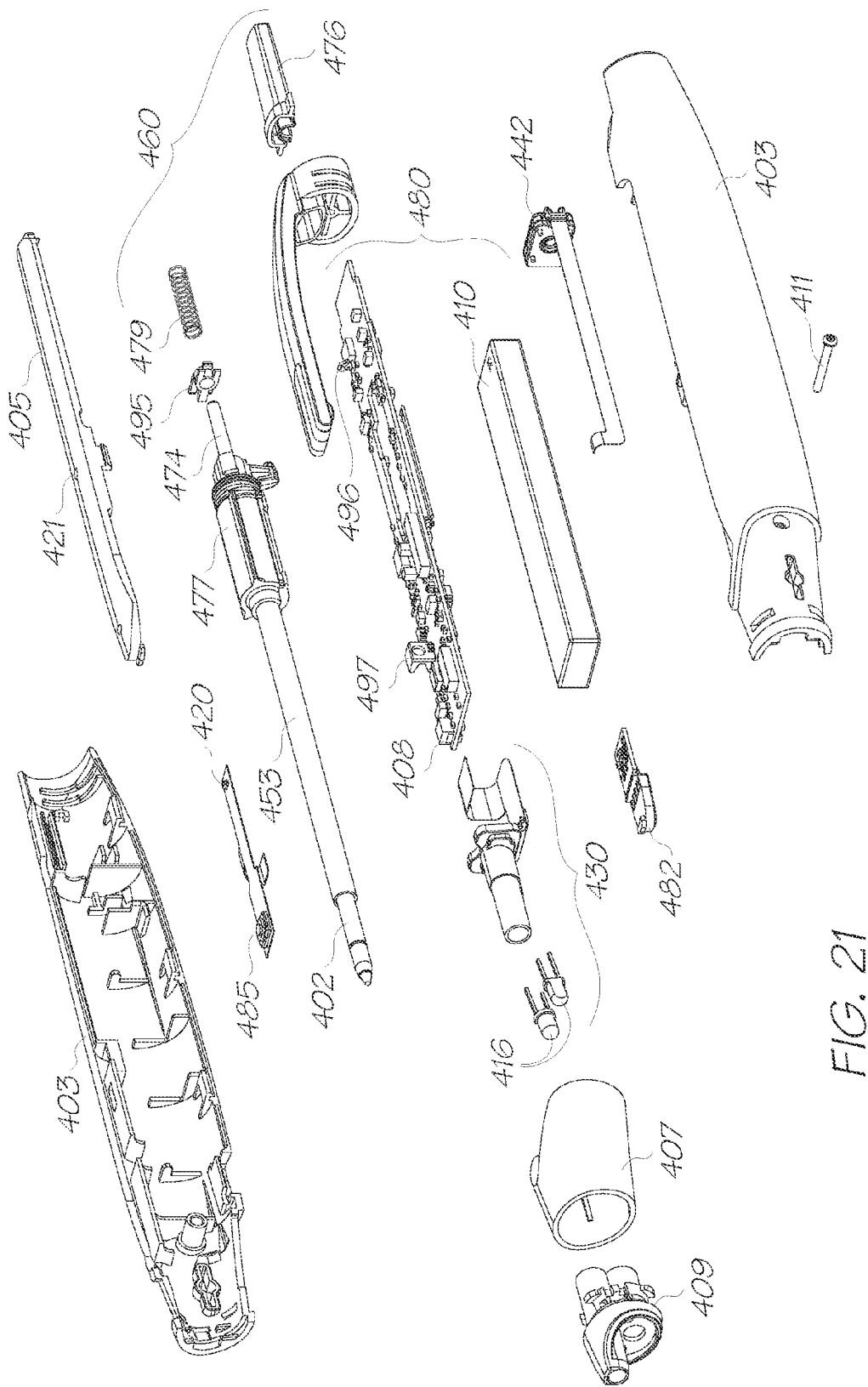
FIG. 21 is an exploded view of the pen.
Figure 22:
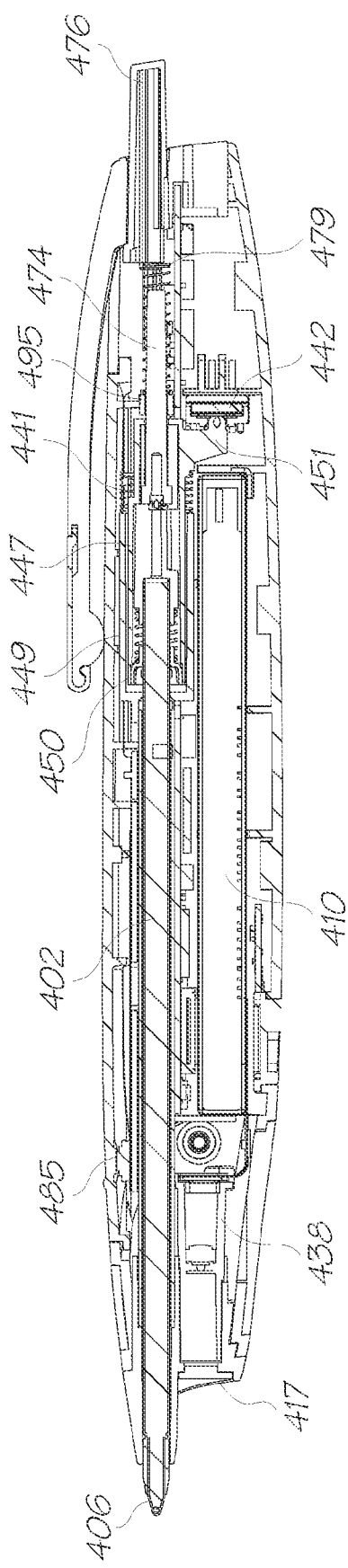
FIG. 22 is a longitudinal section of the pen.

Referring to FIGS. 21 and 22, the pen 400 has been designed as a high volume product and has four major sub-assemblies:

an optical assembly 430;

a force sensing assembly 440 including force sensor 442;

a nib retraction assembly 460, which includes part of the force sensing assembly;

a main assembly 480, which includes the main PCB 408 and battery 410.

These assemblies and the other major parts can be identified in FIG. 21. As the form factor of the pen is to be as small as possible these parts are packed as closely as practical.

The pen housing 404, which defines the body of the pen, is comprised of a pair of snap-fitting side moldings 403, a cover molding 405, an elastomer sleeve 407 and a nosecone molding 409. The cover molding 405 includes one or more transparent windows 421, which provide visual feedback to the user when the LEDs 420 are illuminated.

Although certain individual molded parts are thin walled (0.8 to 1.2 mm) the combination of these moldings creates a strong structure. The pen 400 is designed not to be user serviceable and therefore the elastomer sleeve 407 covers a single retaining screw 411 to prevent user entry. The elastomer sleeve 407 also provides an ergonomic high-friction portion of the pen, which is gripped by the user's fingers during use.

3.5.2 Optical Assembly 430

Figure 23:
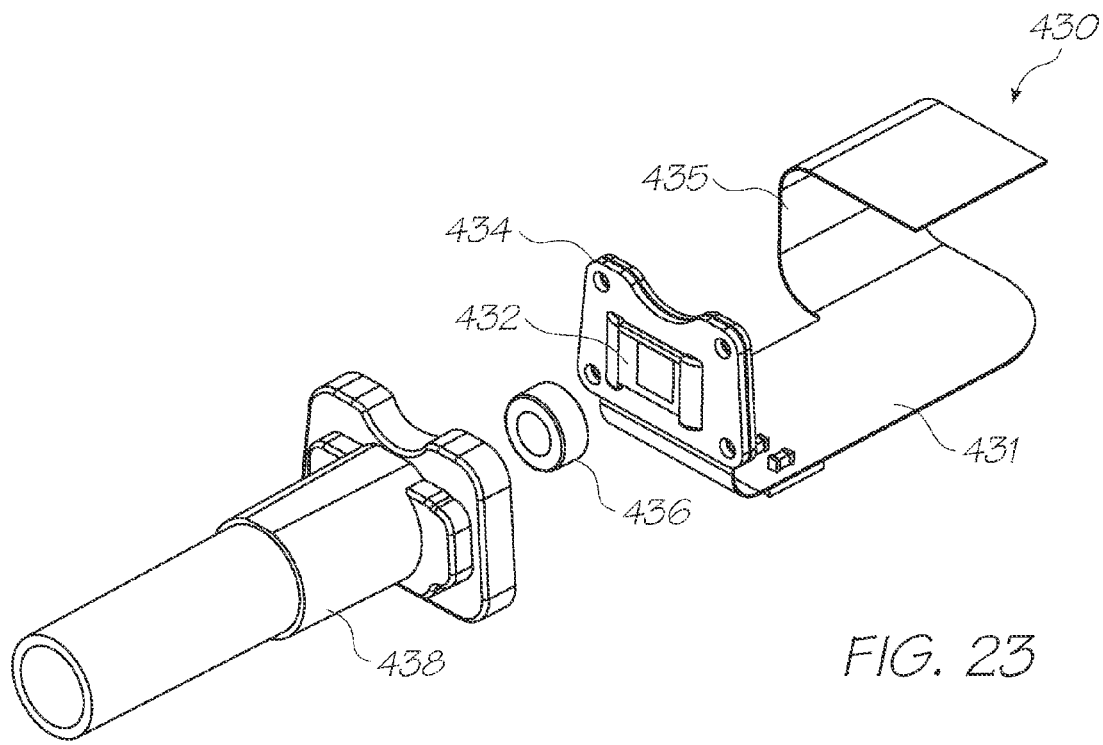
FIG. 23 is an exploded view of an optical assembly for the pen.
Figure 24:
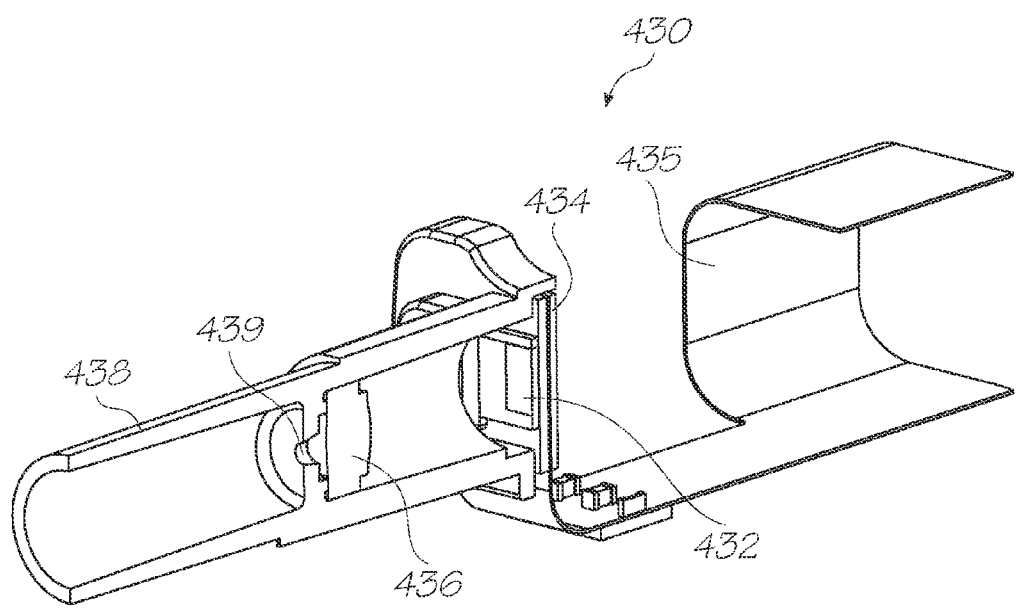
FIG. 24 is a cutaway perspective of the optical assembly.

The major components of the optical assembly 430 are as shown in FIGS. 23 and 24. An optics PCB 431 has a rigid portion 434 and a flexible portion 435. A 'Himalia' image sensor 432 is mounted on the rigid portion 434 of the optics PCB 431 together with an optics barrel molding 438.

Since the critical positioning tolerance in the pen 400 is between the optics and the image sensor 432, the rigid portion 434 of the optics PCB 431 allows the optical barrel to be easily aligned to the image sensor. The optics barrel molding 438 has a molded-in aperture 439 near the image sensor 432, which provides the location of a focusing lens 436. Since the effect of thermal expansion is very small on a molding of this size, it is not necessary to use specialized materials.

The flexible portion 435 of the optics PCB 431 provides a connection between the image sensor 432 and the main PCB 408. The flex is a 2-layer polyimide PCB, nominally 75 microns thick, which allows some manipulation during manufacture assembly. The flex 435 is L-shaped in order to reduce its required bend radius, and wraps around the main PCB 408. The flex 435 is specified as flex on install only, as it is not required to move after assembly of the pen. Stiffener is placed at the connector (to the main PCB 408) to make it the correct thickness for the optics flex connector 483A used on the main PCB (see FIG. 36B). Discrete bypass capacitors are mounted onto the flex portion 435 of the optics PCB 431. The flex portion 435 extends around the main PCB 408, and widens to the rigid portion 434 at the image sensor.

The Himalia image sensor 432 is mounted onto the rigid portion 434 of the optics PCB 431 using a chip on board (COB) PCB approach. In this technology, the bare Himalia image sensor die 432 is glued onto the PCB and the pads on the die are wire-bonded onto target pads on the PCB. The wire-bonds are then encapsulated to prevent corrosion. Four non-plated holes in the PCB next to the die 432 are used to align the PCB to the optical barrel 438. The optical barrel 438 is then glued in place to provide a seal around the image sensor 432. The horizontal positional tolerance between the centre of the optical path and the centre of the imaging area on the image sensor die 432 is ±50 microns. In order to fit in the confined space at the front of the pen 400, the Himalia image sensor die 432 is designed so that the pads required for connection in the Netpage pen 400 are placed down opposite sides of the die.

3.5.3 Force Sensing Assembly 440 and Ballpoint Pen Cartridge 402

The force sensing assembly 440 is designed to accurately measure axial force transmitted through the ballpoint pen cartridge 402 from the nib 406 during use, both for tapping the surface of the paper and during writing. It is specified to sense between 0 and 500 gram force with enough fidelity to support handwriting recognition for Netpage applications.

Whilst the force sensing assembly 440 is designed to be used in recording the dynamic applied force for use in applications such as signature recognition and print rendering, its most common usage is as a very sensitive nib switch to detect the slightest contact of the nib 406 with the paper. Therefore, the force sensing assembly 440 implicitly encompasses a 'nib switch'. When used as a nib switch, the nominal threshold of sensitivity of the force sensing assembly is set at about 10 g, and the resolution of the sensing at approximately 0.5 g. The combined mechanical and electrical bandwidth of the system is designed to allow time resolution of about 1 ms.

As described herein, the force sensing assembly 440 comprises a force sensor 442, which may function as a nib switch having a predetermined threshold actuation force. However, it will be appreciated that, in an alternative embodiment, the force sensor may be replaced with a mechanical nib switch actuable by a low threshold force (e.g. 10 g).

Figure 25:
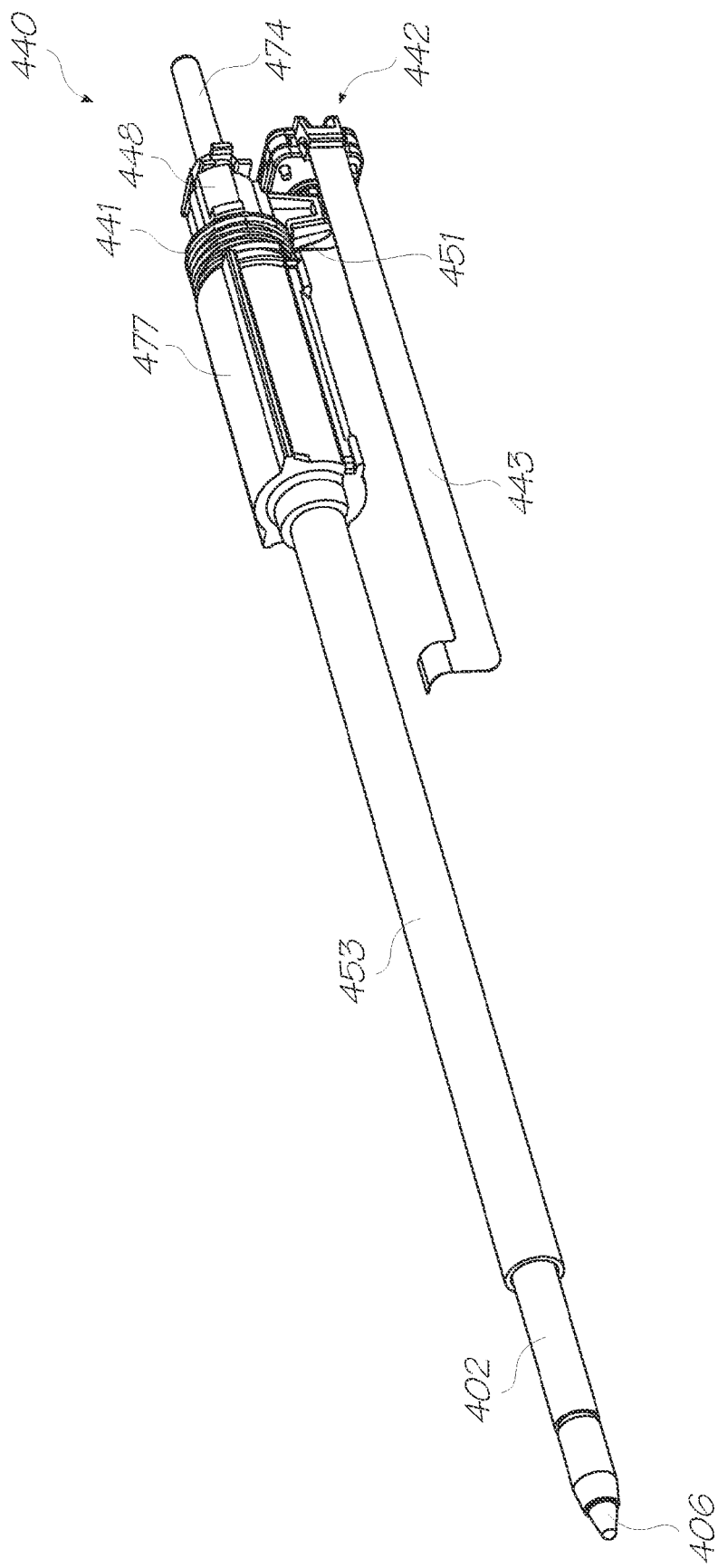
FIG. 25 is a perspective view of a force sensing assembly for the pen.

Referring to FIG. 25, the complete force sensing assembly 440 comprises the replaceable ballpoint pen cartridge 402 (either marking or non-marking), part of the nib retraction mechanism 460 which retains the pen cartridge, the preload spring 441 and the packaged force sensor 442. The force sensor 442 is connected to the main PCB 408 via a force sensor flex 443.

The ballpoint pen cartridge 402 has a first end comprising the nib 406 and an opposite second end retained by a ratchet 444 (see FIG. 31). The ratchet 444 has a cartridge-retaining part (or 'boot') in the form of a sheath 446, and a ratchet part comprising ratchet teeth 445. The second end of the cartridge 402 is slidingly received inside the sheath 446 and is gripped, clamped or otherwise held so as to be retained securely therein.

The ratchet 444 is a key component of the pen, which couples the force sensing assembly 440 and the nib retraction mechanism 460. Its ratcheting function will be discussed in more detail below in connection with the nib retraction mechanism.

Referring to FIGS. 25, 31 and 32, the ratchet 444 is slidably received inside a barrel 448, which has a first abutment surface 490 and a second abutment surface 491 defined in an inner wall thereof. The first and second abutment surfaces 490 and 491 are spaced apart and configured to provide two stable positions for the cartridge 402 corresponding to extended and retracted nib positions, respectively. The ratchet 444 is urged towards either the first abutment surface 490 or the second abutment surface 491 by means of a load spring 449. The load spring 449 is engaged between the ratchet 444 and a spring retainer 450, which is fixed to the barrel. Hence, the load spring 449 ensures engagement between the ratchet 444 and the first abutment surface 490 in the extended position. The cartridge 402 slidingly travels through a central aperture in the spring retainer 450 and a longitudinal axial void in the load spring 449 to be securely retained by the sheath part 446 of the ratchet 444.

When the cartridge 402 is extended and in use, the barrel 448 experiences an axial nib force via the ratchet 444 which is in abutting engagement with the first abutment surface 490, as shown in FIG. 32. The force sensor 442 is coupled to the barrel 448 via a pin 451, which is integrally molded with the barrel and extends from the barrel along an axis parallel with the longitudinal cartridge axis. Hence, the pin 451 transmits axial forces exerted on the barrel 448 by the cartridge 402 (retained by the ratchet 444) to the force sensor 442, enabling the force sensor to detect nib forces when the pen 400 is in use.

The force sensor 442 is typically a capacitive force sensor having a fixed plate 467 and a moving plate 457. The pin 451 is engaged against the moving plate 457 of the force sensor 442, but is not fixed to the moving plate so as to avoid damage to the force sensor during removal of the cartridge 402. A preload spring 441 is arranged to urge the barrel 448 (and thereby the pin 451) against the moving plate 457 of the force sensor 442. The preload spring 441 therefore ensures engagement between the pin and the moving plate, whilst obviating a fixed linkage therebetween that could result in damage during cartridge removal.

Although the preload spring 441 provides some reaction to nib forces, the moving plate 457 of the force sensor is much stiffer than the preload spring 441 and provides the dominant reaction force in the force sensing system.

3.5.3.1 Force Sensor

The force sensor 442 operates on the principle of measuring the capacitance between two parallel metal plates, which are resiliently spaced apart. Since the capacitance between the plates can be measured electrically, the plate separation can be calculated. Further, since the plate separation is controlled by the applied force deflecting a spring, electrical measurement of the capacitance allows the force applied to the nib 406 to be calculated. Typically, the plate separation is from 100 to 500 microns, from 100 to 250 microns or from 100 to 200 microns.

Figure 26:
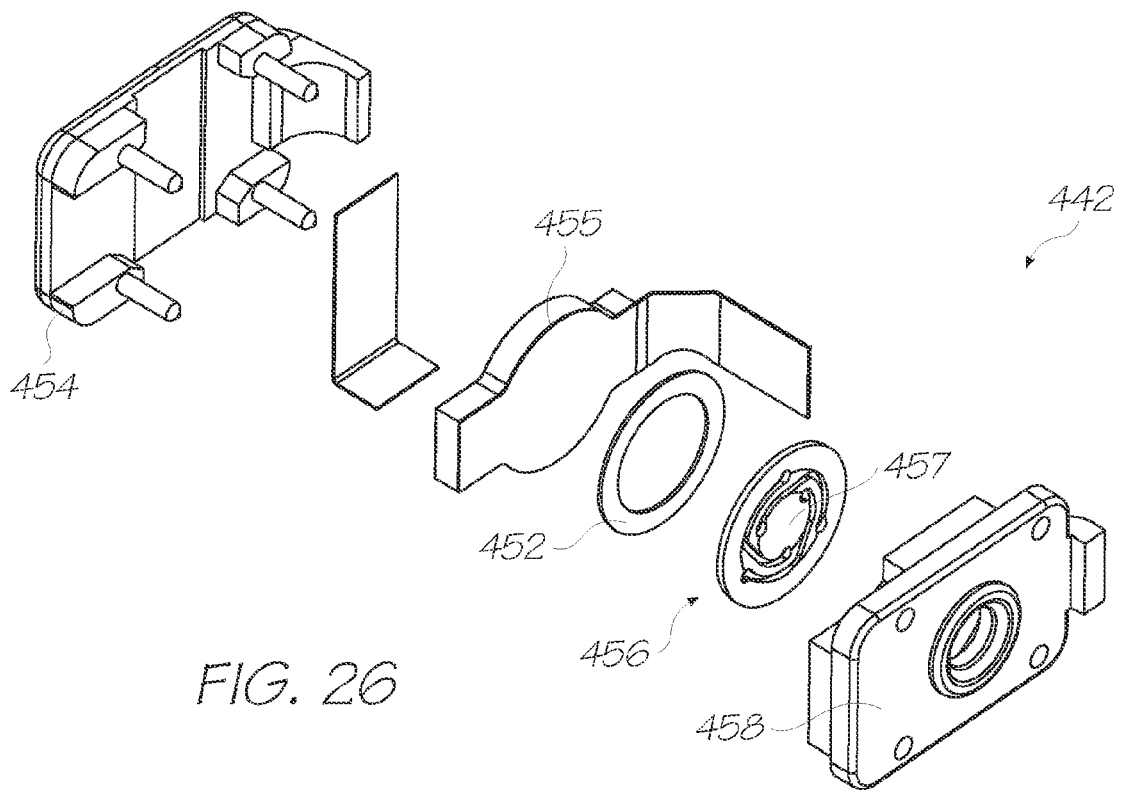
FIG. 26 is an exploded view of a force sensor.

Referring to FIG. 26, the force sensor is 442 is comprised of a base moulding 454, a force sensing rigid/flex PCB 455 comprising the fixed plate 467 of the force sensor, a locating ring 452, a spring 456 comprising the moving plate 457 of the force sensor, and a cap moulding 458. The base and cap mouldings 454 and 458 are joined by four heat-staking pins, and enclose the stackup of the force sensing rigid/flex PCB 455 and the spring 456. The exterior housing has a conductive coating which is connected to ground.

Figure 27:
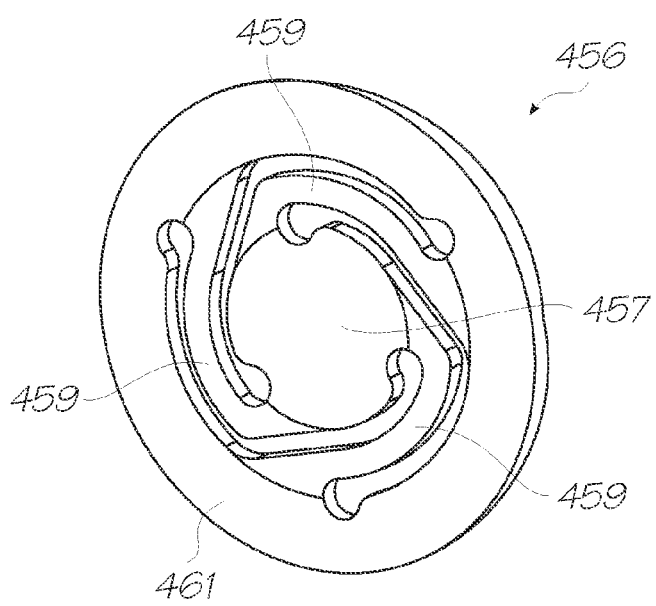
FIG. 27 shows a force sensor spring.

Referring to FIG. 27, the spring 456 is plated on the inside to provide good contact to the PCB 455. The spring 456 comprises an outer annular support 461, three spiral spring arms 459 and a moving plate 457 defined by an inner disk. The spring arms 459 may be cantilever and/or torsion springs. When an axial force is applied to the moving plate 457, the spiral spring arms 459 flex allowing axial movement of the moving plate out of the plane of the outer annular support 461.

The spring 456 is usually manufactured from a single blank of resilient material. Suitable materials include metals, such as stainless steel and beryllium-copper alloy. BeCu is highly suitable due its longevity.

It will be appreciated that flexing of the spiral spring arms 459 results in a small rotation of the moving plate 457. However, there is no transmission of this rotation to the pin 451 as it is depressed due to the low-friction surface of the pin. Once the axial force is removed, the spiral spring arms 459 return the moving plate 457 to its quiescent position shown in FIG. 27, thereby providing a natural self-calibration point. The moving plate 457 is typically made larger than the fixed plate 467 of the capacitor to ensure that the plates are always aligned.

Figure 28:
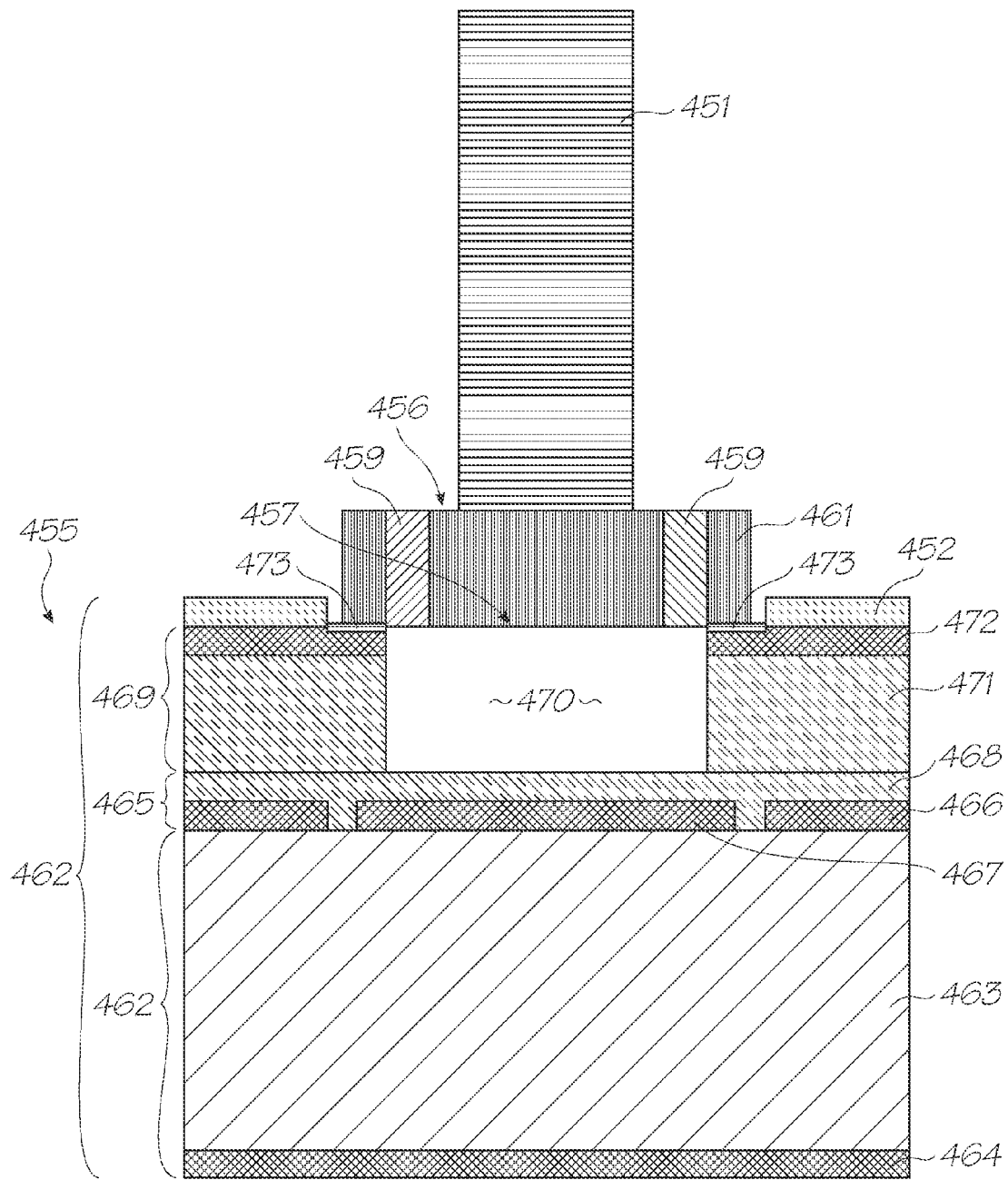
FIG. 28 shows schematically a PCB stack comprising the force sensor.

The force sensing rigid/flex PCB 455 comprises a bonded stack of rigid and flexible PCBs, which provide both the fixed plate 467 and the dielectric for the parallel-plate capacitive force sensor. FIG. 28 shows schematically the various layers of the force sensing rigid/flex PCB 455.

A 1.5 mm thick rigid PCB 462, comprised of a rigid FR4 layer 463 backed by a copper outer shield 464, provides a rigid base for the stack.

A first flexible PCB 465 is bonded to the rigid PCB 462 with a 12 micron adhesive layer (not shown). The first flexible PCB 465 comprises an 18 micron copper layer 466, which provides the fixed plate 467 for the force sensor, and a 12.5 micron polyimide layer 468. The PI layer 468 provides the high barrier resistance required by the Jupiter force sensor circuit. Polyimide also has a dielectric constant with very low temperature dependence, whilst being tough. Moreover, since polyimide has a relative dielectric constant of 4, it also acts to increase the capacitance of the force sensor.

A thicker second flexible PCB 469, having an aperture 470 punched therethrough, provides the air-gap of the force sensor. The second flexible PCB 469 comprises a 127 micron thick PI layer 471 (which serves as a primary rigid spacer for the capacitor) and a copper layer 472, which provides a contact for the moving plate 457.

The PI layer 471 is bonded to the PI layer 468 of the first flexible PCB 465, and the spring 456 sits on the upper surface of the PCB stack 455 connected to an upper copper layer 472 of the second flexible PCB 469 via a gold contact 473. The moving plate 457 is therefore able to move into the air-gap 470 and approach the fixed plate 467 by flexing of the spiral springs 459.

Three signals (fixed plate, moving plate, ground/shield) are taken off-board as a cable using the first flex PCB 465. The cable provides essential shielding between the input and output signals and is externally shielded by conducting ink layers screened over coverlays.

The construction of the plates with their PI spacer 471 ensures that they are able to withstand significant overforce without being damaged. The total distance between the moving plate 457 and the fixed plate 467 is typically in the range of 100 to 200 microns, typically 150 to 180 microns. This is provided the polyimide spacer layer 471 and the PI layer 468, together with adhesive layers and the upper copper contact layer 472.

In most capacitive force sensors, the dielectric itself provides a spring function allowing the moving plate to return to its zero position. However, such force sensors have relatively slow return-to-zero response times (about 100 ms or greater). The force sensor 442 in the Netpage pen 400 is required to have a much faster return-to-zero response time of less than 5 ms (preferably about 1 ms), in order to be able to capture pen strokes accurately. The Applicants have found that such short return-to-zero response times can only be achieved with the force sensor 442 described above, having a moving plate spring 456 and rigid polyimide spacers.

A further advantage of the force sensor 442 is the dielectric comprised of air 470 and polyimide 468. This provides a very high electrical barrier resistance that is required between the plates in order to minimize capacitance measurement errors caused by leakage current. A further advantage of polyimide is that it has almost no temperature coefficient, thereby ensuring that the sensor capacitance does not drift with temperature. Another advantage is that the polyimide layer 468 protects the fixed plate 467 and ensures that the moving plate 457 cannot contact the fixed plate.

3.5.3.2 Inverted Force Sensor

In the force sensor 442 described in Section 3.5.3.1, the moving plate 457 moves towards the fixed plate 467 when an axial force is transmitted to the moving plate from the nib 406. It will be appreciated that it is equally possible to have an inverted force sensor arrangement whereby the moving plate 457 moves away from the fixed plate 467, increasing the dielectric gap under an applied axial force. This arrangement has the advantage that the capacitance is at a maximum when the applied force is zero, which improves the sensitivity of the system to small applied forces.

Figure 29:
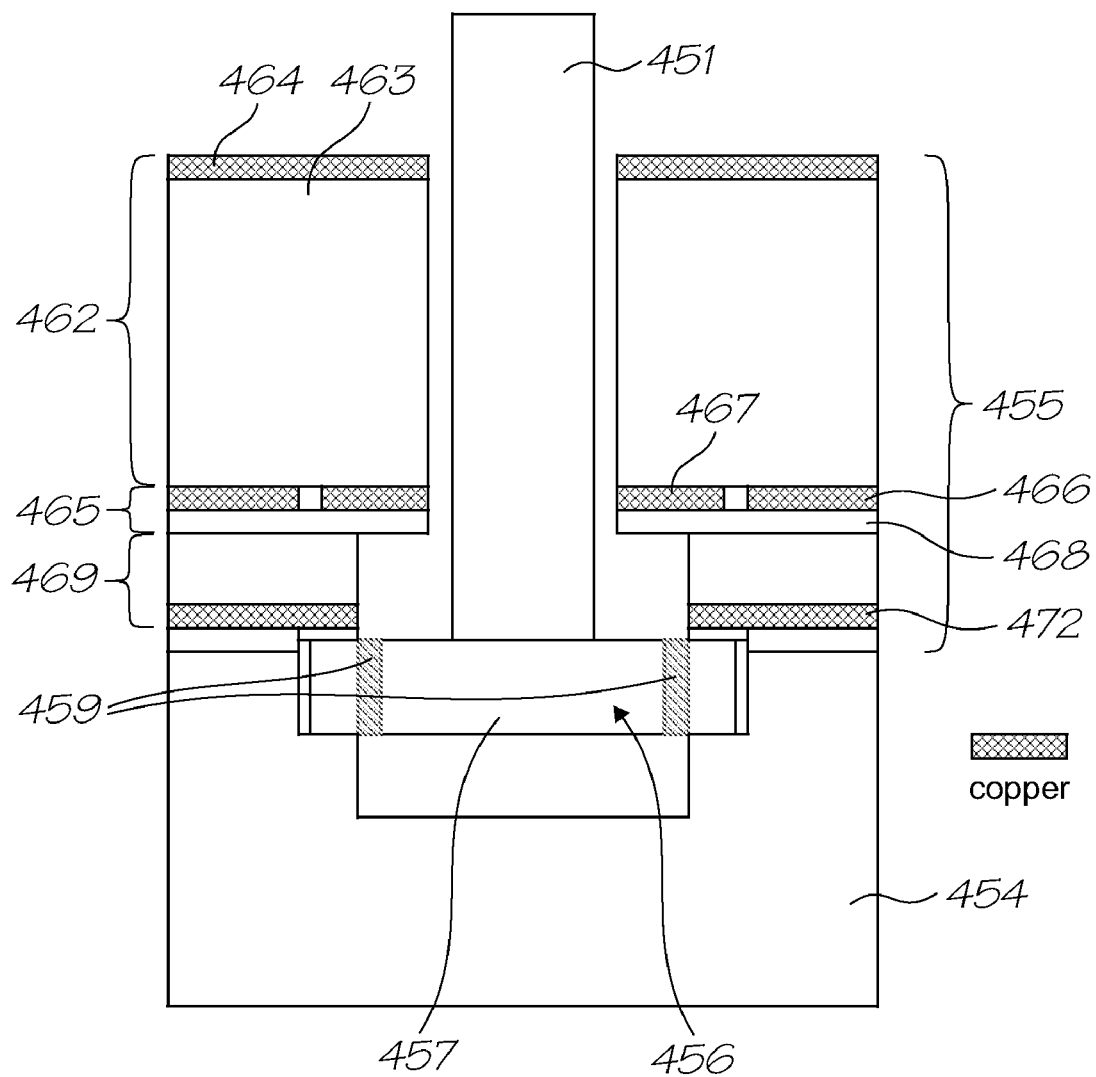
FIG. 29 shows schematically a PCB stack for an alternative inverted force sensor.

FIG. 29 shows an inverted force sensor similar in construction to the rigid/flex PCB stack 455 described above. Accordingly, like parts are labeled similarly in FIG. 29. However, in the case of the inverted force sensor, the rigid/flex PCB 455 has a hole punched through the centre of the PCB stack to allow the pin 451 to engage with the moving plate 457. In addition, the air gap between the moving plate 457 and the fixed plate 467 is reduced so that the capacitance at minimum applied force in the inverted design is similar to the capacitance at maximum applied force in the non-inverted design.

3.5.3.3 Ballpoint Pen Cartridge 402

Referring to FIG. 30, the ballpoint pen cartridge 402 is a conventional medium ball (0.8-1.0 mm) ballpoint pen. It is typically supplied with black ink, but blue ink is also possible. Although the Netpage pen 400 has been described herein in an embodiment employing the ballpoint pen cartridge 402, an alternative non-marking stylus cartridge in an identical form-factor is also possible. Ink cartridges and stylus cartridges may be used interchangeably in the Netpage pen 400 and the present invention is not limited to any particular type of cartridge.

The ballpoint pen cartridge design is similar in some respects to the "Cross" ballpoint pen cartridge, but the length is different and it is used in front-loading mode. The write-out of the ballpoint pen cartridge is 2.5 km, similar to that used in high-usage conventional pens.

The nib style has been selected to optimize the optical clearance. The rigid tube is nickel plated brass 3.05 mm OD. The ink is a high quality ballpoint ink suitable for ISO12757-2 documentary usage and compatible with this type of tube and nib. The tube is closed with a follower to prevent ink drawback. The ink is transparent in the near-infrared spectrum allowing the imaging system to see the Netpage surface-coding pattern printed underneath.

The cartridge 402 is designed to be user-replaceable. In order to extract the cartridge 402 (and referring now to FIGS. 22, 25 and 31), the nib 406 is pulled from the pen 400 using an extraction tool, thereby compressing the load spring 449 until the ratchet 444 abuts the spring retainer 450, which acts as an end-stop for the ratchet. Engagement of the ratchet 444 with the spring retainer 450 causes the cartridge 402 to be released from the sheath 446, allowing the cartridge 402 to be extracted. During cartridge removal, the barrel 448 is urged away from the force sensor 442 by abutment of the ratchet 444 with the spring retainer 450. However, the preload spring 441 ensures that the barrel 448 remains engaged with the force sensor 442 via the pin 451, thereby avoiding any potential damage to the force sensor.

A replacement cartridge 402 may be inserted into the pen by pushing the cartridge towards the ratchet 444, where it is retained by the sheath 446. During insertion, the cartridge 402 travels through a plastic tube 453, which guides the cartridge towards the ratchet 444 and prevents the cartridge from interfering with pen electronics. The plastic tube 453 also creates a creepage barrier to EDS currents that fall on the exposed nib 406 of the cartridge 402.

3.5.4 Nib Retraction Assembly 460

The Netpage pen's nib retraction assembly 460 allows the nib 406 to be retracted inside the body of the Netpage pen 400 so that it will not inadvertently mark clothing when it is, for instance, placed in a user's pocket.

Retracting the nib 406 also provides an input to the electronics that allows the Netpage pen 400 to be put in a power saving state when the nib is retracted. Correspondingly, extending the nib 406 provides a signal to the electronics that causes the pen to be made ready for capture of Digital Ink.

The nib retraction assembly 460 consists of seven parts as shown in FIG. 31, the majority of which have already been described in connection with the force sensing assembly. The ratchet 444 is a key component of the nib retraction assembly

Figure 32B:
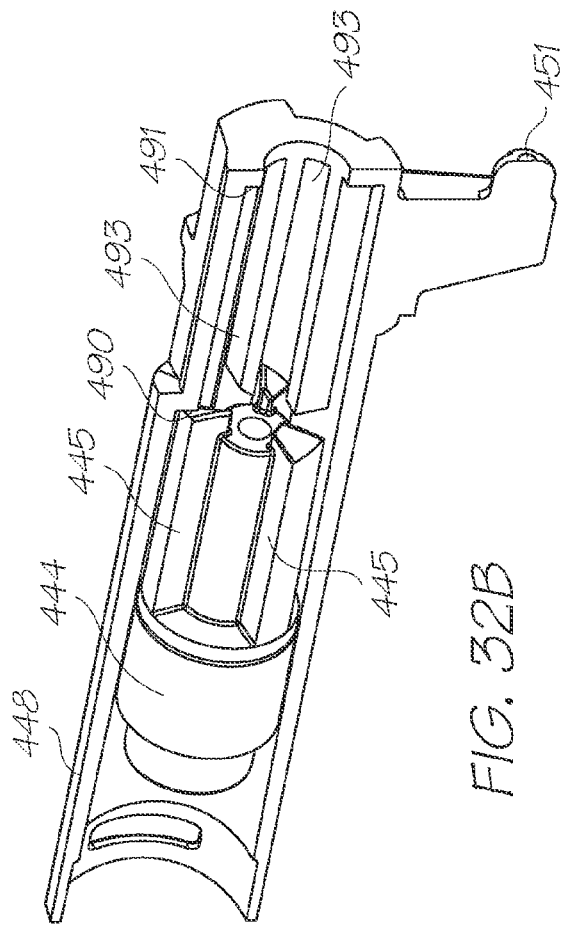
FIG. 32B shows the barrel of FIG. 32A with the plunger removed for clarity.

460, having its ratchet-teeth 445 as well as the sheath 446 for retaining the cartridge 402. The ratchet 444 is slidably movable within the barrel to provide the extended and retracted nib positions. Referring to FIG. 32B, a series of longitudinal grooves 493 defined in the inner surface of the barrel 448 guide the ratchet 444 by sliding engagement of the ratchet-teeth 445 in the grooves.

Figure 32A:
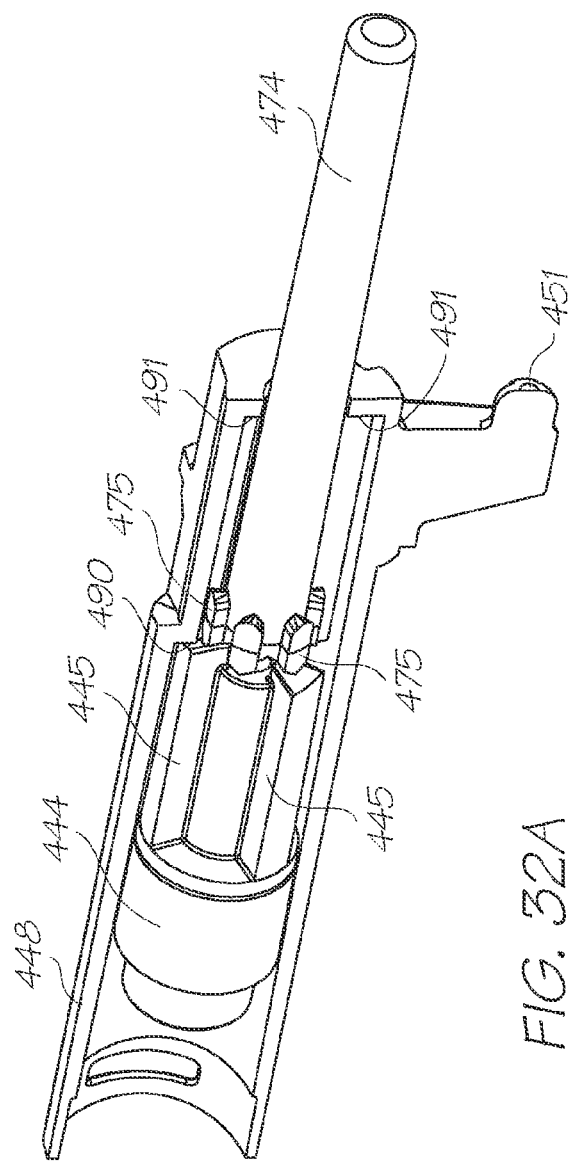
FIG. 32A is a cutaway view of the barrel showing ratchet and plunger in an extended position.

Referring to FIGS. 22, 31 and 32A, a plunger 474 is slidably movable within the barrel and has plunger-teeth 475, which slidingly engage in the grooves 493 to guide the plunger towards the ratchet 444. The plunger 474 may be moved forwards and backwards by actuation and release of a manually-operable button 476 coupled to the plunger. The plunger 474 is engaged with the ratchet 444 via complementary abutting cammed end-surfaces on the ratchet-teeth 445 and the plunger-teeth 475. The camming engagement of these end-surfaces imparts a rotational force to the ratchet 444 so that the ratchet rotates when it is pushed beyond a lip of the grooves 493. Once the button 476 is released, the load spring 449 pushes the ratchet 444 back towards the grooves 493, whereupon the cammed end-surfaces of the ratchet-teeth 445 abut with cammed lips of the grooves to impart further rotation to the ratchet. Accordingly, after one reciprocating actuation of the button 476, the ratchet 444 is rotated from a first set of grooves 493 into engagement with an adjacent second set of grooves. The first set of grooves guides the ratchet 444 towards the first abutment surface 490 when the button 476 is released, while the second set of grooves allows the ratchet to slide towards the second abutment surface 491. The first and second sets of grooves 494 are alternately defined around the inner surface of the barrel 448 so that the ratchet 444 switches between extended and retracted positions upon each actuation (and release) of the button 476. This arrangement is similar to those typically found in standard retractable ballpoint pens.

As mentioned above, the button 476 is coupled to the plunger 474 during actuation, enabling users to push the plunger 474 forwards inside the barrel 448 and, hence, manually select alternate nib-retracted or nib-extended configurations for the pen 400. In order to prevent the button 476 transmitting any force (even very small forces) to the force sensor 442 via the barrel 448 (thereby affecting nib force measurements), a decoupling spring 479 biases the button 476 away from coupling engagement with the plunger 474. As shown in FIGS. 21 and 22, the decoupling spring 479 is engaged between a grommet 495, which is fixedly mounted to the pen housing 404, and the button 476. The grommet 495 has a central aperture, which allows the plunger 474 to pass therethrough.

The barrel 448 is housed in a barrel housing 477, which is itself supported within the pen housing 404. The preload spring 441 is engaged between the barrel 448 and the barrel housing 477 so as to bias the barrel, and thereby the pin 451, towards the moving plate 457 of the force sensor 442.

3.5.4.1 Nib Extension/Retraction Detection

The Netpage pen 400 needs to 'know' the extension or retraction state of the cartridge 402 for a number of purposes. For example, if the cartridge is retracted, then the pen can initiate a quiescent or 'power-down' state and thus conserve battery power, optionally after predetermined period of time has elapsed. Typically, the image sensor is deactivated when the cartridge is retracted and/or the processor is configured not to generate Digital Ink using captured images.

Similarly, if the pen detects that the cartridge is extended, but the force sensor 442 has not detected contact with a surface for a predetermined period of time, then the pen can enter a quiescent state. In addition, actuation of the button 476 may be used to initiate 'power-up' behavior.

Referring to FIG. 22, the Netpage pen 400 has a switch 496 on the main PCB 408, which is manually actuated by part of the button 476 when the button is pushed forwards by the user. Accordingly, actuation of the switch 496 provides an input signal to the processor 500 indicating that the button 476 is being actuated for extension or retraction of the cartridge. Typically, actuation of the switch 496 is used to wake the pen up from a 'power-down' state to a 'power-up' state.

In addition, and still referring to FIG. 22, an optical sensor 497 on the main PCB 408 is used to detect the final state (extended or retracted) of the cartridge 402 by sensing a dark patch painted on the cartridge. When the optical sensor 497 senses the dark patch, the processor 500 receives an input signal from the sensor indicating that the cartridge is extended. The plastic tube 453 may have a window to allow the optical sensor to sense the dark patch painted on the cartridge 402.

The pen's real-time clock may 515 be used in combination with the switch 496 and optical sensor 497 to provide a further input signal to the processor. For example, the pen may be configured to initiate power-down only after a predetermined period of time has elapsed, as determined by the real-time clock 515.

3.5.4.2 Automatic Nib Retraction

As an alternative to (or in addition to) the manual nib retraction mechanism 460 described above, the Netpage pen 400 may incorporate an automatic nib retraction feature.

There are situations where it is advantageous to retract the nib of a Netpage pen automatically, such as when the pen is incapable of capturing digital ink, or when the nib is in danger of being damaged.

There are a number of situations where the pen is incapable (or imminently incapable) of capturing digital ink, including:
   when the surface is not coded
   when the surface coding quality falls below a certain threshold
   when the captured digital ink quality falls below a certain threshold
   when the digital ink buffer is full (or close to full)
   when the remaining battery capacity is low
   when there is no streaming connection to a Netpage server
There are a number of situations where the nib can be inferred to be in danger of being damaged, including:
   when the pen is in freefall
   when the pen experiences an impact shock
   when the force sensor of the pen measures an excessive force
There are situations where it is advantageous to pre-emptively shut down the pen and therefore pre-emptively retract the nib to prevent the user from inadvertently using it, including:
   after an inactivity timeout, to conserve battery power
   in the presence of extreme environmental conditions (temperature, humidity, etc.)
There are situations where it is advantageous to retract the nib to inform the user about the operational limits of the pen, including:
   excessive speed relative to a coded surface
   excessive tilt relative to a coded surface
Ideally the pen's manual or automatic nib extension mechanism is inoperable whilst a nib-disablement condition continues to exist.

In general, automatic nib retraction is used to disable and/or protect the nib. Alternative means for disabling and/or protecting the nib include automatic capping mechanisms (such as an auto-extending hood), or automatic disablement of the marking function of the nib. For example, U.S. Pat. No. 7,015,901, incorporated herein by reference, describes a pen whereby the marking function of the nib may be disabled.

The pen's automatic retraction mechanism may be triggered by the user via a button coupled to a switch, or the pen may retain a manual retraction mechanism for this purpose.

In either case, nib retraction typically also signals the pen to enter a low-power state, i.e. the nib retraction button is the pen's 'off' button. Automatically-triggered nib retraction also typically signals the pen to enter a low-power state.

If the pen incorporates an automatic extension mechanism (e.g. because it is the same mechanism as the retraction mechanism), then the user may extend the nib via the same button as they use to retract the nib. Nib extension signals the pen to enter a power-up state where it is responsive to pen-down interactions and is capable of digital ink capture immediately after pen-down detection, i.e. the nib extension button is the pen's 'on' button.

The automatic nib retraction mechanism may be implemented in a number of different ways. Many of these are also suitable for nib extension. In general the automatic nib retraction mechanism comprises a motor or other actuator which is coupled to the cartridge, or a boot (e.g. sheath) holding the cartridge, and which is controlled by software running on one of the pen's processors. The software is responsive to signals from sensors in the pen, such as an accelerometer for free-fall detection, as well as its own internal state to trigger nib retraction.

Since the cartridge or boot is coupled to a nib switch or force sensor, the automatic retraction mechanism must not interfere with this coupling.

Figure 33:
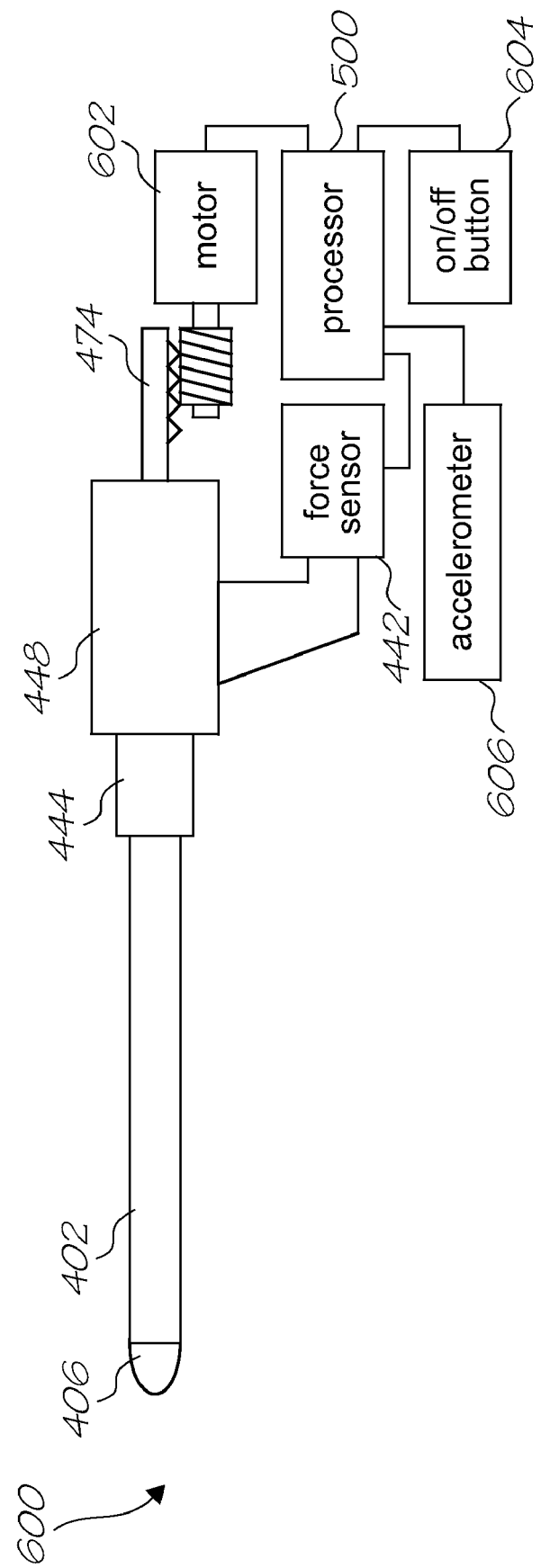
FIG. 33 shows schematically a first automatic retraction mechanism comprising a ratchet mechanism.

Referring to FIG. 33, there is shown schematically a first automatic retraction mechanism 600, which utilizes the same design as the manual retraction mechanism 460 described in Section 3.5.4. In the first automatic retraction mechanism 600, a motor 602 is coupled to the plunger 474 via a suitable coupling, such as a worm gear or rack-and-pinion coupling. The pen cartridge 402 (which may alternatively be a stylus cartridge as discussed herein) is retained by the ratchet 444, which itself engages with the barrel 448. Accordingly, movement of the plunger 474 results in nib retraction or extension.

Essentially, the motor 602 (and its coupling to the plunger 474) takes the place of the manual retraction button 476. However, the first automatic retraction mechanism 600 may additionally include the manual retraction button 476, providing users with the option of either manual nib retraction/extension or automated nib retraction/extension. When manual retraction/extension is required the motor 602 may be decoupled from the plunger 474.

Still referring to FIG. 33, the processor 500 is coupled to the motor 602 and receives input signals to determine whether the nib should be extended or retracted. The input signal may be from a simple on/off switch 604 or an accelerometer 606, which detects when the pen is in freefall. If a freefall condition is detected, the accelerometer provides a suitable signal to the processor 500, and the processor initiates automatic retraction of the nib via the motor 602.

Figure 34:
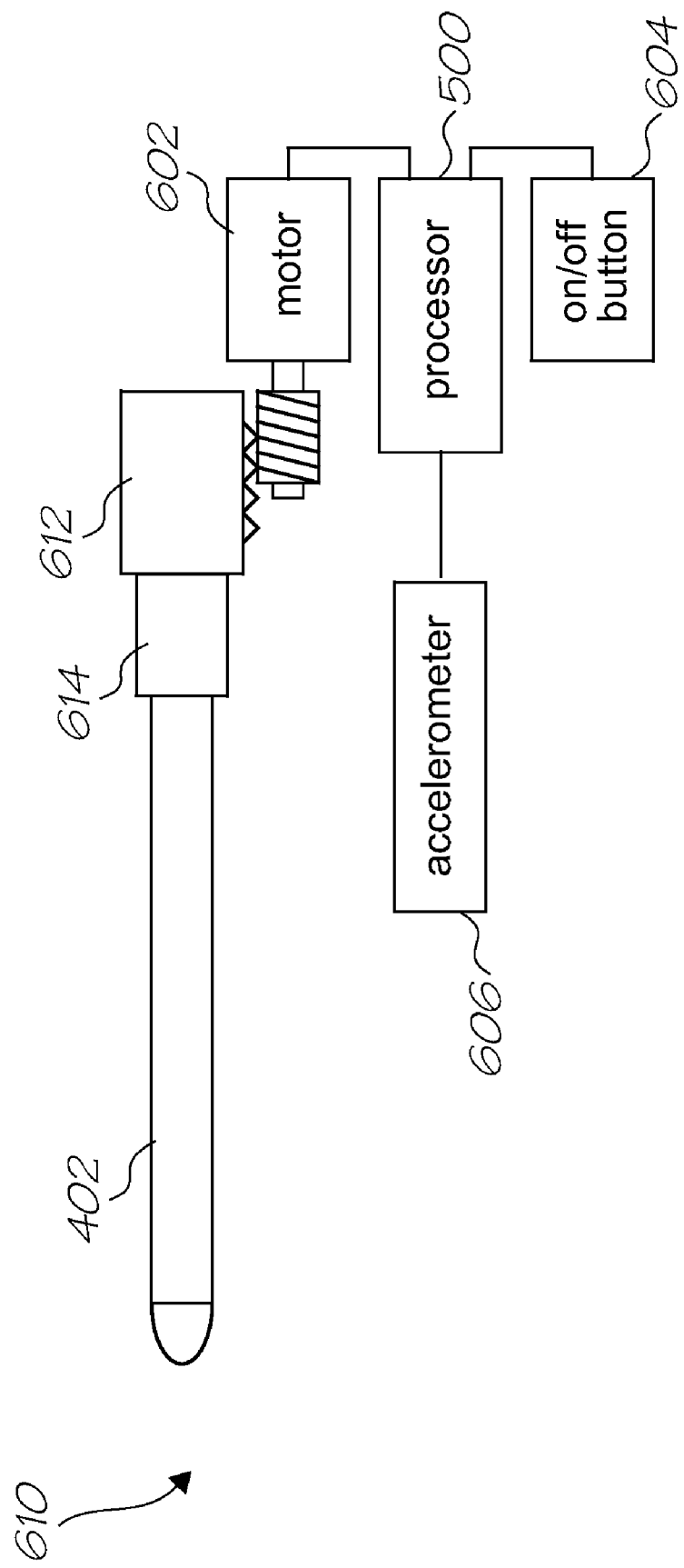
FIG. 34 shows schematically a second automatic retraction mechanism with direct coupling to a force sensor assembly.

Referring to FIG. 34, there is shown schematically a second automatic retraction mechanism 610 where the motor 602 is coupled directly to a force sensor assembly 612 to effect extension/retraction of the cartridge 402. The force sensor assembly 612 comprises a housing containing a boot 614, which is preloaded against a force sensor. The cartridge 402 is retained by the boot 614 so that actuated movement of the force sensor assembly 612 by the motor 602 causes retraction/extension of the cartridge 402. An advantage of coupling the motor 601 directly to the force sensor assembly 612 is that no ratchet mechanism is required.

In either of the first or second automatic retraction mechanisms, the motor coupling may be geared to increase torque. Forward and reverse stop positions may be detected by standard motor load detection mechanisms.

Figure 35:
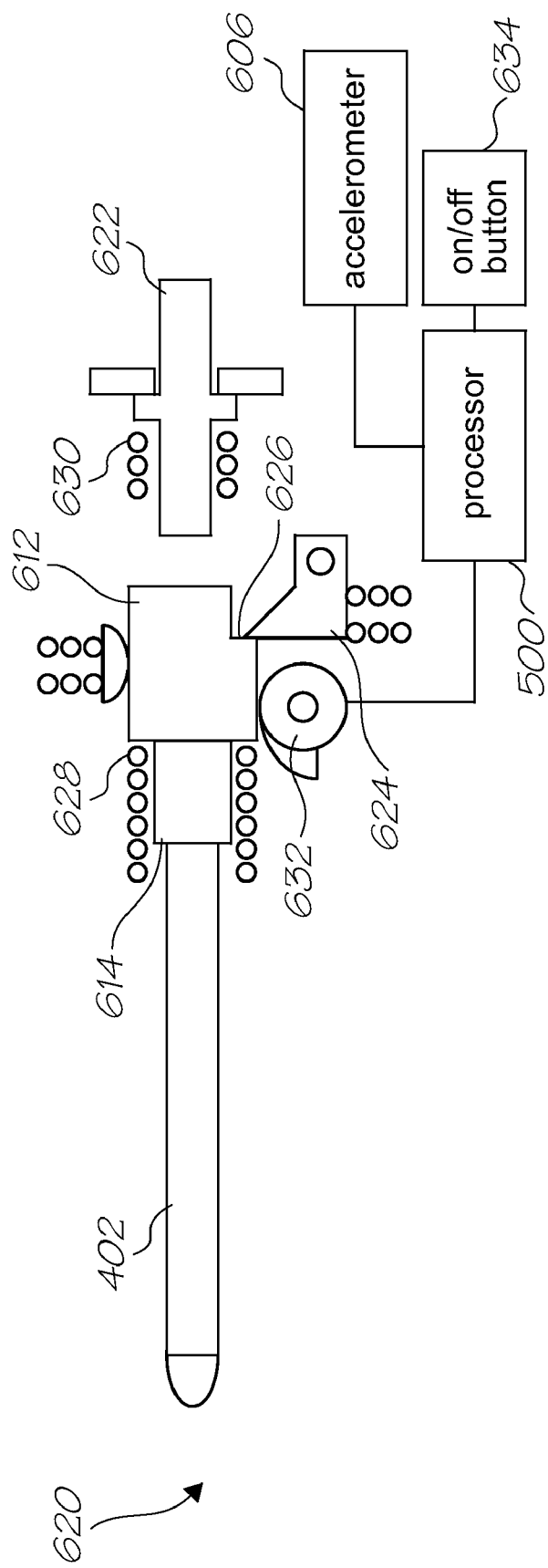
FIG. 35 shows schematically a third automatic retraction mechanism incorporating a manual extension mechanism.

Referring to FIG. 35, there is shown schematically a third automatic retraction mechanism 620, where the pen retains a manual extension/retraction mechanism whilst also incorporating an automatic retraction mechanism. The cartridge 402 is retained by a boot 614, which is part of the force sensor assembly 612. The force sensor assembly 612 may be pushed forwards, effecting extension of the nib, by a manually-operated extension plunger 622. The force sensor assembly 612 is held in place in this extended position by a sprung catch 624, which abuts with an abutment surface or lip 626 on the force sensor assembly. The catch 624 provides a reaction to the biasing force of a load spring 628 acting on the force sensor assembly. The extension plunger 622 is disengaged from the force sensor assembly 612 after extension by a spring 630.

Automatic retraction is effected by an actuator that lifts the force sensor assembly 612 off the catch 624, causing the force sensor assembly and hence the nib to spring backwards into the retracted position. The actuator may be implemented as a motorized cam 632 as shown in FIG. 35. The processor 500, which may receive input signals from an off switch 634 and/or the accelerometer 606, controls the operation of the motorized cam 632, thereby controlling automatic nib retraction.

3.5.5 Main Assembly 480

There are three PCBs in the pen 400: the main PCB 408, the optics PCB 431, and a gesture flex PCB 481 (which also locates the indicator LEDs 420).

In the present discussion, the main assembly 480 is taken to include the gesture flex PCB 481, a cradle contacts leadframe insert 482, IR LEDs 416 and the battery 410, all of which are connected to the main PCB 408. Of course, the optics PCB 431 and force sensor 442 are also connected to the main PCB 408, but these components are discussed above separately.

Figure 36:
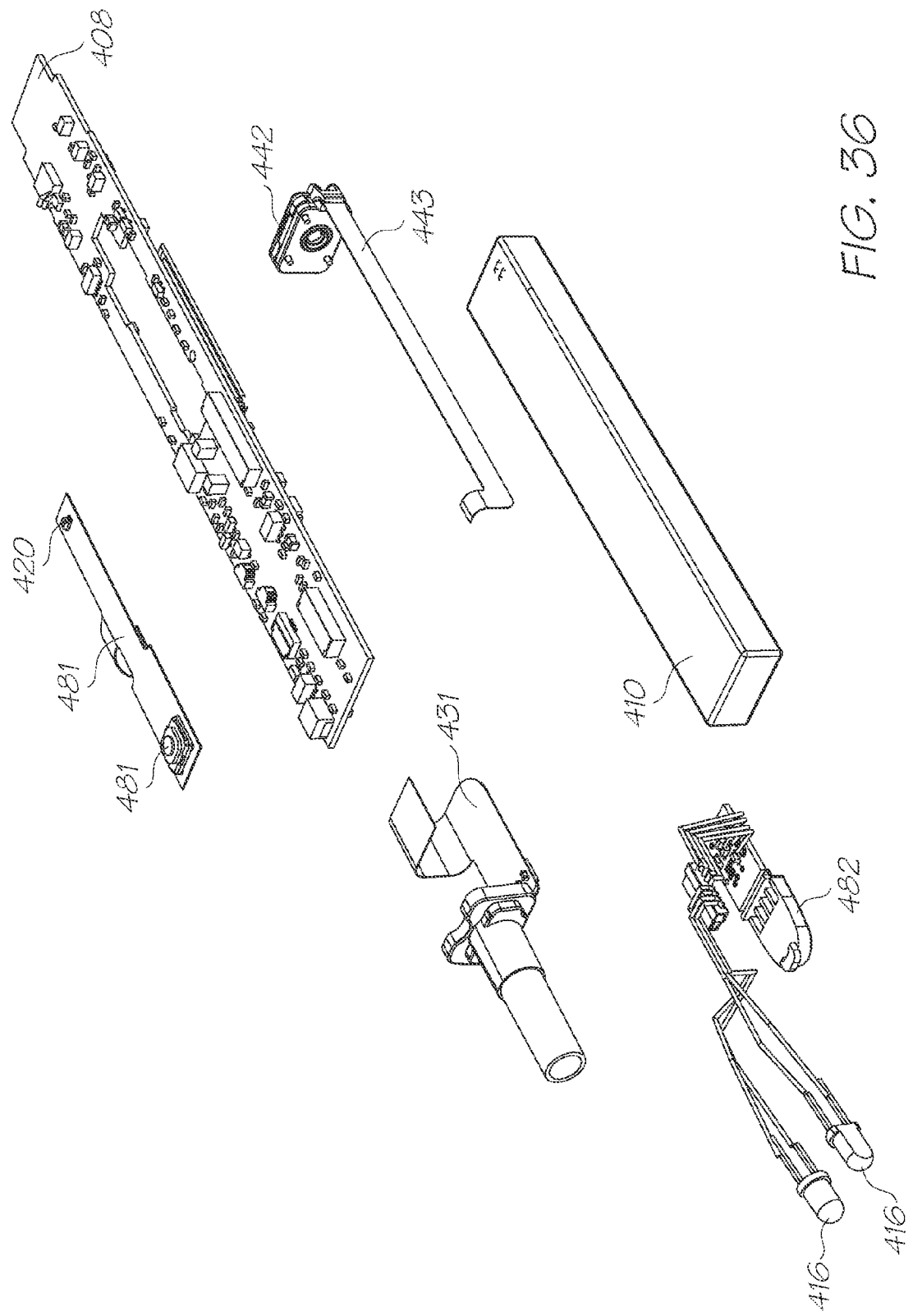
FIG. 36 is an interconnect diagram for a main PCB of the pen.

FIG. 36 is an interconnect diagram showing the main connections for the various components connected to the main PCB 408.

3.5.5.1 Main PCB 408

Figure 37A:
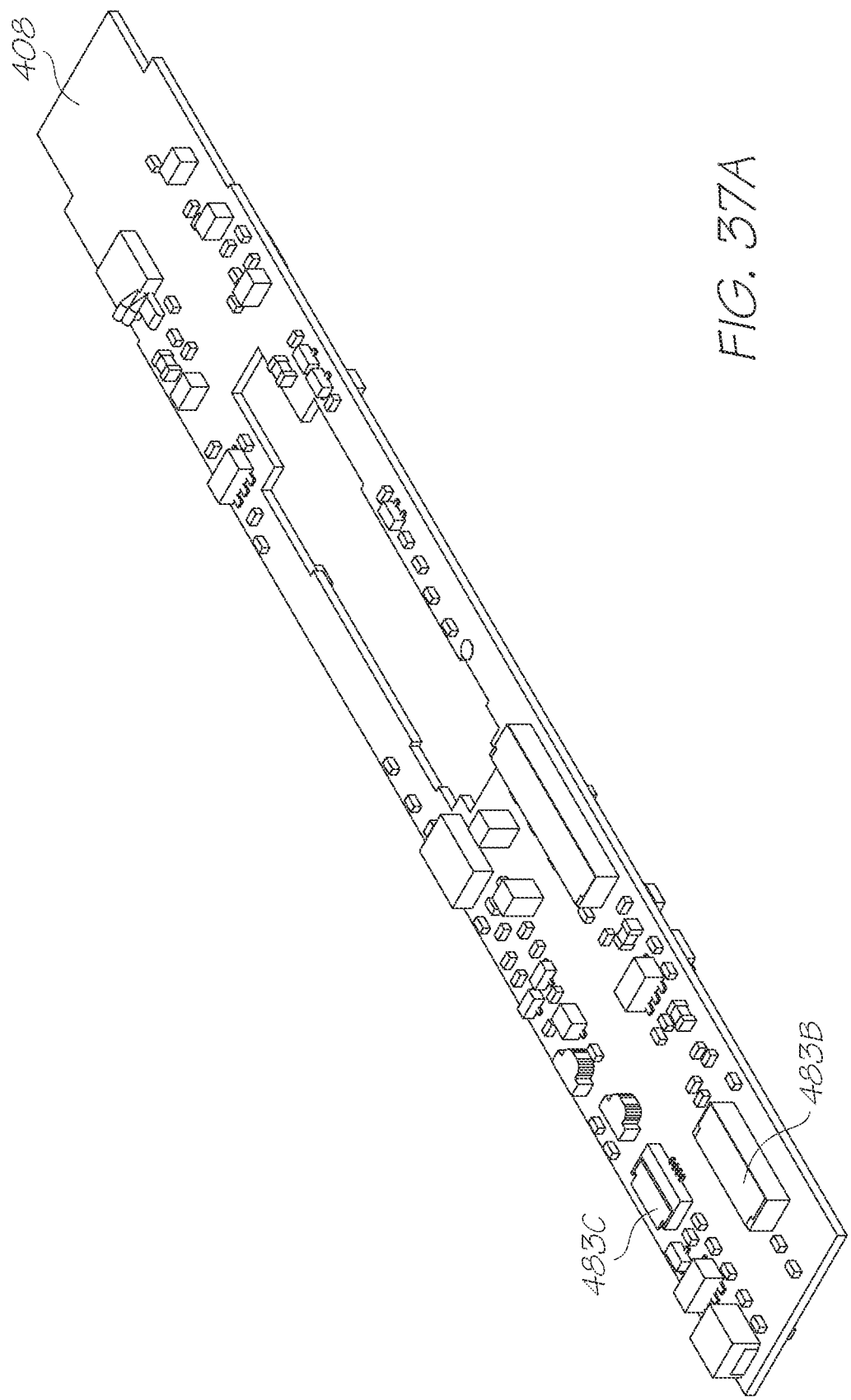
FIGS. 37A and 37B are upper and lower perspective views of the main PCB.
Figure 37B:
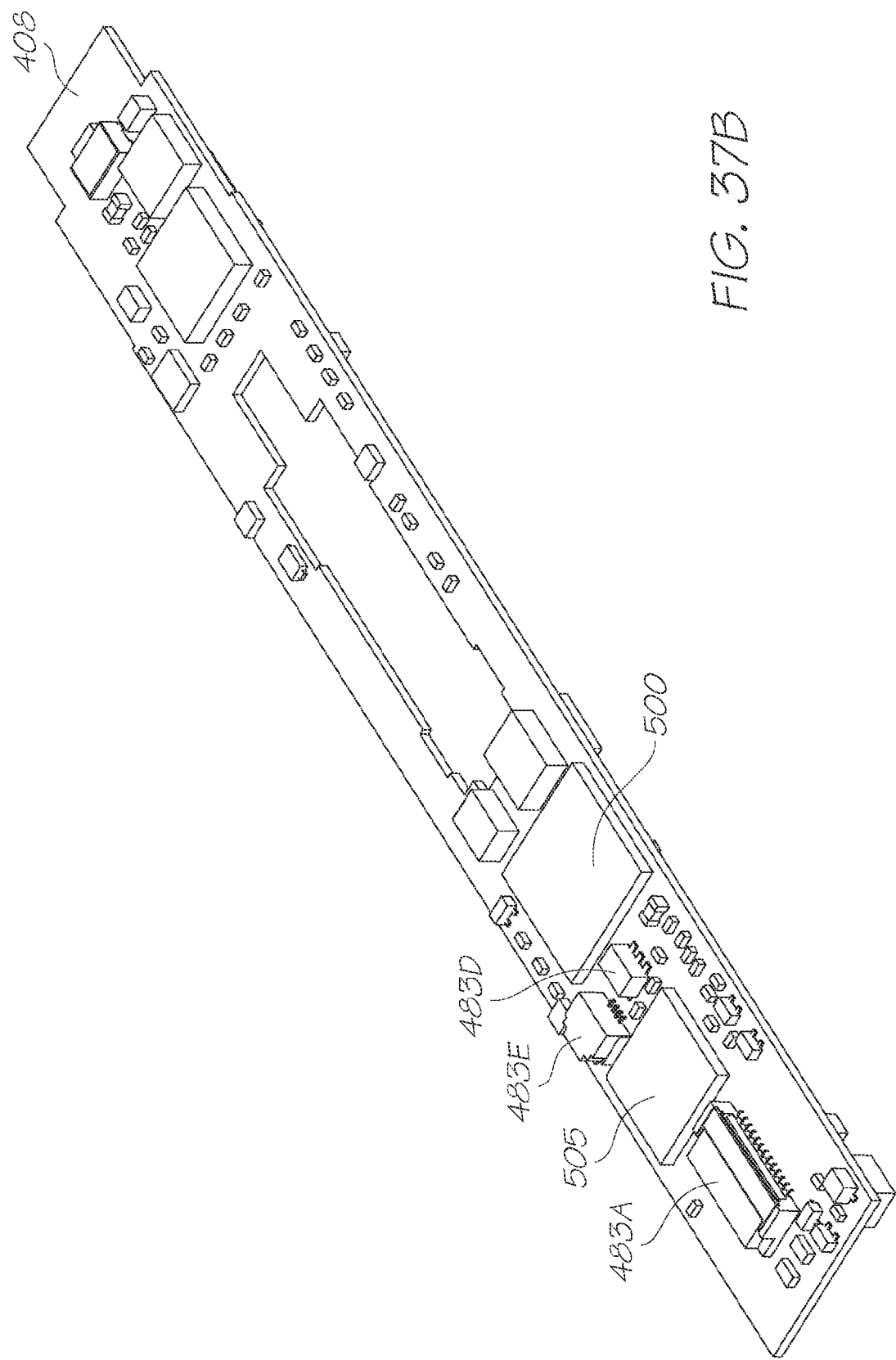

Referring to FIGS. 37A and 37B, the main PCB 408 is a 6-layer FR4 1.0 mm thick PCB with minimum trace width and separation of 100 microns. Via specification is 0.15 mm hole size in a 0.30 mm pad. The main PCB 408 is a rectangular board with dimensions 108 mm×14 mm.

The main processors (Jupiter 505 and Atmel ARM7 500) are soldered to the main PCB 408, together with a real-time clock (RTC), CSR Bluetooth chip and shielding can.

There are five connectors 483 soldered onto the main PCB 408. A first connector 483A is for the optics PCB 431, a second connector 483B is for the cradle contact lead-frame insert 482 and IR LEDs 416, a third connector 483C is for the gesture flex PCB 481, a fourth connector 483D is for the battery 410, and fifth connector 483E is for the force sensor flex 443. Cable harnesses to the cradle contact lead-frame insert 482, the battery 410 and the infrared LEDs 416 are the only wired cables inside the pen 400.

Also soldered onto the main PCB 408 is a reset switch (not shown). This is accessible at the underside of the pen through an opening large enough to admit a paperclip.

3.5.5.2 Cradle Contacts Leadframe Insert 482

Referring to FIG. 38, the cradle contacts leadframe insert 482 forms a set of 4 contacts corresponding to USB signals that are exposed on the underside of the pen 400, and provides a set of flying leads 484 for connection to the main PCB 408. The 8-way connector 483B integrates both the flying leads 484 for the cradle contacts leadframe insert 482, and flying leads 484 for the infrared LEDs 416 situated in the nosecone 409.

The leadframe insert 482 comprises the external contacts 424, which are gold plated to reduce the possibility of corrosion. The contacts 424 are positioned in the pen's housing 404 such that reliable contact is made between the contacts and a corresponding set of contacts in the Netpage pen cradle 426 when the Netpage pen 400 is inserted into the cradle.

3.5.5.3 Gesture Flex PCB 481

Referring to FIG. 39, the gesture flex PCB 481 is a flex PCB onto which are soldered a Gesture button 484, and one or more user feedback LED packages 420 (e.g. one for each of the battery status, online status, and capture blocked indicators).

The gesture flex PCB 481 is formed so that it wraps around the inside of the pen housing 404. The bulk of the gesture flex PCB 481 is situated on the top surface of the Netpage pen 400 within the housing 404, allowing the indicator LEDs 420 to be positioned under their corresponding apertures, and allowing mating of the Gesture button 485 with a corresponding button molding in the case.

The flex 481 is a 2-layer polyimide PCB, nominally 75 microns thick. The PCB is specified as flex on install only, as it is not required to move after assembly of the pen 400. Stiffener is placed under the Gesture button 485, and also at the connector (to the main PCB) to make it the correct thickness for the flex connector 483C used on the main PCB 408.

3.6 Optical Design

The pen incorporates a fixed-focus narrowband infrared imaging system. It utilises a camera with a short exposure time, small aperture, and bright synchronised illumination to capture sharp images unaffected by defocus blur or motion blur.

TABLE 9

Optical Specifications

| | |
|---|---|
| Magnification | −0.248 |
| Focal length of lens | 6.069 mm |
| Total track length | 41.0 mm |
| Aperture diameter | 0.7 mm |
| Depth of field | −/5.0 mm[a] |
| Exposure time | 100 us |
| Wavelength | 810 nm[b] |
| Image sensor size | 256 × 256 pixels |
| Pixel size | 8 um |
| Pitch range[c] | −22.5 to. 45 deg |
| Roll range | −45 to. 45 deg |
| Yaw range | 0 to 360 deg |
| Minimum sampling rate | 2.0 pixels per macrodot |
| Maximum pen velocity | 0.5 m/s |

[a]Allowing 63.5 um blur radius
[b]Illumination and filter
[c]Pitch, roll and yaw are relative to the axis of the pen.

3.6.1 Pen Optics Design Overview

Cross sections showing the pen optics are provided in FIGS. 40A and 40B. An image of the Netpage tags 4 printed on the surface 1 adjacent to the nib 406 is focused by a lens 436 onto the active region of the image sensor 432. The small aperture 439 ensures the available depth of field accommodates the required pitch and roll ranges of the pen.

A pair of LEDs 416 brightly illuminate the surface within the field of view. The spectral emission peak of the LEDs 416 is matched to the spectral absorption peak of the infrared ink used to print Netpage tags 4 so as to maximise contrast in captured images of tags. The brightness of the LEDs 416 is matched to the small aperture size and short exposure time required to minimise defocus and motion blur.

A longpass filter window 417 suppresses the response of the image sensor 432 to any colored graphics or text spatially coincident with imaged tags 4 and any ambient illumination below the cut-off wavelength of the filter. The transmission of the filter 417 is matched to the spectral absorption peak of the infrared ink in order to maximise contrast in captured images of tags 4. The filter 417 also acts as a robust physical window, preventing contaminants from entering the optical assembly 412.

3.6.2 Imaging System

Figure 41:
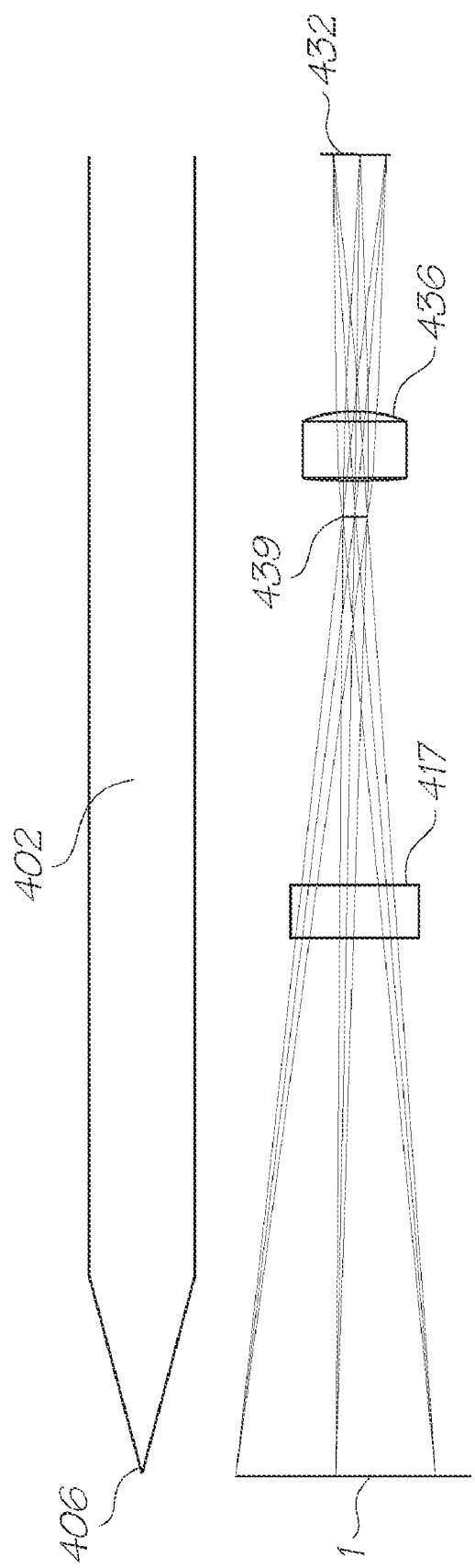
FIG. 41 is a ray trace for the pen optics alongside the pen cartridge.

A ray trace of Netpage pen's optic path is shown in FIG. 41.

The image sensor 432 is a CMOS image sensor with an active region of 256 pixels squared. Each pixel is 8 um squared, with a fill factor of 50%.

The 6.069 mm focal length lens 436 is used to transfer the image from the object plane (paper 1) to the image plane (image sensor 432) with the correct sampling frequency to successfully decode all images over the specified pitch, roll and yaw ranges. The lens 436 is biconvex, with the most curved surface being aspheric and facing the image sensor 432. As discussed in Section 2.10, the minimum imaging field of view required to guarantee acquisition of an entire tag 4 has a diameter of 46.7 s allowing for arbitrary alignment between the surface coding and the field of view. Given a macrodot spacing, s, of 127 um, this gives a required field of view of 5.93 mm.

The required paraxial magnification of the optical system is defined by the minimum spatial sampling frequency of 2.0 pixels per macrodot for the fully specified tilt range of the pen, for the image sensor of 8 um pixels. Thus, the imaging system employs a paraxial magnification of −0.248, the ratio of the diameter of the inverted image (1.47 mm) at the image sensor to the diameter of the field of view (5.93 mm) at the object plane, on an image sensor of minimum 224×224 pixels. The image sensor 432 however is 256×256 pixels, in order to accommodate manufacturing tolerances. This allows up to ±256 um (32 pixels in each direction in the plane of the image sensor) of misalignment between the optical axis and the image sensor axis without losing any of the information in the field of view.

The lens 436 is made from Poly-methyl-methacrylate (PMMA), typically used for injection moulded optical components. PMMA is scratch resistant, and has a refractive index of 1.49, with 90% transmission at 810 nm. The transmission is increased to 98% by an anti-reflection coating applied to both optical surfaces. This also removes surface reflections which lead to stray light degradation of the final image contrast. The lens 436 is biconvex to assist moulding precision and features a mounting surface to precisely mate the lens with the optical barrel assembly.

A 0.7 mm diameter aperture 439 is used to provide the depth of field requirements of the design.

The specified tilt range of the pen is −22.5° to +45.0° pitch, with a roll range of −45.0° to +45.0°. Tilting the pen through its specified range moves the tilted object plane up to 5.0 mm away from the focal plane. The specified aperture thus provides a corresponding depth of field of ±5.0 mm, with an acceptable blur radius at the image sensor of 15.7 um. To accommodate the asymmetric pitch range, the focal plane of the optics is placed 1.8 mm closer to the pen than the paper. This more nearly centralizes the optimum focus within the required depth of field.

The optical axis is parallel to the nib axis. With the nib axis perpendicular to the paper, the distance between the edge of the field of view closest to the nib axis and the nib axis itself is 2.035 mm.

The longpass filter 417 is made of CR-39, a lightweight thermoset plastic heavily resistant to abrasion and chemicals such as acetone. Because of these properties, the filter 417 also serves as a window. The filter is 1.5 mm thick, with a refractive index of 1.50. Like the lens, it has a nominal transmission of 90% which is increased to 98% with the application of anti-reflection coatings to both optical faces. Each filter 417 may be easily cut from a large sheet using a $CO_2$ laser cutter.

3.6.3 Illumination System

The tagged surface 1 is illuminated by a pair of 3 mm diameter LEDs 416. The LEDs 416 emit 810 nm radiation with a divergence half intensity, half angle of ±15 degrees in a 35 nm spectral band (FWHM), each with a power of approximately 45 mW per steradian.

3.7 Software Design

3.7.1 Netpage Pen Software Overview

The Netpage pen software comprises that software running on microprocessors in the Netpage pen 400 and pen cradle 426.

The Netpage pen 400 contains a number of microprocessors, as detailed in the Section 3.8. The Netpage pen 400 software includes software running on the Atmel ARM7 CPU (hereafter CPU), and software running in the VM on the CSR BlueCore Bluetooth module (hereafter pen BlueCore). Both of these processors has an associated flash memory which stores the processor specific software, together with settings and other persistent data. The pen BlueCore also runs firmware supplied by the module manufacturer, and this firmware is not considered a part of the Netpage pen software.

The Netpage pen cradle 426 contains a CSR BlueCore Bluetooth module (hereafter cradle BlueCore). The Netpage pen software also includes software running in the VM on the cradle BlueCore.

As the Netpage pen 400 traverses a Netpage tagged surface 1, a stream of correlated position and force samples are produced. This stream is referred to as Digital Ink.

The Netpage pen software is responsible for Digital Ink capture, tag image processing and decoding (in conjunction with the Jupiter co-processor 505 and Himalia image sensor 432), force sample processing (in conjunction with the Jupiter co-processor) storage and offload management, host communications and encryption, user feedback, software upgrade, battery charging, and Bluetooth management. It includes a real-time operating system (RTOS) and relevant hardware drivers. In addition, it provides a manufacturing and maintenance mode for calibration, configuration or detailed (non-field) fault diagnosis.

The cradle BlueCore VM software is responsible for controlling the Netpage pen cradle's LEDs appropriately, handling Bluetooth pairing operations, and communicating with the host PC via USB. A more detailed description of the software modules is given below.

The Netpage pen software is field upgradeable, with the exception of the initial boot loader. When then Netpage pen 400 is in placed into maintenance mode by a user, a software upgrade may be performed over Bluetooth. After being received and validated, the new software image is used on the next boot of the Netpage pen.

3.7.2 Netpage System Overview

The Netpage pen software is designed to operate in conjunction with a larger software system. A Netpage pen cradle 426 (or 3rd party Bluetooth adapter) receives Digital Ink from the Netpage pen 400 via a Bluetooth wireless connection and relays this to the Netpage server 10 by way of an attached desktop or laptop computer (see, for example, FIG. 4). It is possible that the Netpage server 10 will be co-resident in the attached desktop or laptop computer.

The Netpage server 10 persists Digital Ink permanently, and provides both application services for Digital Ink based applications (such as handwriting recognition and form completion), and database functionality for persisted Digital Ink (such as search, retrieval and reprinting).

3.7.3 Internal Design

The Netpage pen software is divided into a number of major modules:

- Image Processing
- Digital Ink storage and offload management
- Host Communications
- User Feedback
- Power Management
- Real Time Operating System
- Hardware Drivers
- Manufacturing and Maintenance mode (including Software Upgrade)
- Force Sensor processing
- Netpage pen BlueCore VM software
- Netpage Smart Cradle BlueCore VM software The remainder of this section provides a brief overview of these major software modules.

3.7.3.1 Image Processing

The position information in the Digital Ink stream is produced when the Netpage pen 400 traverses a surface 1 encoded with the Netpage surface encoding scheme. Images of the surface are captured by the Jupiter co-processor and Himalia image sensor 432 which are analysed to extract the required position information.

The Image Processing module is responsible for analysing images captured by Jupiter, identifying and decoding tags 4, estimating the pose of the pen 400, and combining this information to obtain position samples.

3.7.3.2 Digital Ink Storage and Offload Management

Any Digital Ink which corresponds to physical marking of an encoded surface 1 must be reliably and transactionally recorded by the Netpage system to allow for accurate reproduction of the surface, including captured Digital Ink, when it is subsequently displayed or reprinted. Ensuring that Digital Ink is reliably recorded is the responsibility of the Digital Ink storage and offload management software.

Digital Ink is persisted into non-volatile flash memory on the Netpage pen, and arranged for offload to a Netpage server. This offload process is transactional—the Netpage pen software maintains its record of Digital Ink until it can guarantee that the Digital Ink has been received and persisted by the Netpage server 10.

Digital Ink may also be streamed to the Netpage server 10 as it is captured in order to reduce latency—in this case, the Digital Ink may also be temporarily stored within the Netpage pen's internal storage unless it is pre-emptively received and persisted by the Netpage server.

3.7.3.3 Host Communications

The Netpage pen software communicates with the Netpage server 10 by way of wireless Bluetooth communication. Bluetooth connectivity is provided by the pen BlueCore.

The Communications module of the software is responsible for reliably transmitting Digital Ink from the Digital Ink storage and offload management module to the Netpage server 10. It also provides management functionality such as maintaining a record of the Netpage server with which the Netpage pen 400 is currently associated, and authenticating and encrypting communications appropriately. Bluetooth communication is only performed with the paired Bluetooth device, and uses Bluetooth encryption and authentication facilities to secure these communications.

3.7.3.4 User Feedback

The Netpage pen provides three user feedback indicators that comprise a number of LEDs 420. The user feedback software module is responsible for converting signals from other software modules into user feedback using the provided mechanisms

3.7.3.5 Power Management

The Netpage pen has a limited power budget, and its design allows for dynamic power saving in a number of ways. For example, the CPU can disable peripherals when they are not in use to save power, and the pen BlueCore can be placed into a deep sleep mode. The CPU itself can be powered down when the pen is not performing higher functions. Indeed, the only always-on components are the ancillary wakeup conditioning circuits, and pen BlueCore, which can power on the CPU in response to external stimuli.

The Power Management module is responsible for analysing the current pen state and optimizing the power usage by switching off un-needed peripherals and other components as required. That is, this module intelligently manages the facilities offered by the Netpage pen hardware to provide optimal power usage given the required Netpage pen functionality.

3.7.3.6 Software Upgrade

The Netpage pen software is field upgradeable, obtaining new software images via its Bluetooth connection. The Software Upgrade module is responsible for managing the download of complete images via the Communications module, validating these images against included checksums, and arranging for the Netpage pen to boot from a revised image when it has been validated.

The Software Upgrade process is only permitted when the Netpage pen is placed into maintenance mode by a user. Any outstanding Digital Ink may be offloaded before any software upgrade is initiated, or alternatively, if desired, the Digital Ink may be erased. This simplifies management of the internal Digital Ink formats, allowing them to be upgraded as necessary in new software loads. An existing pairing and association with a Netpage server 10 is expected to survive a software upgrade, although under some circumstances it may be necessary to repeat a pairing operation.

It should also be noted that small parts of the Netpage pen software, such as basic boot logic, are not field upgradeable. These parts of the software are minimal and tightly controlled.

3.7.3.7 Real Time Operating System

The Netpage pen software includes a Real Time Operating System (RTOS) for efficient management of CPU resources. This allows optimal handling of concurrent Digital Ink capture, persistence, and offload despite the latencies involved in image capture, flash manipulation, and communication resources.

3.7.3.8 Hardware Drivers

The Netpage pen software includes hardware drivers for all peripherals (both internal to the CPU and external to it) required for operation of the Netpage pen. This includes USRT, UART and LSS drivers for external bus communication, as well as higher level drivers for managing the Jupiter co-processor and Himalia image sensor 432, the pen BlueCore, and other internal systems.

3.7.3.9 Manufacturing and Maintenance Mode

The Netpage pen may be put into a special manufacturing and maintenance mode for factory calibration or detailed non-field failure analysis. The maintenance mode is also used to provide in-the-field firmware upgrade functionality with the assistance of a desktop computer based user interface.

3.7.3.10 Force Sensor Processing Software

The force sensor 442 in the Netpage pen 400 interfaces to the Jupiter co-processor 505, the output of which is a stream of force samples produced at the nominal force sampling rate. The force sensor processing software is tasked with filtering and resampling the force data obtained from the Jupiter co-processor to produce a stream of force samples to be included into the Digital Ink stream as recorded by the Netpage pen.

3.7.3.11 Pen Cradle BlueCore VM Software

The Netpage pen cradle 426 contains a CSR BlueCore Bluetooth module. The cradle BlueCore runs Netpage pen software in its VM. This software is responsible for controlling the cradle's user feedback LEDs to indicate power and online status, and managing the USB communication link between the cradle BlueCore and the host PC, and managing Bluetooth pairing operations. The BlueCore provides a completely embedded stack model for the Bluetooth RFCOMM stack; hence, the host PC only requires a relatively lightweight USB driver.

3.8 Electronics Design

Figure 42:
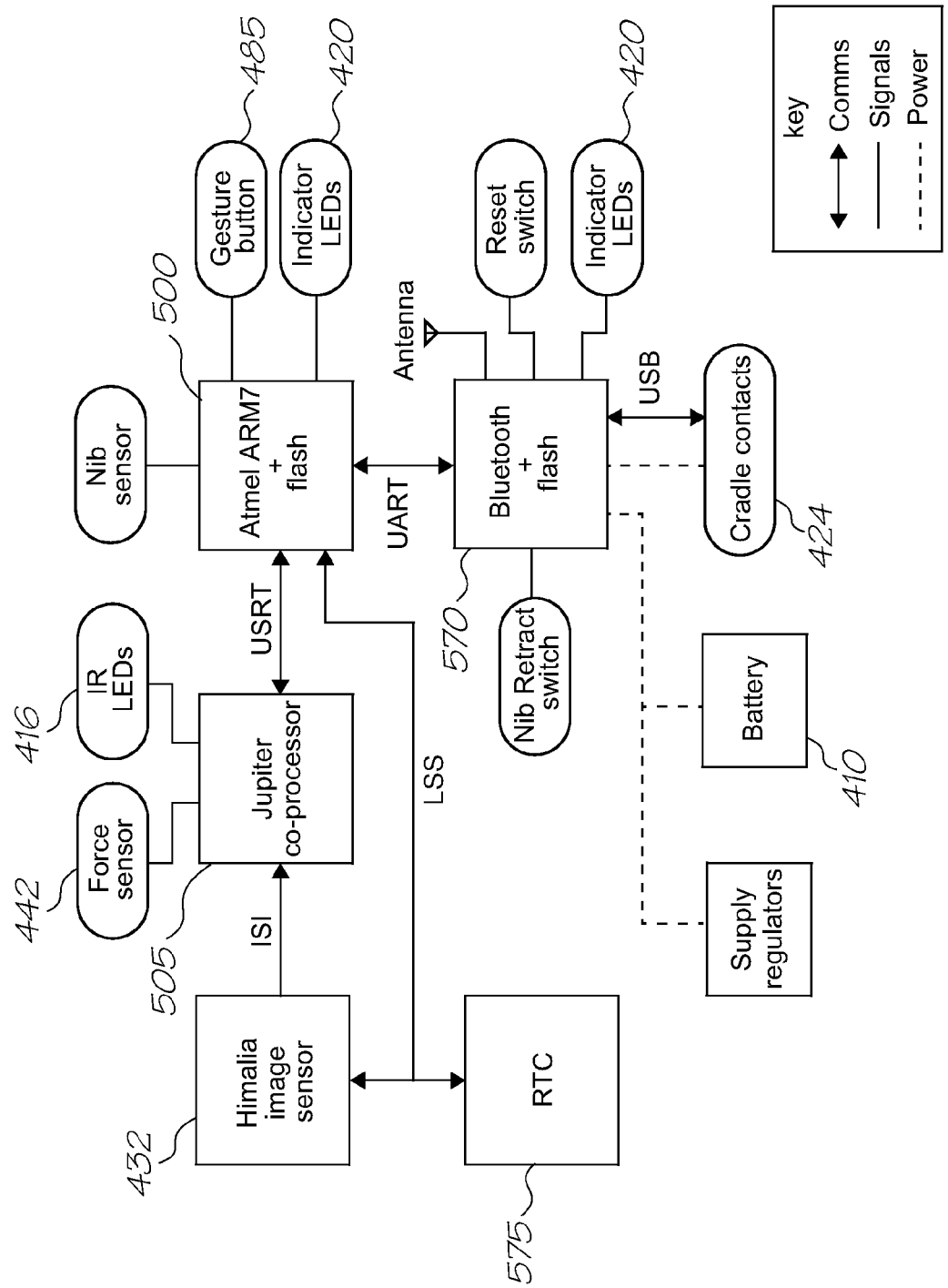
FIG. 42 is block diagram of the pen electronics.

FIG. 42 is a block diagram of the pen electronics. The electronics design for the pen is based around five main sections. These are:

- The main ARM7 microprocessor 500.
- The Jupiter co-processor 505 and Himalia image sensor 432.
- The Bluetooth communications module 510.
- The real time clock 515.
- Power supply regulation 520.
- The force sensor subsystem 442.

3.8.1 ARM7 Microprocessor

The pen uses an Atmel AT91FR40162S microprocessor 500 (see Atmel, *AT*91 *ARM Thumb Microcontrollers—AT*91FR40162 *Preliminary*, http://www.keil.com/dd/docs/datashts/atmel/at91fr40162.pdf) running at 75 MHz. The AT91FR40162S incorporates an ARM7 microprocessor, 256 kBytes of on-chip single wait state SRAM and 2 MBytes of external flash memory in a stack chip package.

This microprocessor 500 forms the core of the pen. Its duties include:

- Configuration of the Jupiter co-processor 505 and Himalia image sensor 432.
- Decoding images of surfaces encoded with the Netpage surface encoding with assistance from the image processing features of the Jupiter co-processor 505.
- Post-processing of force sensor samples received from the Jupiter co-processor 505.
- Compression, encryption and transmission of Digital Ink to a Netpage server 10 by way of the Bluetooth communications module 510.

The ARM7 microprocessor 500 communicates with the Jupiter co-processor 505 using a Universal Synchronous Receiver Transmitter (USRT) with a 37.5 MHz clock, and communicates with the Bluetooth module 510 using a UART running at 1.5 Mbps. Communications with the Himalia image sensor 432 and RTC 515 use a Low Speed Serial bus (LSS).

The ARM7 microprocessor 500 is provided with bootloader software and is initially responsive to downloading firmware over the UART interface to which the Bluetooth module 510 is connected. Firmware programming of the ARM7 is performed by way of the Bluetooth module after the Bluetooth module has been programmed.

3.8.2 Jupiter Co-Processor 505

The Jupiter co-processor 505 provides two main functions within the Netpage pen's architecture—namely image buffering and processing, and force sensor interfacing and sample buffering.

Jupiter controls the illumination of a surface by determining the strobing of two infrared LEDs 416 during the integration time of the Himalia image sensor 432. Once the integration time has elapsed, the image sensor 432 provides parallel readout of the sensor array by way of the image sensor interface (ISI)—as pixels are received, they are filtered by Jupiter and stored within an internal framebuffer for later processing operations and retrieval by the ARM7 microprocessor 500.

The force sensor 442 connected to Jupiter is pre-filtered and sampled by Jupiter such that synchronisation points exist with respect to any concurrent image capture activities. The force sensor samples are written to an internal FIFO for readout and further processing by the ARM7 microprocessor 500.

3.8.3 Bluetooth Communications Module 510

The pen uses a CSR BlueCore5-Multimedia-Flash device as the Bluetooth controller 510. It contains an internal 8 Mbit flash memory device to hold its program code and associated VM applications. The BlueCore5 meets the Bluetooth v2.0 specification and provides Enhanced Data Rate (EDR) Bluetooth communications at a signalling rate of up to 3 Mbps.

A 2.45 GHz meander-line antenna is incorporated into the Netpage pen 400 for the Bluetooth communications.

The BlueCore5 provides a USB device peripheral and the required differential signaling pads. This peripheral is used to allow enumeration of the Netpage pen as a USB device so that charge current may be negotiated when connected to a variant of the cradle 426 (i.e. a cradle that does not incorporate a Bluetooth communications facility).

The Netpage pen's reset function is controlled by the BlueCore5, which takes the user accessible reset switch as an input.

The BlueCore5 incorporates a battery charger to which the lithium polymer battery 410 is connected. The battery charger operates in a largely unattended mode, and provides trickle charging, constant current and constant voltage modes. Charge current is sourced from the cradle connector. The BlueCore5 is also able to provide a measure of the current battery voltage which is used to both provide a user indication of remaining useable battery life, and to also prevent use when the battery is significantly discharged.

The BlueCore5 requires firmware programming with a self-contained Bluetooth stack and VM applications that form part of the Netpage pen operating environment. This is performed as part of the manufacturing process over an SPI interface that is exposed as pads on the PCB—once the BlueCore5 has been programmed, the ARM7 microprocessor 500 is subsequently programmed using same SPI interface and the UART interconnect.

3.8.4 Real Time Clock (RTC) 515

The Netpage pen uses an Intersil ISL1208 real time clock (RTC) 515 that runs off the battery 410 in order to provide the Netpage pen 400 with a local timesource for timestamping Digital Ink.

The real time clock requires a 32.768 kHz crystal as a timing source.

3.8.5 Power Supply Regulation

The Netpage pen derives all internal power supplies from the internal lithium polymer battery 410.

The power supply regulation components generate the following separate voltages:

- 3.1V from an LDO for the ARM7 and BlueCore5 IO voltage.
- 3.1V from an LDO for the Jupiter and Himalia IO, and Himalia pixel reset voltages.
- 6.2V from a charge pump for the infrared LED drive voltage.

Power supplies for the Bluetooth module, and the 1.8V core voltage supplies for the Jupiter co-processor, and the ARM7 are provided as outputs from the Bluetooth module's internal LDOs.

At power up or reset of the Bluetooth module, the ARM7 and BlueCore5 IO voltage, and 1.8V core voltage are available. The Bluetooth module 510 controls enable and disable of the ARM7's clock in accordance with the Netpage pen's current operating mode. Jupiter's core and IO supplies are likewise controlled by the Bluetooth module, and can be turned on or off depending on the pen's current operating mode.

The indicator LEDs 420 in the Netpage pen 400 are powered from the IO voltage supply, and are driven either in PWM mode for those connected to the ARM7 500, or by a current sink for those connected to the Bluetooth module 510.

When the Netpage pen's nib is retracted, the Netpage pen is in its lowest power state—the Jupiter co-processor's supplies are turned off, the ARM7's clock is disabled and the Bluetooth module is powered off (which disables the internal LDOs).

When the Netpage pen's nib is extended, or there is an RTC wake-up alarm, the Bluetooth module receives a power on signal, turns on its internal LDOs and boots the ARM7 microprocessor by enabling its clock after the supplies have stabilised.

3.8.6 Force Sensor System

The force sensor subsystem comprises a custom capacitive force sensor 442, and front end filtering and sampling.

The custom capacitive force sensor 442 is sampled at high frequency (typically around 1 MHz), and decimated to a rate of around 1.5 kHz by the Jupiter co-processor 505. Subsequent processing by the ARM7 microprocessor 500 is required to further decimate and low-pass filter the resulting 10-bit force samples for inclusion in the Digital Ink stream.

The Jupiter co-processor 505 provides a single point factory calibration of the force sensor 442, and includes a configurable thresholds for performing pen down and pen up detection based on force sensor input. A temperature sensor is also present in the Jupiter co-processor 505, allowing for compensation of temperature dependence in the force sensing chain (the temperature sensor is also used for management of battery charging).

The present invention has been described with reference to a preferred embodiment and number of specific alternative embodiments. However, it will be appreciated by those skilled in the relevant fields that a number of other embodiments, differing from those specifically described, will also fall within the scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:
1. An electronic pen comprising:
 a user-replaceable cartridge having a nib at a first end and an opposite second end;
 a force sensor for sensing a nib force transmitted axially through said cartridge from said nib;

a retraction mechanism comprising:
- a barrel for receiving said second end of said cartridge, said barrel being adapted for seating said cartridge in either an extended position or a retracted position, said barrel being engaged with said force sensor; and
- a first biasing means for biasing said cartridge towards said extended or retracted positions; and a second biasing means for biasing said barrel towards engagement with said force sensor.

2. The electronic pen of claim 1, wherein said barrel comprises a boot for releasably retaining the second end of said cartridge.

3. The electronic pen of claim 2, wherein said boot is longitudinally slidable into either said extended position or said retracted position.

4. The electronic pen of claim 2, wherein said cartridge is extractable from said boot, and thereby said pen, by pulling said cartridge against the bias of the first biasing means.

5. The electronic pen of claim 4, wherein said first biasing means comprises a spring engaged between said barrel and said boot.

6. The electronic pen of claim 4, wherein said barrel comprises an end-stop abutment surface and said boot is configured to release said cartridge upon engagement with said end-stop abutment surface.

7. The electronic pen of claim 6, wherein said second biasing means is configured to maintain said barrel in engagement with said force sensor when said boot is engaged with said end-stop abutment surface of said barrel.

8. The electronic pen of claim 2, wherein said boot comprises a retaining sheath for retaining said second end of said cartridge.

9. The electronic pen of claim 1, further comprising a manually-operable button coupled to said retraction mechanism.

10. The electronic pen of claim 1 further comprising a housing for said barrel, wherein said second biasing means comprises a spring engaged between said barrel and said housing.

11. The electronic pen of claim 1, wherein said barrel comprises an externally protruding pin for engagement with said force sensor.

12. The electronic pen of claim 11, wherein said pin is engaged with a resilient moving part of said force sensor.

13. The electronic pen of claim 12, wherein said force sensor is a capacitive force sensor comprising a moving plate resiliently spaced apart from a fixed plate, and wherein said pin is engaged with said moving plate.

14. The electronic pen of claim 1, further comprising a processor configured for generating force data indicative of the nib force detected by said force sensor.

15. The electronic pen of claim 14, further comprising an image sensor for imaging at least some of a coded data pattern disposed on a surface, wherein said processor is configured for generating interaction data using one or more imaged portions of the coded data pattern.

16. The electronic pen of claim 1, wherein said cartridge is selected from any one of:
- an ink cartridge comprising an ink reservoir for supplying ink to said nib, wherein said nib is a marking nib; and
- a stylus cartridge wherein said nib is a non-marking nib.

* * * * *